US012635679B2

(12) United States Patent
Kocer et al.

(10) Patent No.: US 12,635,679 B2
(45) Date of Patent: May 26, 2026

(54) CONFIGURABLE NOZZLE ASSEMBLY AND METHODS OF SAME

(71) Applicant: Raven Industries, Inc., Sioux Falls, SD (US)

(72) Inventors: Jared Ernest Kocer, Sioux Falls, SD (US); Nicholas O. Michael, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 18/355,926

(22) Filed: Jul. 20, 2023

(65) Prior Publication Data

US 2024/0130347 A1    Apr. 25, 2024
US 2024/0224975 A9    Jul. 11, 2024

Related U.S. Application Data

(63) Continuation of application No. 16/476,069, filed as application No. PCT/US2018/012661 on Jan. 5, 2018, now Pat. No. 11,744,239.

(Continued)

(51) Int. Cl.
*B05B 1/04*        (2006.01)
*A01M 7/00*        (2006.01)
(Continued)

(52) U.S. Cl.
CPC ........... *A01M 7/0089* (2013.01); *B05B 1/042* (2013.01); *B05B 1/1636* (2013.01); *B05B 1/326* (2013.01); *B05B 7/0425* (2013.01); *B05B 12/04* (2013.01)

(58) Field of Classification Search
CPC ....... B05B 1/326; B05B 7/005; B05B 7/0483; B05B 7/0425; F16K 31/041–042
See application file for complete search history.

(56) References Cited

U.S. PATENT DOCUMENTS

| | | | |
|---|---|---|---|
| 1,582,986 | A | 5/1926 | Frank |
| 1,947,407 | A | 2/1934 | Cornell, Jr. |

(Continued)

FOREIGN PATENT DOCUMENTS

| | | |
|---|---|---|
| AU | 725448 | 10/2000 |
| AU | 2004219715 | 9/2004 |

(Continued)

OTHER PUBLICATIONS

"Brazilian Application Serial No. 1120160085175, Response filed Feb. 14, 2024 to Office Action mailed Dec. 4, 2023", w Machine English Translation, 10 pgs.

(Continued)

*Primary Examiner* — Tuongminh N Pham
(74) *Attorney, Agent, or Firm* — Schwegman Lundberg & Woessner, P.A.

(57)        ABSTRACT
A configurable nozzle includes a nozzle body having a reception chamber configured to receive an application mixture. The nozzle body includes a nozzle orifice. At least one orifice assembly is coupled with the nozzle body, the at least one orifice assembly includes an orifice plate movably coupled with the nozzle body. The orifice plate extends along at least a portion of the nozzle orifice, and movement of the orifice plate changes one or more of the size or shape of the nozzle orifice. An orifice actuator is coupled with the orifice plate, and the orifice actuator is configured to move the orifice plate.

21 Claims, 16 Drawing Sheets

Related U.S. Application Data

(60) Provisional application No. 62/442,905, filed on Jan. 5, 2017.

(51) Int. Cl.

| | | |
|---|---|---|
| *B05B 1/16* | (2006.01) | |
| *B05B 1/32* | (2006.01) | |
| *B05B 7/04* | (2006.01) | |
| *B05B 12/04* | (2006.01) | |

(56) References Cited

U.S. PATENT DOCUMENTS

| | | | |
|---|---|---|---|
| 3,197,299 | A | 7/1965 | Bosse et al. |
| 3,248,463 | A | 4/1966 | Wiley et al. |
| 3,770,198 | A | 11/1973 | Mihara |
| 3,955,795 | A | 5/1976 | Neely |
| 4,168,033 | A | 9/1979 | Von et al. |
| 4,283,010 | A | 8/1981 | Arzi et al. |
| 4,356,528 | A | 10/1982 | Coffee |
| 4,398,605 | A | 8/1983 | Conklin et al. |
| 4,530,463 | A | 7/1985 | Hiniker et al. |
| 4,582,085 | A | 4/1986 | Hafner et al. |
| 4,632,358 | A | 12/1986 | Orth et al. |
| 4,803,626 | A | 2/1989 | Bachman et al. |
| 4,970,973 | A | 11/1990 | Lyle et al. |
| 5,134,961 | A | 8/1992 | Giles et al. |
| 5,285,814 | A | 2/1994 | Pettersson et al. |
| 5,310,113 | A | 5/1994 | Cowgur |
| 5,333,794 | A | 8/1994 | Haruch |
| 5,337,959 | A | 8/1994 | Boyd |
| 5,475,614 | A | 12/1995 | Tofte et al. |
| 5,479,812 | A | 1/1996 | Juntunen et al. |
| 5,496,100 | A | 3/1996 | Schmid |
| 5,503,366 | A | 4/1996 | Zabeck et al. |
| 5,520,333 | A | 5/1996 | Tofte |
| 5,615,836 | A | 4/1997 | Graef |
| 5,635,911 | A | 6/1997 | Landers et al. |
| 5,649,687 | A | 7/1997 | Rosas et al. |
| 5,653,389 | A | 8/1997 | Henderson et al. |
| 5,703,554 | A | 12/1997 | Polgar et al. |
| 5,704,546 | A | 1/1998 | Henderson et al. |
| 5,772,114 | A | 6/1998 | Hunter |
| 5,785,246 | A | 7/1998 | King et al. |
| 5,801,948 | A | 9/1998 | Wood et al. |
| 5,864,781 | A | 1/1999 | White |
| 5,881,919 | A | 3/1999 | Womac et al. |
| 5,883,383 | A | 3/1999 | Dragne |
| 5,884,205 | A | 3/1999 | Elmore et al. |
| 5,884,224 | A | 3/1999 | McNabb et al. |
| 5,897,600 | A | 4/1999 | Elmore et al. |
| 5,911,362 | A | 6/1999 | Wood et al. |
| 5,913,915 | A | 6/1999 | McQuinn |
| 5,919,242 | A | 7/1999 | Greatline et al. |
| 5,924,371 | A | 7/1999 | Flamme et al. |
| 5,931,882 | A | 8/1999 | Fick et al. |
| 5,936,234 | A | 8/1999 | Thomas et al. |
| 5,938,071 | A | 8/1999 | Sauder |
| 5,941,303 | A | 8/1999 | Gowan et al. |
| 5,967,066 | A | 10/1999 | Giles et al. |
| 5,969,340 | A | 10/1999 | Dragne et al. |
| 5,971,294 | A | 10/1999 | Thompson et al. |
| 5,978,723 | A | 11/1999 | Hale et al. |
| 6,009,354 | A | 12/1999 | Flamme et al. |
| 6,012,996 | A | 1/2000 | Lo |
| 6,029,907 | A | 2/2000 | McKenzie |
| 6,070,538 | A | 6/2000 | Flamme et al. |
| 6,070,539 | A | 6/2000 | Flamme et al. |
| 6,079,340 | A | 6/2000 | Flamme et al. |
| 6,086,042 | A | 7/2000 | Scott et al. |
| 6,089,743 | A | 7/2000 | Mcquinn et al. |
| 6,093,926 | A | 7/2000 | Mertins et al. |
| 6,112,999 | A | 9/2000 | Fingleton et al. |
| 6,122,581 | A | 9/2000 | McQuinn |
| 6,138,922 | A | 10/2000 | Hartman et al. |
| 6,145,455 | A | 11/2000 | Gust et al. |
| 6,149,071 | A | 11/2000 | Maccallummhor et al. |
| 6,189,466 | B1 | 2/2001 | Sinclair et al. |
| 6,189,807 | B1 | 2/2001 | Miller et al. |
| 6,196,473 | B1 | 3/2001 | Beeren et al. |
| 6,199,000 | B1 | 3/2001 | Keller et al. |
| 6,209,563 | B1 | 4/2001 | Seid et al. |
| 6,216,614 | B1 | 4/2001 | Wollenhaupt |
| 6,230,091 | B1 | 5/2001 | McQuinn et al. |
| 6,236,924 | B1 | 5/2001 | Motz et al. |
| 6,240,861 | B1 | 6/2001 | Memory |
| 6,250,564 | B1 | 6/2001 | Chahley |
| 6,269,757 | B1 | 8/2001 | Kiest |
| 6,285,938 | B1 | 9/2001 | Lang et al. |
| 6,305,583 | B1 | 10/2001 | Ward et al. |
| 6,373,057 | B1 | 4/2002 | Penfold |
| 6,486,761 | B1 | 11/2002 | Czarnetzki et al. |
| 6,522,948 | B1 | 2/2003 | Benneweis |
| 6,533,334 | B1 | 3/2003 | Bonn |
| 6,584,920 | B1 | 7/2003 | Cresswell |
| 6,598,944 | B1 | 7/2003 | Wolff et al. |
| 6,606,542 | B2 | 8/2003 | Hauwiller et al. |
| 6,661,514 | B1 | 12/2003 | Tevs et al. |
| 6,666,384 | B2 | 12/2003 | Prandi |
| 6,678,580 | B2 | 1/2004 | Benneweis |
| 6,698,368 | B2 | 3/2004 | Cresswell |
| 6,708,080 | B2 | 3/2004 | Benneweis |
| 6,720,684 | B2 | 4/2004 | Czimmek |
| 6,755,390 | B2 | 6/2004 | Masuda et al. |
| 6,776,355 | B2 | 8/2004 | Ringer et al. |
| 6,851,377 | B2 | 2/2005 | Mayerle et al. |
| 6,853,276 | B2 | 2/2005 | Smith |
| 6,877,675 | B2 | 4/2005 | Benneweis |
| 6,877,717 | B2 | 4/2005 | Collins et al. |
| 6,959,907 | B2 | 11/2005 | Hironaka |
| 6,994,406 | B1 | 2/2006 | Krawczyk et al. |
| 7,124,964 | B2 | 10/2006 | Bui |
| 7,147,241 | B2 | 12/2006 | Beaujot et al. |
| 7,152,540 | B1 | 12/2006 | Sauder et al. |
| 7,156,322 | B1 | 1/2007 | Heitzman et al. |
| 7,162,961 | B2 | 1/2007 | Grimm |
| 7,195,027 | B2 | 3/2007 | Goossens et al. |
| 7,243,899 | B2 | 7/2007 | Acar et al. |
| 7,311,004 | B2 | 12/2007 | Giles |
| 7,347,221 | B2 | 3/2008 | Berger et al. |
| 7,395,769 | B2 | 7/2008 | Jensen |
| 7,441,746 | B2 | 10/2008 | Sugiyama |
| 7,472,660 | B2 | 1/2009 | Mariman et al. |
| 7,478,603 | B2 | 1/2009 | Riewerts et al. |
| 7,490,564 | B2 | 2/2009 | Allan et al. |
| 7,502,665 | B2 | 3/2009 | Giles et al. |
| 7,626,288 | B2 | 12/2009 | Protze |
| 7,654,473 | B2 | 2/2010 | Hibberd |
| 7,685,951 | B2 | 3/2010 | Beaujot et al. |
| 7,690,440 | B2 | 4/2010 | Dean et al. |
| 7,694,638 | B1 | 4/2010 | Riewerts et al. |
| 7,706,926 | B2 | 4/2010 | Peterson |
| 7,742,842 | B2 | 6/2010 | Giles et al. |
| 7,789,321 | B2 | 9/2010 | Hitt |
| 7,826,930 | B2 | 11/2010 | Giles et al. |
| 7,845,914 | B2 | 12/2010 | Engelbrecht et al. |
| 7,848,865 | B2 | 12/2010 | Di Federico et al. |
| 7,917,249 | B2 | 3/2011 | Jacobsen et al. |
| 7,954,731 | B2 | 6/2011 | Antonucci et al. |
| 8,078,367 | B2 | 12/2011 | Sauder et al. |
| 8,109,448 | B2 | 2/2012 | Giles |
| 8,141,504 | B2 | 3/2012 | Dean et al. |
| 8,170,825 | B2 | 5/2012 | Beaujot et al. |
| 8,186,288 | B2 | 5/2012 | Chinkiwsky |
| 8,191,795 | B2 | 6/2012 | Grimm et al. |
| 8,191,798 | B2 | 6/2012 | Hahn et al. |
| 8,196,534 | B2 | 6/2012 | Meyer et al. |
| 8,246,004 | B2 | 8/2012 | Kratzer |
| 8,401,704 | B2 | 3/2013 | Pollock et al. |
| 8,488,874 | B2 | 7/2013 | Zaman et al. |
| 8,523,085 | B2 | 9/2013 | Grimm et al. |
| 8,590,859 | B2 | 11/2013 | Kurz |
| 8,634,993 | B2 | 1/2014 | McClure |
| 8,635,963 | B2 | 1/2014 | Friggstad |

(56)             References Cited

U.S. PATENT DOCUMENTS

| | | |
|---|---|---|
| 8,701,707 B2 | 4/2014 | Moosmann et al. |
| 8,733,257 B2 | 5/2014 | Beaujpt et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,844,838 B2 | 9/2014 | Funseth et al. |
| 8,868,300 B2 | 10/2014 | Kocer et al. |
| 8,915,200 B2 | 12/2014 | Barsi et al. |
| 8,919,676 B2 | 12/2014 | Funseth et al. |
| 9,052,031 B2 | 6/2015 | Leidig |
| 9,061,296 B2 | 6/2015 | Peterson |
| 9,073,070 B2 | 7/2015 | Funseth et al. |
| 9,080,684 B2 | 7/2015 | Stahr |
| 9,113,591 B2 | 8/2015 | Shivak |
| 9,144,190 B2 | 9/2015 | Henry et al. |
| 9,266,124 B2 | 2/2016 | Humpal |
| 9,453,585 B2 | 9/2016 | Sato et al. |
| 9,470,332 B2 | 10/2016 | Miura |
| 9,504,212 B2 | 11/2016 | Michael et al. |
| 9,506,578 B2 | 11/2016 | Lee |
| 9,635,848 B2 | 5/2017 | Needham et al. |
| 9,702,475 B2 | 7/2017 | Scheffel et al. |
| 9,781,916 B2 | 10/2017 | Preheim et al. |
| 9,894,829 B2 | 2/2018 | Shivak |
| 10,058,879 B2 | 8/2018 | Needham |
| 10,173,236 B2 | 1/2019 | Preheim et al. |
| 10,189,031 B2 | 1/2019 | Funseth et al. |
| 10,368,538 B2 | 8/2019 | Preheim et al. |
| 10,518,284 B2 | 12/2019 | Thurow et al. |
| 10,568,257 B2 | 2/2020 | Shivak |
| 10,773,271 B2 | 9/2020 | Funseth et al. |
| 10,799,898 B2 | 10/2020 | Posselius et al. |
| 10,821,460 B2 | 11/2020 | Batcheller et al. |
| 11,051,505 B2 | 7/2021 | Humpal et al. |
| 11,071,247 B2 | 7/2021 | Shivak et al. |
| 11,130,573 B2 | 9/2021 | Holly et al. |
| 11,134,668 B2 | 10/2021 | Preheim et al. |
| 11,160,204 B2 | 11/2021 | Michael |
| 11,236,841 B2 | 2/2022 | Krosschell et al. |
| 11,612,160 B2 | 3/2023 | Krosschell et al. |
| 11,744,239 B2 | 9/2023 | Kocer et al. |
| 12,029,214 B2 | 7/2024 | Preheim et al. |
| 12,055,234 B2 | 8/2024 | Krosschell et al. |
| 2002/0005443 A1 | 1/2002 | Drechsel |
| 2002/0030119 A1 | 3/2002 | Proharam |
| 2002/0107609 A1 | 8/2002 | Benneweis |
| 2003/0028321 A1 | 2/2003 | Upadhyaya et al. |
| 2003/0070597 A1 | 4/2003 | Cresswell |
| 2003/0234301 A1 | 12/2003 | Swan |
| 2004/0036048 A1 | 2/2004 | Petersen |
| 2004/0104370 A1 | 6/2004 | Suzuki |
| 2004/0128045 A1 | 7/2004 | Benneweis |
| 2005/0000277 A1 | 1/2005 | Giles |
| 2005/0048196 A1 | 3/2005 | Yanagita et al. |
| 2005/0051749 A1 | 3/2005 | Lee |
| 2005/0076818 A1 | 4/2005 | Grimm |
| 2005/0092951 A1 | 5/2005 | Groetzinger |
| 2005/0125083 A1 | 6/2005 | Kiko |
| 2005/0173979 A1 | 8/2005 | Voss |
| 2006/0086295 A1 | 4/2006 | Jensen |
| 2006/0097210 A1 | 5/2006 | Fong et al. |
| 2006/0194699 A1 | 8/2006 | Moucharafieh et al. |
| 2006/0237562 A1 | 10/2006 | Hedegard |
| 2006/0265106 A1 | 11/2006 | Giles et al. |
| 2006/0273189 A1 | 12/2006 | Grimm et al. |
| 2007/0039880 A1 | 2/2007 | Mayerle |
| 2007/0128372 A1* | 6/2007 | Wirth ..................... B29B 7/806 |
| | | 118/712 |
| 2008/0110476 A1 | 5/2008 | Amestoy et al. |
| 2008/0114497 A1 | 5/2008 | Giles et al. |
| 2008/0114498 A1 | 5/2008 | Giles |
| 2008/0147282 A1 | 6/2008 | Kormann |
| 2008/0163807 A1 | 7/2008 | Dean et al. |
| 2008/0230624 A1 | 9/2008 | Giles et al. |
| 2008/0283633 A1 | 11/2008 | Nozaki et al. |
| 2008/0296398 A1 | 12/2008 | Hickman et al. |
| 2009/0078178 A1 | 3/2009 | Beaujot |
| 2009/0101371 A1 | 4/2009 | Melanson et al. |
| 2009/0112372 A1 | 4/2009 | Peterson |
| 2009/0114210 A1 | 5/2009 | Guice et al. |
| 2009/0134237 A1 | 5/2009 | Giles |
| 2009/0184182 A1 | 7/2009 | Beeren |
| 2009/0271136 A1 | 10/2009 | Beaujot et al. |
| 2010/0032492 A1 | 2/2010 | Grimm et al. |
| 2010/0096476 A1 | 4/2010 | Callies et al. |
| 2010/0101469 A1 | 4/2010 | Landphair et al. |
| 2010/0132600 A1 | 6/2010 | Dean et al. |
| 2010/0163774 A1 | 7/2010 | Rimboym et al. |
| 2010/0269921 A1 | 10/2010 | Pifer et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2011/0210186 A1 | 9/2011 | Kugler et al. |
| 2012/0045013 A1 | 2/2012 | Chen et al. |
| 2012/0080624 A1 | 4/2012 | Stahr et al. |
| 2012/0153051 A1 | 6/2012 | Kah, Jr. et al. |
| 2012/0168530 A1* | 7/2012 | Ellingson .............. B05B 12/008 |
| | | 239/71 |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0241533 A1 | 9/2012 | Moeller et al. |
| 2012/0271467 A1 | 10/2012 | Grimm et al. |
| 2013/0032737 A1 | 2/2013 | Neilson et al. |
| 2013/0037633 A1 | 2/2013 | Walter et al. |
| 2013/0043321 A1 | 2/2013 | Thomas et al. |
| 2013/0092746 A1 | 4/2013 | Scott et al. |
| 2013/0119154 A1 | 5/2013 | Sawyer |
| 2013/0192503 A1 | 8/2013 | Henry et al. |
| 2013/0269578 A1 | 10/2013 | Grimm |
| 2013/0292590 A1 | 11/2013 | Stahr |
| 2013/0306894 A1 | 11/2013 | Weis et al. |
| 2013/0320105 A1 | 12/2013 | Schmidt |
| 2013/0320106 A1 | 12/2013 | Schmidt |
| 2013/0333601 A1 | 12/2013 | Shivak |
| 2014/0014863 A1 | 1/2014 | Najmolhoda et al. |
| 2014/0026995 A1 | 1/2014 | Mayr et al. |
| 2014/0048002 A1 | 2/2014 | Grimm et al. |
| 2014/0084196 A1 | 3/2014 | Heyer et al. |
| 2014/0091243 A1 | 4/2014 | Leidig |
| 2014/0216315 A1 | 8/2014 | Beaujot et al. |
| 2014/0252111 A1 | 9/2014 | Michael et al. |
| 2014/0263705 A1 | 9/2014 | Michael et al. |
| 2014/0263708 A1 | 9/2014 | Thompson et al. |
| 2014/0263709 A1* | 9/2014 | Kocer .................. B05B 1/3006 |
| | | 239/11 |
| 2014/0277780 A1 | 9/2014 | Jensen et al. |
| 2014/0299673 A1 | 10/2014 | Grimm et al. |
| 2014/0312141 A1 | 10/2014 | Ravishankar |
| 2014/0333398 A1 | 11/2014 | Nila et al. |
| 2014/0361094 A1 | 12/2014 | Michael |
| 2015/0115058 A1 | 4/2015 | Wilger |
| 2015/0257331 A1 | 9/2015 | Shivak |
| 2015/0336116 A1 | 11/2015 | Gerdes |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1 | 12/2015 | Funseth et al. |
| 2016/0015020 A1 | 1/2016 | Needham et al. |
| 2016/0017792 A1 | 1/2016 | Fletcher et al. |
| 2016/0044862 A1 | 2/2016 | Kocer et al. |
| 2016/0084382 A1 | 3/2016 | Pisasale |
| 2016/0136671 A1 | 5/2016 | Kocer |
| 2016/0175869 A1 | 6/2016 | Sullivan et al. |
| 2016/0178422 A1 | 6/2016 | Humpal et al. |
| 2016/0227755 A1 | 8/2016 | Preheim et al. |
| 2016/0251008 A1 | 9/2016 | Jeon et al. |
| 2017/0018345 A1 | 1/2017 | Raff et al. |
| 2017/0050206 A1 | 2/2017 | Bullock et al. |
| 2017/0079200 A1 | 3/2017 | Posselius et al. |

(56) References Cited

U.S. PATENT DOCUMENTS

| 2017/0095834 A1 | 4/2017 | Kinard |
|---|---|---|
| 2017/0120263 A1 | 5/2017 | Needham |
| 2017/0251656 A1 | 9/2017 | Kolb et al. |
| 2017/0284285 A1 | 10/2017 | Lenk et al. |
| 2017/0314580 A1 | 11/2017 | Steensma et al. |
| 2017/0348718 A1 | 12/2017 | Preheim et al. |
| 2018/0042214 A1 | 2/2018 | Preheim et al. |
| 2018/0111148 A1 | 4/2018 | Batcheller et al. |
| 2018/0126397 A1 | 5/2018 | Le Cardinal et al. |
| 2018/0288934 A1 | 10/2018 | Shivak |
| 2019/0029170 A1 | 1/2019 | Wilger |
| 2019/0040972 A1 | 2/2019 | Schrader |
| 2019/0047694 A1 | 2/2019 | Zivan et al. |
| 2019/0321844 A1 | 10/2019 | Schrader et al. |
| 2019/0350187 A1 | 11/2019 | Kocer et al. |
| 2019/0373880 A1 | 12/2019 | Kocer et al. |
| 2020/0037519 A1 | 2/2020 | Wonderlich et al. |
| 2020/0101480 A1 | 4/2020 | Schrader et al. |
| 2020/0107538 A1 | 4/2020 | Preheim et al. |
| 2020/0113170 A1 | 4/2020 | Davis et al. |
| 2020/0113171 A1 | 4/2020 | Davis et al. |
| 2020/0214193 A1 | 7/2020 | Shivak |
| 2020/0253111 A1 | 8/2020 | Schlipf et al. |
| 2021/0016309 A1 | 1/2021 | Bremer et al. |
| 2021/0076977 A1 | 3/2021 | Abeyratne et al. |
| 2021/0102637 A1 | 4/2021 | Krosschell et al. |
| 2021/0144906 A1 | 5/2021 | Shivak et al. |
| 2021/0176977 A1 | 6/2021 | Bremer et al. |
| 2021/0219538 A1 | 7/2021 | Krosschell et al. |
| 2021/0282315 A1 | 9/2021 | Charcosset |
| 2021/0289693 A1 | 9/2021 | Harmon et al. |
| 2021/0400946 A1 | 12/2021 | Burgers et al. |
| 2022/0062934 A1 | 3/2022 | Ferren et al. |
| 2022/0079132 A1 | 3/2022 | Preheim et al. |
| 2022/0088627 A1 | 3/2022 | Chaim et al. |
| 2022/0099213 A1 | 3/2022 | Krosschell et al. |
| 2022/0104427 A1 | 4/2022 | Michael |
| 2022/0124962 A1 | 4/2022 | Long et al. |
| 2023/0049963 A1 | 2/2023 | Kocer et al. |
| 2023/0141050 A1 | 5/2023 | Sibley et al. |
| 2023/0141867 A1 | 5/2023 | Krosschell et al. |
| 2024/0306629 A1 | 9/2024 | Kocer et al. |
| 2024/0307911 A1 | 9/2024 | Kocer et al. |
| 2024/0324580 A1 | 10/2024 | Preheim et al. |
| 2024/0418289 A1 | 12/2024 | Krosschell et al. |
| 2024/0424506 A1 | 12/2024 | Kocer |

FOREIGN PATENT DOCUMENTS

| AU | 2005247004 | | 12/2006 |
|---|---|---|---|
| AU | 2006202376 | B2 | 12/2006 |
| AU | 2009203181 | A1 | 2/2010 |
| AU | 2012201357 | A1 | 9/2012 |
| AU | 2013203361 | A1 | 10/2013 |
| AU | 2013204455 | A1 | 3/2014 |
| AU | 2013248190 | | 5/2014 |
| AU | 2013277513 | B2 | 3/2017 |
| AU | 2019229358 | | 4/2020 |
| AU | 2017285727 | B2 | 7/2020 |
| AU | 2020357581 | | 5/2022 |
| AU | 2020357581 | B2 | 8/2023 |
| AU | 2023214344 | A1 | 8/2023 |
| AU | 2021297320 | | 3/2024 |
| AU | 2023214344 | | 11/2025 |
| BR | 112022026505 | A2 | 5/2023 |
| CA | 2229852 | A1 | 8/1998 |
| CA | 2517031 | A1 | 9/2004 |
| CA | 2528708 | A1 | 11/2006 |
| CA | 2549300 | A1 | 12/2006 |
| CA | 2674527 | A1 | 2/2010 |
| CA | 2770013 | A1 | 9/2012 |
| CA | 2811726 | A1 | 10/2013 |
| CA | 2813949 | A1 | 2/2014 |
| CA | 2830306 | | 4/2014 |
| CA | 2926448 | A1 | 4/2015 |
| CA | 3049421 | | 7/2018 |
| CA | 2926448 | C | 9/2020 |
| CA | 3049421 | C | 3/2023 |
| CN | 102435019 | A | 5/2012 |
| CN | 202255911 | U | 5/2012 |
| CN | 102266829 | B | 12/2012 |
| CN | 203264929 | U | 11/2013 |
| DE | 102011053182 | | 3/2013 |
| DE | 102016109406 | | 11/2017 |
| DE | 112017003084 | T5 | 6/2019 |
| EP | 0086029 | | 8/1983 |
| EP | 0287552 | | 10/1988 |
| EP | 0576121 | B1 | 3/1996 |
| EP | 969712 | | 1/2000 |
| EP | 0961659 | | 10/2002 |
| EP | 0963255 | B1 | 10/2002 |
| EP | 0847307 | B2 | 1/2003 |
| EP | 0837735 | | 2/2004 |
| EP | 1426112 | B1 | 6/2011 |
| EP | 2249876 | | 8/2012 |
| EP | 3248463 | A1 | 11/2017 |
| EP | 3530115 | | 8/2019 |
| EP | 3565398 | | 6/2024 |
| FR | 2964047 | A1 | 3/2012 |
| GB | 990346 | A | 4/1965 |
| GB | 2322573 | A | 9/1998 |
| JP | 2759711 | B2 | 5/1998 |
| JP | 2000139245 | A | 5/2000 |
| JP | 2005161221 | A | 6/2005 |
| WO | WO-9712688 | A1 | 4/1997 |
| WO | WO1997012688 | A1 | 4/1997 |
| WO | WO-98037751 | | 9/1998 |
| WO | WO-9842178 | A1 | 10/1998 |
| WO | WO-9916007 | A1 | 4/1999 |
| WO | WO-1999016007 | A1 | 4/1999 |
| WO | WO-2004023865 | | 3/2004 |
| WO | WO-2004081499 | | 9/2004 |
| WO | WO-2005048704 | A2 | 6/2005 |
| WO | WO-2008059984 | A1 | 5/2008 |
| WO | WO-2008112930 | A1 | 9/2008 |
| WO | WO-2010105221 | A1 | 9/2010 |
| WO | WO-2012022903 | A1 | 2/2012 |
| WO | WO-2013135430 | A1 | 9/2013 |
| WO | WO-2013191990 | A2 | 12/2013 |
| WO | WO-2013191990 | A3 | 12/2013 |
| WO | WO-2014201008 | A1 | 12/2014 |
| WO | WO-2014210043 | A1 | 12/2014 |
| WO | WO-2015058091 | A1 | 4/2015 |
| WO | WO-2016030368 | A1 | 3/2016 |
| WO | WO-2016145081 | A2 | 9/2016 |
| WO | WO-2017124175 | A1 | 7/2017 |
| WO | WO-2017192625 | A1 | 11/2017 |
| WO | WO-2017223252 | A1 | 12/2017 |
| WO | WO-2018129323 | A1 | 7/2018 |
| WO | WO-2018129376 | A2 | 7/2018 |
| WO | WO-2018129376 | A3 | 7/2018 |
| WO | WO-2020252239 | A1 | 12/2020 |
| WO | WO-2021066962 | A1 | 4/2021 |
| WO | WO-2021263024 | A1 | 12/2021 |
| WO | 2022094138 | | 5/2022 |
| WO | WO-2022216285 | A1 | 10/2022 |
| WO | WO-2023278009 | A1 | 1/2023 |
| WO | WO-2023081371 | A1 | 5/2023 |
| WO | 2024192167 | | 9/2024 |
| WO | 2024263873 | | 12/2024 |

OTHER PUBLICATIONS

"Australian Application Serial No. 2021297320, Response filed Feb. 22, 24 to First Examination Report mailed Nov. 7, 23", 17 pgs.

"U.S. Appl. No. 17,410,852, Corrected Notice of Allowability mailed Mar. 6, 2024", 2 pgs.

"U.S. Appl. No. 17,410,852, Corrected Notice of Allowability mailed Mar. 13, 2024", 2 pgs.

"U.S. Appl. No. 17,465,644, Notice of Allowance mailed Mar. 21, 2024", 12 pgs.

"Canadian Application Serial No. 3,182,267, Examiners Rule 86(2) Report mailed Apr. 2, 2024", 7 pgs.

(56) References Cited

OTHER PUBLICATIONS

"Canadian Application Serial No. 3, 185,961, Examiners Rule 86(2) Report mailed May 6, 2024", 3 pgs.

"U.S. Appl. No. 18,669,983, Preliminary Amendment filed May 28, 2024", 3 pgs.

"U.S. Appl. No. 17,410,852, Corrected Notice of Allowability mailed May 31, 2024", 2 pgs.

"U.S. Appl. No. 18,669,983, Preliminary Amendment filed Jun. 4, 2024", 7 pgs.

"European Application Serial No. 21827830.7, Extended European Search Report mailed Jun. 6, 2024", 6 pgs.

U.S. Appl. No. 14/899,946, filed Dec. 18, 2015, Agricultural Product Delivery Control in an Agricultural Sprayer.

U.S. Appl. No. 15/029,935 U.S. Pat. No. 9,781,916, filed Apr. 15, 2016, Nozzle Control System and Method.

U.S. Appl. No. 15/703,818 U.S. Pat. No. 10,368,538, filed Sep. 13, 2017, Nozzle Control System and Method.

U.S. Appl. No. 16/447,779 U.S. Pat. No. 11,134,668, filed Jun. 20, 2019, Nozzle Control System and Method.

U.S. Appl. No. 17/410,852, filed Aug. 24, 2021, Nozzle Control System and Method.

U.S. Appl. No. 16/476,069, filed Jul. 3, 2019, Configurable Nozzle Assembly and Methods of Same.

U.S. Appl. No. 15/629,696 U.S. Pat. No. 10,173,236, filed Jun. 21, 2017, Nozzle Control System and Method.

U.S. Appl. No. 17/001,539 U.S. Pat. No. 11,236,841, filed Aug. 24, 2020, Valve Control System and Method.

U.S. Appl. No. 17/465,644, filed Sep. 2, 2021, Valve Control System and Method.

U.S. Appl. No. 17/357,477, filed Jun. 24, 2021, Duct Throttled Sprayer Nozzle Assemblies and Methods for Same.

"International Application Serial No. PCT US2024 019793, International Search Report mailed Jun. 27, 2024", 5 pgs.

"International Application Serial No. PCT US2024 019793, Written Opinion mailed Jun. 27, 2024", 10 pgs.

"U.S. Appl. No. 17,465,644, Supplemental Notice of Allowability mailed Jun. 27, 2024", 2 pgs.

"European Application Serial No. 24174311.1, Extended European Search Report mailed Jul. 10, 2024", 5 pgs.

"Canadian Application Serial No. 3,182,267, Response filed Jul. 31, 2024 to Examiners Rule 86(2) Report mailed Apr. 2, 2024", 21 pgs.

"Brazilian Application Serial No. BR112022006486-1, Office Action mailed Jul. 13, 2024", w English translation, 9 pgs.

"Canadian Application Serial No. 3,185,961, Response filed Aug. 12, 2024 to Examiners Rule 86(2) Report mailed May 6, 2024", 8 pgs.

"U.S. Appl. No. 18,750,201, Preliminary Amendment filed Sep. 5, 2024", 12 pgs.

"Australian Application Serial No. 2023214344, First Examination Report mailed Sep. 9, 2024", 2 pgs.

"Agrifac Pulse-width modulation (PWM) spraying", 2021 Agrifac Machinery B.V. [online]. [archived Jan. 16, 2021]. Retrieved from the Internet: <URL: https://web.archive.org/web/20210116150413/https://www.agrifac.com/optional-spray-technology/strictsprayplus/>, (Jan. 16, 2021), 15 pgs.

"U.S. Appl. No. 13/776,285, Amendment and Response under 37 C.F.R. Sec. 1.114 filed Apr. 27, 2015", 13 pgs.

"U.S. Appl. No. 13/776,285, Non Final Office Action mailed Jul. 30, 2014", 15 pgs.

"U.S. Appl. No. 13/776,285, Notice of Allowance mailed Jan. 27, 2015", 5 pgs.

"U.S. Appl. No. 13/776,285, Notice of Allowance mailed May 4, 2015", 6 pgs.

"U.S. Appl. No. 13/776,285, Response filed Dec. 30, 2014 to Non Final Office Action mailed Jul. 30, 2014", 25 pgs.

"U.S. Appl. No. 13/832,678, Advisory Action mailed Jun. 3, 2016", 3 pgs.

"U.S. Appl. No. 13/832,678, Final Office Action mailed Mar. 17, 2016", 12 pgs.

"U.S. Appl. No. 13/832,678, Non Final Office Action mailed Oct. 1, 2015", 15 pgs.

"U.S. Appl. No. 13/832,678, Notice of Allowance mailed Jul. 20, 2016", 13 pgs.

"U.S. Appl. No. 13/832,678, Response filed May 12, 2016 to Final Office Action mailed Mar. 17, 2016", 10 pgs.

"U.S. Appl. No. 13/832,678, Response filed Jul. 27, 2015 to Restriction Requirement mailed Jun. 9, 2015", 7 pgs.

"U.S. Appl. No. 13/832,678, Response filed Dec. 31, 2015 to Non Final Office Action mailed Oct. 1, 2015", 10 pgs.

"U.S. Appl. No. 13/832,678, Restriction Requirement mailed Jun. 9, 2015", 7 pgs.

"U.S. Appl. No. 13/832,735, Final Office Action mailed Aug. 5, 2016", 29 pgs.

"U.S. Appl. No. 13/832,735, Non Final Office Action mailed Feb. 19, 2016", 26 pgs.

"U.S. Appl. No. 13/832,735, Non Final Office Action mailed Jul. 15, 2015", 22 pgs.

"U.S. Appl. No. 13/832,735, Response filed May 19, 2016 to Non Final Office Action mailed Feb. 19, 2016", 13 pgs.

"U.S. Appl. No. 13/832,735, Response filed Nov. 16, 2015 to Non-Final Office Action mailed Jul. 15, 2015", 16 pgs.

"U.S. Appl. No. 14/300,761, Advisory Action mailed Dec. 12, 2017", 3 pgs.

"U.S. Appl. No. 14/300,761, Examiner Interview Summary mailed Nov. 22, 2017", 3 pgs.

"U.S. Appl. No. 14/300,761, Final Office Action mailed Aug. 31, 2017", 11 pgs.

"U.S. Appl. No. 14/300,761, Final Office Action mailed Nov. 27, 2018", 16 pgs.

"U.S. Appl. No. 14/300,761, Final Office Action mailed Dec. 18, 2020", 14 pgs.

"U.S. Appl. No. 14/300,761, Non Final Office Action mailed Feb. 8, 2017", 13 pgs.

"U.S. Appl. No. 14/300,761, Non Final Office Action mailed Apr. 15, 2020", 17 pgs.

"U.S. Appl. No. 14/300,761, Non Final Office Action mailed May 24, 2018", 16 pgs.

"U.S. Appl. No. 14/300,761, Notice of Allowance mailed May 7, 2021", 16 pgs.

"U.S. Appl. No. 14/300,761, Notice of Allowance mailed Sep. 9, 2021", 16 pgs.

"U.S. Appl. No. 14/300,761, Response filed Apr. 19, 2021 to Final Office Action mailed Dec. 18, 2020", 19 pgs.

"U.S. Appl. No. 14/300,761, Response filed Jun. 7, 2017 to Non Final Office Action mailed Feb. 8, 2017", 16 pgs.

"U.S. Appl. No. 14/300,761, Response filed Oct. 15, 2020 to Non Final Office Action mailed Apr. 15, 2020", 17 pgs.

"U.S. Appl. No. 14/300,761, Response filed Oct. 24, 2018 to Non Final Office Action mailed May 24, 2018", 22 pgs.

"U.S. Appl. No. 14/300,761, Response filed Nov. 29, 2019 to Final Office Action mailed Nov. 27, 2018", 21 pgs.

"U.S. Appl. No. 14/300,761, Response filed Dec. 20, 2016 to Restriction Requirement mailed Oct. 20, 2016", 15 pgs.

"U.S. Appl. No. 14/300,761, Resposne filed Nov. 16, 2017 to Final Office Action mailed Aug. 31, 2017", 16 pgs.

"U.S. Appl. No. 14/300,761, Restriction Requirement mailed Oct. 20, 2016", (9 pgs).

"U.S. Appl. No. 14/727,535, Corrected Notice of Allowance mailed Jan. 12, 2018", 2 pgs.

"U.S. Appl. No. 14/727,535, Final Office Action mailed Jun. 21, 2017", 6 pgs.

"U.S. Appl. No. 14/727,535, Non Final Office Action mailed Feb. 16, 2017", 17 pgs.

"U.S. Appl. No. 14/727,535, Notice of Allowance mailed Aug. 24, 2017", 5 pgs.

"U.S. Appl. No. 14/727,535, Preliminary Amendment filed Jun. 2, 2015", 9 pgs.

"U.S. Appl. No. 14/727,535, Response filed Jan. 17, 2017 to Restriction Requirement mailed Nov. 17, 2016", 12 pgs.

"U.S. Appl. No. 14/727,535, Response filed May 6, 2017 to Non Final Office Action mailed Feb. 16, 2017", 18 pgs.

(56) References Cited

OTHER PUBLICATIONS

"U.S. Appl. No. 14/727,535, Response filed Aug. 14, 2017 to Final Office Action mailed Jun. 21, 2017", 9 pgs.

"U.S. Appl. No. 14/727,535, Restriction Requirement mailed Nov. 17, 2016", 6 pgs.

"U.S. Appl. No. 14/899,946, Final Office Action mailed Dec. 28, 2018", 41 pgs.

"U.S. Appl. No. 14/899,946, Non Final Office Action mailed Mar. 26, 2018", 37 pgs.

"U.S. Appl. No. 14/899,946, Response filed Aug. 27, 2018 to Non Final Office Action mailed Mar. 26, 2018", 27 pgs.

"U.S. Appl. No. 15/029,935, Final Office Action mailed Jul. 11, 2017", 6 pgs.

"U.S. Appl. No. 15/029,935, Non Final Office Action mailed Mar. 30, 2017", 21 pgs.

"U.S. Appl. No. 15/029,935, Notice of Allowance mailed Aug. 29, 2017", 5 pgs.

"U.S. Appl. No. 15/029,935, Preliminary Amendment filed Apr. 15, 2016", 3 pgs.

"U.S. Appl. No. 15/029,935, Reponse filed Aug. 16, 2017 to Final Office Action mailed Jul. 11, 2017", 11 pgs.

"U.S. Appl. No. 15/029,935, Response filed Jun. 15, 2017 to Non Final Office Action mailed Mar. 30, 2017", 12 pgs.

"U.S. Appl. No. 15/585,034, Non Final Office Action mailed Nov. 2, 2018", 25 pgs.

"U.S. Appl. No. 15/629,696, Corrected Notice of Allowability mailed Aug. 29, 2018", 4 pgs.

"U.S. Appl. No. 15/629,696, Corrected Notice of Allowability mailed Dec. 7, 2018", 2 pgs.

"U.S. Appl. No. 15/629,696, Ex Parte Quayle Action mailed May 3, 2018", 12 pgs.

"U.S. Appl. No. 15/629,696, Response filed Jul. 3, 2018 to Ex Parte Quayle Action mailed May 3, 2018", 13 pgs.

"U.S. Appl. No. 15/629,696, Response filed Nov. 13, 2018 to Examiner's Reasons for Allowance mailed May 3, 2018", 2 pgs.

"U.S. Appl. No. 15/703,818, Non Final Office Action mailed Oct. 11, 2018", 6 pgs.

"U.S. Appl. No. 15/703,818, Notice of Allowance mailed Mar. 20, 2019", 5 pgs.

"U.S. Appl. No. 15/703,818, Preliminary Amendment filed Nov. 3, 2017", 6 pgs.

"U.S. Appl. No. 15/703,8181, Response filed Jan. 11, 2019 to Non Final Office Action mailed Oct. 11, 2018", 9 pgs.

"U.S. Appl. No. 15/821,113, Corrected Notice of Allowability mailed Jan. 2, 2020", 2 pgs.

"U.S. Appl. No. 15/821,113, Corrected Notice of Allowability mailed Jan. 28, 2020", 2 pgs.

"U.S. Appl. No. 15/821,113, Ex Parte Quayle Action mailed Aug. 9, 2019", 4 pgs.

"U.S. Appl. No. 15/821,113, Notice of Allowance mailed Sep. 27, 2019", 5 pgs.

"U.S. Appl. No. 15/821,113, Notice of Allowance mailed Oct. 22, 2019", 5 pgs.

"U.S. Appl. No. 15/821,113, Notice of Non-Compliant Amendment mailed Jun. 11, 2019", 4 pgs.

"U.S. Appl. No. 15/821,113, Preliminary Amendment filed Jun. 28, 2018", 7 pgs.

"U.S. Appl. No. 15/821,113, Response filed Apr. 29, 2019 to Restriction Requirement mailed Nov. 30, 2018", 10 pgs.

"U.S. Appl. No. 15/821,113, Response filed Jul. 11, 2019 to Notice of Non-Compliant Amendment mailed Jun. 11, 2019", 12 pgs.

"U.S. Appl. No. 15/821,113, Response filed Sep. 9, 2019 to Ex Parte Quayle Action mailed Aug. 9, 2019", 3 pgs.

"U.S. Appl. No. 15/821,113, Restriction Requirement mailed Nov. 30, 2018", 6 pgs.

"U.S. Appl. No. 16/476,016, Examiner Interview Summary mailed Jan. 27, 2023", 2 pgs.

"U.S. Appl. No. 16/476,016, Examiner Interview Summary mailed Apr. 15, 2022", 2 pgs.

"U.S. Appl. No. 16/476,016, Examiner Interview Summary mailed Oct. 4, 2022", 2 pgs.

"U.S. Appl. No. 16/476,016, Final Office Action mailed Jan. 11, 2022", 15 pgs.

"U.S. Appl. No. 16/476,016, Final Office Action mailed Nov. 15, 2022", 20 pgs.

"U.S. Appl. No. 16/476,016, Non Final Office Action mailed Mar. 28, 2023", 22 pgs.

"U.S. Appl. No. 16/476,016, Non Final Office Action mailed Jun. 24, 2022", 15 pgs.

"U.S. Appl. No. 16/476,016, Non Final Office Action mailed Aug. 31, 2021", 14 pgs.

"U.S. Appl. No. 16/476,016, Preliminary Amendment filed Jul. 3, 2019", 12 pgs.

"U.S. Appl. No. 16/476,016, Response filed Feb. 15, 2023 to Final Office Action mailed Nov. 15, 2022", 24 pgs.

"U.S. Appl. No. 16/476,016, Response filed Apr. 11, 2022 to Final Office Action mailed Jan. 11, 2022", 18 pgs.

"U.S. Appl. No. 16/476,016, Response filed Jul. 28, 2021 to Restriction Requirement mailed Apr. 30, 2021", 12 pgs.

"U.S. Appl. No. 16/476,016, Response filed Oct. 24, 2022 to Non Final Office Action mailed Jun. 24, 2022", 22 pgs.

"U.S. Appl. No. 16/476,016, Response filed Nov. 29, 2021 to Non Final Office Action mailed Aug. 31, 2021", 19 pgs.

"U.S. Appl. No. 16/476,016, Restriction Requirement mailed Apr. 30, 2021", 8 pgs.

"U.S. Appl. No. 16/731,325, Corrected Notice of Allowability mailed Jun. 15, 2021", 2 pgs.

"U.S. Appl. No. 16/731,325, Ex Parte Quayle Action mailed Oct. 22, 2020", 5 pgs.

"U.S. Appl. No. 16/731,325, Examiner Interview Summary mailed Oct. 23, 2020", 2 pgs.

"U.S. Appl. No. 16/731,325, Notice of Allowance mailed Feb. 18, 2021", 8 pgs.

"U.S. Appl. No. 16/731,325, Notice of Allowance mailed Mar. 23, 2021", 5 pgs.

"U.S. Appl. No. 16/731,325, Notice of Allowance mailed Dec. 7, 2020", 5 pgs.

"U.S. Appl. No. 16/731,325, Preliminary Amendment filed Mar. 24, 2020", 8 pgs.

"U.S. Appl. No. 16/731,325, Response filed Nov. 20, 2020 to Ex Parte Quayle Action mailed Oct. 22, 2020", 10 pgs.

"U.S. Appl. No. 17/161,453, Preliminary Amendment filed Jan. 28, 2021", 8 pgs.

"U.S. Appl. No. 17/224,955, Final Office Action mailed Aug. 15, 2022", 6 pgs.

"U.S. Appl. No. 17/224,955, Non Final Office Action mailed Mar. 7, 2022", 7 pgs.

"U.S. Appl. No. 17/224,955, Notice of Allowance mailed Oct. 27, 2022", 5 pgs.

"U.S. Appl. No. 17/224,955, Response filed Aug. 3, 2022 to Non Final Office Action mailed Mar. 7, 2022", 12 pgs.

"U.S. Appl. No. 17/224,955, Supplemental Notice of Allowability mailed Feb. 22, 2023", 2 pgs.

"U.S. Appl. No. 17/224,955, Supplemental Notice of Allowability mailed Mar. 1, 2023", 2 pgs.

"U.S. Appl. No. 17/410,852, Final Office Action mailed Nov. 14, 2023", 8 pgs.

"U.S. Appl. No. 17/410,852, Non Final Office Action mailed Aug. 1, 2023", 9 pgs.

"U.S. Appl. No. 17/410,852, Notice of Allowance mailed Feb. 28, 2024", 5 pgs.

"U.S. Appl. No. 17/410,852, Response filed Feb. 14, 2024 to Final Office Action mailed Nov. 14, 2023", 10 pgs.

"U.S. Appl. No. 17/410,852, Response filed Nov. 1, 2023 to Non Final Office Action mailed Aug. 1, 2023", 15 pgs.

"U.S. Appl. No. 17/465,644, Response filed Dec. 13, 2023 to Restriction Requirement mailed Oct. 13, 2023", 11 pgs.

"U.S. Appl. No. 17/465,644, Restriction Requirement mailed Oct. 13, 2023", 6 pgs.

"U.S. Appl. No. 17/504,601, Preliminary Amendment filed Dec. 22, 2021", 7 pgs.

(56)  References Cited

OTHER PUBLICATIONS

"U.S. Appl. No. 17/809,223, Non Final Office Action mailed Feb. 15, 2023", 15 pgs.
"U.S. Appl. No. 17/809,223, Preliminary Amendment filed Nov. 3, 2022", 7 pgs.
"U.S. Appl. No. 18/140,491, Preliminary Amendment Filed May 3, 2023", 15 pgs.
"U.S. Appl. No. 18/575,725, Supplemental Preliminary Amendment filed Jan. 16, 2024", 11 pgs.
"Application Serial No. PCT/US2014/061150, International Preliminary Report on Patentability mailed Oct. 16, 2015", 10 pgs.
"U.S. Appl. No. 15/629,696, Notice of Allowance mailed Aug. 13, 2018", 5 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2017285727, First Examination Report mailed May 21, 2019", 2 pgs.
"Australian Application Serial No. 2017285727, Response filed Mar. 23, 2020 to First Examination Report mailed May 21, 2019", 10 pgs.
"Australian Application Serial No. 2018205225, First Examination Report mailed Apr. 15, 2020", 8 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Australian Application Serial No. 2020357581, First Examination Report mailed Feb. 2, 2023", 2 pgs.
"Australian Application Serial No. 2021209314, First Examination Report mailed Jan. 9, 2023", 5 pgs.
"Australian Application Serial No. 2021297320, First Examination Report mailed Nov. 7, 2023", 2 pgs.
"Brazilian Application Serial No. 1120160085175, Office Action mailed Nov. 6, 2018", (w/ English Translation), 6 pgs.
"Brazilian Application Serial No. 1120160085175, Office Action mailed Dec. 4, 2023", w/ Machine English translation, 9 pgs.
"Brazilian Application Serial No. 1120180747017, Office Action mailed Jul. 22, 2021", (w/ English Translation), 5 pgs.
"Brazilian Application Serial No. 1120180747017, Office Action mailed Sep. 6, 2022", W/ English Translation, 6 pgs.
"Brazilian Application Serial No. 1120180747017, Opinion for non-patenteability (RPI 7.1) mailed Mar. 29, 2022", (w/ English Translation), 18 pgs.
"Brazilian Application Serial No. 1120180747017, Response filed Jul. 4, 2022 Opinion for non-patentability (RPI 7.1) mailed Mar. 29, 2022", (w/ Concise Statement of Relevance), 22 pgs.
"Brazilian Application Serial No. 1120180747017, Response filed Oct. 20, 2021 to Office Action mailed Jul. 22, 2021", (w/ English Translation of Claims), 14 pgs.
"Brazilian Application Serial No. 1120180747017, Response filed Dec. 5, 2022 to Office Action mailed Sep. 6, 2022", w/ English Translation, 2 pgs.
"Brazilian Application Serial No. 1120180747017, Voluntary Amendment filed Jun. 22, 2020", (w/ English Translation), 44 pgs.
"Canadian Application Serial No. 2,877,195, Office Action mailed Jun. 18, 2019", 3 pgs.
"Canadian Application Serial No. 2,877,195, Office Action mailed Dec. 9, 2020", 3 pgs.
"Canadian Application Serial No. 2,877,195, Response filed Apr. 8, 2021 to Office Action mailed Dec. 9, 2020", 16 pgs.

"Canadian Application Serial No. 2,877,195, Response filed Dec. 18, 2019 to Office Action mailed Jun. 18, 2019", 10 pgs.
"Canadian Application Serial No. 2,877,195, Voluntary Amendment filed Nov. 16, 2020", 13 pgs.
"Canadian Application Serial No. 2,926,448, Examiner's Rule 30(2) Requisition mailed Oct. 3, 2018", 3 pgs.
"Canadian Application Serial No. 2,926,448, Office Action mailed Jan. 5, 2018", 5 pgs.
"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 3,013,670, Examiner's Rule 30(2) Requisition mailed Sep. 11, 2019", 5 pgs.
"Canadian Application Serial No. 3,013,670, Response filed Mar. 11, 2020 to Examiner's Rule 30(2) Requisition mailed Sep. 11, 2019", 68 pgs.
"Canadian Application Serial No. 3,049,391, Office Action mailed Sep. 4, 2020", 4 pgs.
"Canadian Application Serial No. 3,049,391, Office Action mailed Sep. 26, 2022", 4 pgs.
"Canadian Application Serial No. 3,049,391, Office Action mailed Dec. 1, 2021", 4 pgs.
"Canadian Application Serial No. 3,049,391, Response filed Jan. 20, 2023 to Office Action mailed Sep. 26, 2022", 7 pgs.
"Canadian Application Serial No. 3,049,391, Response filed Mar. 3, 2021 to Office Action mailed Sep. 4, 2020", 11 pgs.
"Canadian Application Serial No. 3,049,391, Response filed Mar. 15, 2022 to Office Action mailed Dec. 1, 2021", 8 pgs.
"Canadian Application Serial No. 3153465, Examiners Rule 86(2) Report mailed Jan. 13, 2023", 3 pgs.
"Canadian Application Serial No. 3153465, Response filed May 1, 2023 to Examiners Rule 86(2) Report mailed Jan. 13, 2023", 2 pgs.
"Electrostatic Dispersal Solutions", https://web.archive.org/web/20170928035648/https://www.4rysprays.com/, (Captured on Sep. 28, 2017), 6 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. 18735853.6, Response filed Sep. 12, 2023 to Communication Pursuant to Article 94(3) EPC mailed Apr. 3, 2023", 9 pgs.
"European Application Serial No. 18736496.3, Communication Pursuant to Article 94(3) EPC mailed Mar. 24, 2023", 10 pgs.
"European Application Serial No. 18736496.3, Extended European Search Report mailed Sep. 15, 2020", 9 pgs.
"European Application Serial No. 18736496.3, Response filed Apr. 12, 2021 to Extended European Search Report mailed Sep. 15, 2020", 31 pgs.
"European Application Serial No. 18736496.3, Response to Communication Pursuant to Rules 161(2) and 162 EPC filed Feb. 28, 2020", 14 pgs.
"European Application Serial No. 20872967.3, Extended European Search Report mailed Sep. 29, 2023", 9 pgs.
"European Application Serial No. 21827830.7, Voluntary Amendment filed Aug. 9, 2023", 6 pgs.
"German Application Serial No. 11 2017 003 084.6, Office Action mailed Feb. 5, 2019", (w/ English Translation), 5 pgs.
"German Application Serial No. 11 2017 003 084.6, Response filed May 8, 2019 to Office Action mailed Feb. 5, 2019", (w/ Concise Statement of Relevance), 17 pgs.

(56) References Cited

OTHER PUBLICATIONS

"International Application Serial No. PCT/US2013/045445, International Preliminary Report on Patentability mailed Dec. 31, 2014", 7 pgs.

"International Application Serial No. PCT/US2013/045445, International Search Report mailed Nov. 27, 2013", 3 pgs.

"International Application Serial No. PCT/US2013/045445, Written Opinion mailed Nov. 27, 2013", 9 pgs.

"International Application Serial No. PCT/US2014/041717, International Preliminary Report on Patentability mailed May 6, 2015", 11 pgs.

"International Application Serial No. PCT/US2014/041717, International Search Report mailed Oct. 15, 2014", 2 pgs.

"International Application Serial No. PCT/US2014/041717, Response and Amendment filed Apr. 5, 2015 to Written Opinion mailed Oct. 15, 2014", 15 pgs.

"International Application Serial No. PCT/US2014/041717, Written Opinion mailed Oct. 15, 2014", 7 pgs.

"International Application Serial No. PCT/US2014/043926, International Preliminary Report on Patentability Jan. 7, 2016", 11 pgs.

"International Application Serial No. PCT/US2014/043926, International Search Report mailed Nov. 3, 2014", 2 pgs.

"International Application Serial No. PCT/US2014/043926, Written Opinion mailed Nov. 3, 2014", 9 pgs.

"International Application Serial No. PCT/US2014/061150, International Search Report mailed Feb. 4, 2015", 2 pgs.

"International Application Serial No. PCT/US2014/061150, Written Opinion mailed Feb. 4, 2015", 7 pgs.

"International Application Serial No. PCT/US2017/030694, International Preliminary Report on Patentability mailed May 29, 2018", 23 pgs.

"International Application Serial No. PCT/US2017/030694, International Search Report mailed Aug. 1, 2017", 3 pgs.

"International Application Serial No. PCT/US2017/030694, Response filed Mar. 2, 2018 to Written Opinion mailed Aug. 1, 2017", 4 pgs.

"International Application Serial No. PCT/US2017/030694, Written Opinion mailed Aug. 1, 2017", 8 pgs.

"International Application Serial No. PCT/US2017/038622, International Preliminary Report on Patentability mailed Jan. 3, 2019", 7 pgs.

"International Application Serial No. PCT/US2017/038622, International Search Report mailed Sep. 28, 2017", 2 pgs.

"International Application Serial No. PCT/US2017/038622, Written Opinion mailed Sep. 28, 2017", 5 pgs.

"International Application Serial No. PCT/US2018/012590, International Preliminary Report on Patentability mailed Jul. 18, 2019", 15 pgs.

"International Application Serial No. PCT/US2018/012590, International Search Report mailed Apr. 13, 2018", 4 pgs.

"International Application Serial No. PCT/US2018/012590, Invitation to Pay Additional Fees and Partial Search Report mailed Feb. 21, 2018", 2 pgs.

"International Application Serial No. PCT/US2018/012590, Written Opinion mailed Apr. 13, 2018", 13 pgs.

"International Application Serial No. PCT/US2018/012661, International Search Report mailed Jun. 21, 2018", 4 pgs.

"International Application Serial No. PCT/US2018/012661, Invitation to Pay Additional Fees and Partial Search Report mailed Mar. 15, 2018", 2 pgs.

"International Application Serial No. PCT/US2018/012661, Written Opinion mailed Jun. 21, 2018", 9 pgs.

"International Application Serial No. PCT/US2020/047696, International Preliminary Report on Patentability mailed Apr. 14, 2022", 6 pgs.

"International Application Serial No. PCT/US2021/026252, International Search Report mailed Jun. 15, 2021", 2 pgs.

"International Application Serial No. PCT/US2021/026252, Written Opinion mailed Jun. 15, 2021", 4 pgs.

"International Application Serial No. PCT/US2022/027707, International Preliminary Report on Patentability mailed Jan. 11, 2024", 11 pgs.

"International Application Serial No. PCT/US2022/048981, International Search Report mailed Apr. 13, 2023", 6 pgs.

"International Application Serial No. PCT/US2022/048981, Invitation to Pay Additional Fees mailed Jan. 19, 2023", 5 pgs.

"International Application Serial No. PCT/US2022/048981, Written Opinion mailed Apr. 13, 2023", 18 pgs.

Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.

Dietz, John, "A five-part program for efficient farming", Farming, (Apr. 2000), 1-4.

Elmore, Clyde L., "Soil Solarization A Nonpesticidal Method for Controlling Diseases, Nematodes, and Weeds", University of California Division of Agriculture and Natural Resources Publication 21377, (1997), 1-17.

Van Zuydam, R. P, "A driver's steering aid for an agricultural implement, based on an electronic map and Real Time Kinematic DGPS", Computers and Electronics in Agriculture, 24(3), (Dec. 1999), 153-163.

Van Zuydam, R. P, "Centimeter-Precision Guidance of Agricultural Implements In the Open Field by Means of Real Time Kinematic Dgps", Proceedings of the Fourth International Conference on Precision Agriculture, (1999), 1023-1034.

"U.S. Appl. No. 15/703,818, Corrected Notice of Allowability mailed Jul. 8, 2019", 2 pgs.

"U.S. Appl. No. 16/447,779, Corrected Notice of Allowability mailed May 26, 2021", 2 pgs.

"U.S. Appl. No. 16/447,779, Corrected Notice of Allowability mailed Sep. 9, 2021", 2 pgs.

"U.S. Appl. No. 16/447,779, Non Final Office Action mailed Jan. 12, 2021", 9 pgs.

"U.S. Appl. No. 16/447,779, Notice of Allowance mailed May 20, 2021", 5 pgs.

"U.S. Appl. No. 16/447,779, Preliminary Amendment filed Dec. 30, 2019", 4 pgs.

"U.S. Appl. No. 16/447,779, Response filed Apr. 12, 2021 to Non Final Office Action mailed Jan. 12, 2021", 7 pgs.

"U.S. Appl. No. 16/476,069, Corrected Notice of Allowability mailed Jan. 30, 2023", 2 pgs.

"U.S. Appl. No. 16/476,069, Examiner Interview Summary mailed Mar. 18, 2022", 2 pgs.

"U.S. Appl. No. 16/476,069, Examiner Interview Summary mailed U.S. Appl. No. 16/476,069, Examiner Interview Summary mailed Oct. 28, 2022", 2 pgs.

"U.S. Appl. No. 16/476,069, Final Office Action mailed Jul. 25, 2022", 13 pgs.

"U.S. Appl. No. 16/476,069, Non Final Office Action mailed Nov. 12, 2021", 13 pgs.

"U.S. Appl. No. 16/476,069, Notice of Allowance mailed Jan. 19, 2023", 8 pgs.

"U.S. Appl. No. 16/476,069, Notice of Allowance mailed Apr. 20, 2023", 8 pgs.

"U.S. Appl. No. 16/476,069, Preliminary Amendment filed Jul. 3, 2019", 13 pgs.

"U.S. Appl. No. 16/476,069, Response filed Apr. 11, 2022 to Non Final Office Action mailed Nov. 12, 2021", 12 pgs.

"U.S. Appl. No. 16/476,069, Response filed Jul. 27, 2021 to Restriction Requirement mailed May 3, 2021", 10 pgs.

"U.S. Appl. No. 16/476,069, Response filed Oct. 25, 2022 to Final Office Action mailed Jul. 25, 2022", 13 pgs.

"U.S. Appl. No. 16/476,069, Restriction Requirement mailed May 3, 2021", 9 pgs.

"U.S. Appl. No. 17/001,539, 312 Amendment filed Oct. 5, 2021", 3 pgs.

"U.S. Appl. No. 17/001,539, Notice of Allowance mailed Jun. 3, 2021", 12 pgs.

"U.S. Appl. No. 17/001,539, Notice of Allowance mailed Sep. 15, 2021", 11 pgs.

(56)            References Cited

OTHER PUBLICATIONS

"U.S. Appl. No. 17/001,539, Supplemental Notice of Allowability mailed Dec. 23, 2021", 4 pgs.
"U.S. Appl. No. 17/410,852, Preliminary Amendment filed Dec. 10, 2021", 8 pgs.
"U.S. Appl. No. 17/465,644, Preliminary Amendment filed Dec. 17, 2021", 11 pgs.
"Brazilian Application Serial No. 1120160085175, Office Action mailed Jan. 18, 2022", (w/ Concise Statement of Relevance), 26 pgs.
"Brazilian Application Serial No. 1120160085175, Office Action mailed Mar. 25, 2020", (w/ English Translation), 6 pgs.
"Brazilian Application Serial No. 1120160085175, Response filed Jul. 27, 2020 to Office Action mailed Mar. 25, 2020", (w/ English Translation of Claims), 102 pgs.
"Canadian Application Serial No. 2,926,448, Examiner's Rule 30(2) Requisition mailed Jul. 23, 2019", 3 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Office Action mailed Nov. 29, 2021", 4 pgs.
"Canadian Application Serial No. 3,049,421, Response filed Mar. 1, 2021 to Office Action mailed Nov. 5, 2020", 19 pgs.
"Canadian Application Serial No. 3,049,421, Response filed Mar. 25, 2022 to Office Action mailed Nov. 29, 2021", 18 pgs.
"Canadian Application Serial No. 3,049,421, Response filed Oct. 1, 2021 to Office Action mailed Jun. 4, 2021", 33 pgs.
"European Application Serial No. 18735853.6, Communication Pursuant to Article 94(3) EPC mailed Apr. 3, 2023", 4 pgs.
"European Application Serial No. 18735853.6, Communication Pursuant to Article 94(3) EPC mailed Jun. 10, 2022", 3 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communiciation pursuant to Rules 161(2) and 162 EPC mailed Aug. 13, 2019", 16 pgs.
"European Application Serial No. 18735853.6, Response filed Oct. 18, 2022 to Communication Pursuant to Article 94(3) EPC mailed Jun. 10, 2022", 24 pgs.
"European Application Serial No. 18735853.6, Response filed Oct. 28, 2021 to Communication Pursuant to Article 94(3) EPC mailed Jun. 18, 2021", 17 pgs.
"European Application Serial No. 20872967.3, Response to Communication Pursuant to Rules 161 and 162 EPC filed Nov. 17, 2022", 9 pgs.
"International Application Serial No. PCT/US2018/012661, International Preliminary Report on Patentability mailed Jul. 18, 2019", 11 pgs.
"International Application Serial No. PCT/US2020/047696, International Search Report mailed Nov. 23, 2020", 2 pgs.
"International Application Serial No. PCT/US2020/047696, Written Opinion mailed Nov. 23, 2020", 4 pgs.
"International Application Serial No. PCT/US2021/038955, International Preliminary Report on Patentability mailed Jan. 5, 2023", 7 pgs.
"International Application Serial No. PCT/US2021/038955, International Search Report mailed Sep. 29, 2021", 2 pgs.
"International Application Serial No. PCT/US2021/038955, Written Opinion mailed Sep. 29, 2021", 5 pgs.

"International Application Serial No. PCT/US2022/027707, International Search Report mailed Aug. 17, 2022", 5 pgs.
"International Application Serial No. PCT/US2022/027707, Written Opinion mailed Aug. 17, 2022", 9 pgs.
"Wilger 2019-2020 Manufacturer's Suggested Retail Price List", (Revised Sep. 1, 2019), 20 pgs.
Madsen, Jesper, et al., "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.
U.S. Appl. No. 16/476,069 U.S. Pat. No. 11,744,239, filed Jul. 3, 2019, Configurable Nozzle Assembly and Methods of Same.
U.S. Appl. No. 18/575,725, filed Dec. 29, 2023, Sprayer Nozzle Monitor and Control System and Methods for Same.
"International Application Serial No. PCT US2024 034956, International Search Report mailed Oct. 8, 2024", 5 pgs.
"International Application Serial No. PCT US2024 034956, Written Opinion mailed Oct. 8, 2024", 8 pgs.
"U.S. Appl. No. 17/357,477, Restriction Requirement mailed Oct. 17, 2024", 11 pgs.
"Brazil Application Serial No. BR112022006486-1, Response filed Oct. 25, 2024 to Office Action mailed Jul. 13, 2024", with English claims, 227 pages.
"U.S. Appl. No. 17/357,477, Response filed Dec. 17, 2024 to Restriction Requirement mailed Oct. 17, 2024", 12 pgs.
"Australian Application Serial No. 2022300712, First Examination Report mailed Dec. 16, 2024", 3 pgs.
"U.S. Appl. No. 18/669,983, Non Final Office Action mailed Jan. 10, 2025", 12 pgs.
"European Application Serial No. 21827830.7, Response filed Dec. 23, 2024 to Extended European Search Report mailed Jun. 6, 2024", 20 pgs.
"European Application Serial No. 24174311.1, Response filed Feb. 6, 2025 to Extended European Search Report mailed Jul. 10, 2024", 16 pgs.
"U.S. Appl. No. 17/357,477, Non Final Office Action mailed Mar. 19, 2025", 13 pgs.
"Canadian Application Serial No. 3,182,267, Office Action mailed Mar. 20, 2025", 4 pgs.
"Canadian Application Serial No. 3,224, 111, Examiners Rule 862 Report mailed May 8, 2025", 13 pgs.
"U.S. Appl. No. 18/669,983, Response filed May 12, 2025 to Non Final Office Action mailed Feb. 10, 2025", 15 pgs.
"U.S. Appl. No. 18/669,983, Examiner Interview Summary mailed May 13, 2025", 2 pgs.
"Brazil Application Serial No. BR112022026505-0, Office Action mailed May 13, 2025", with English translation, 7 pages.
"International Application Serial No. PCT US2024 019793, International Preliminary Report on Patentability mailed May 28, 2025", 13 pgs.
"U.S. Appl. No. 18/669,983, Notice of Allowance mailed Jun. 12, 2025", 5 pgs.
"Australian Application Serial No. 2023214344, Response filed Jun. 18, 2025 to First Examination Report mailed Sep. 9, 2024", 154 pgs.
"Australian Application Serial No. 2022300712, Response filed Jun. 24, 2025 to First Examination Report mailed Dec. 16, 2024", 83 pages.
"U.S. Appl. No. 18/749,866, Non Final Office Action mailed Jul. 2, 2025", 15 pgs.
"U.S. Appl. No. 17/357,477, Response filed Jul. 21, 2025 to Non Final Office Action mailed Mar. 19, 2025", 15 pgs.
"Australian Application Serial No. 2022300712, Subsequent Examiners Report mailed Jul. 11, 2025", 3 pgs.
"Australian Application Serial No. 2024204174, First Examination Report mailed Jul. 24, 2025", 2 pgs.
"U.S. Appl. No. 17/357,477, Final Office Action mailed Aug. 4, 2025", 13 pgs.
"Canadian Application Serial No. 3,182,267, Response filed Jul. 31, 2025 to Office Action mailed Mar. 20, 2025", 18 pages.
"Brazilian Application Serial No. BR112022026505-0, Response filed Aug. 11, 2025 to Office Action mailed May 13, 2025", with English translation, 203 pages.

(56)          References Cited

OTHER PUBLICATIONS

"Canadian Application Serial No. 3,224,111, Response filed Sep. 2, 2025 to Examiners Rule 862 Report mailed May 8, 2025", 101 pgs.

"European Application Serial No. 24174311.1, Communication Pursuant to Article 943 EPC mailed Oct. 9, 2025", 4 pgs.

"U.S. Appl. No. 18/669,983, Notice of Allowance mailed Oct. 28, 2025", 5 pgs.

"U.S. Appl. No. 17/357,477, Response filed Nov. 4, 2025 to Final Office Action mailed Aug. 4, 2025", 16 pgs.

"U.S. Appl. No. 18/604,330, Non Final Office Action mailed Nov. 4, 2025", 20 pgs.

"U.S. Appl. No. 18/669,983, Corrected Notice of Allowability mailed Nov. 14, 2025", 2 pgs.

"Australian Application Serial No. 2022300712, Response filed Nov. 25, 2025 to Subsequent Examiners Report mailed Jul. 11, 2025", 138 pgs.

"European Application Serial No. 21827830.7, Communication Pursuant to Article 943 EPC mailed Nov. 25, 2025", 3 pgs.

"U.S. Appl. No. 18/749,866, Response filed Dec. 1, 2025 to Non Final Office Action mailed Jul. 2, 2025", 18 pgs.

"Australian Application Serial No. 2024204174, Response filed Dec. 8, 2025 to First Examination Report mailed Jul. 24, 2025", 1 pg.

"U.S. Appl. No. 18/749,866, Final Office Action mailed Dec. 17, 2025", 13 pages.

"U.S. Appl. No. 18/575,725, Restriction Requirement mailed Dec. 29, 2025", 8 pages.

"International Application Serial No. PCT/US2024/034956, International Preliminary Report on Patentability mailed Jan. 2, 2026" 10 pages.

"U.S. Appl. No. 17/357,477, Notice of Allowance mailed Jan. 21, 2026", 10 pages.

"U.S. Appl. No. 18/669,983, Corrected Notice of Allowability mailed Feb. 3, 2026", 3 pages.

"U.S. Appl. No. 18/604,330, Response filed Feb. 4, 2026 to Non Final Office Action mailed Nov. 4, 2025", 15 pages.

"U.S. Appl. No. 17/357,477, Corrected Notice of Allowability mailed Feb. 10, 2026", 2 pages.

"U.S. Appl. No. 18/575,725, Response filed Feb. 26, 2026 to Restriction Requirement mailed Dec. 29, 2025", 12 pages.

"U.S. Appl. No. 18/749,866, Response filed Apr. 17, 2026 to Final Office Action mailed Dec. 17, 2025", 19 pages.

"U.S. Appl. No. 18/749,866, Examiner Interview Summary mailed Mar. 26, 2026", 2 pages.

"U.S. Appl. No. 18/604,330, Notice of Allowance mailed Apr. 14, 2026", 9 pages.

"Australian Application Serial No. 2025256084, Voluntary Amendment filed Feb. 18, 2026", 21 pages.

* cited by examiner

102

100

102

Figure 5:
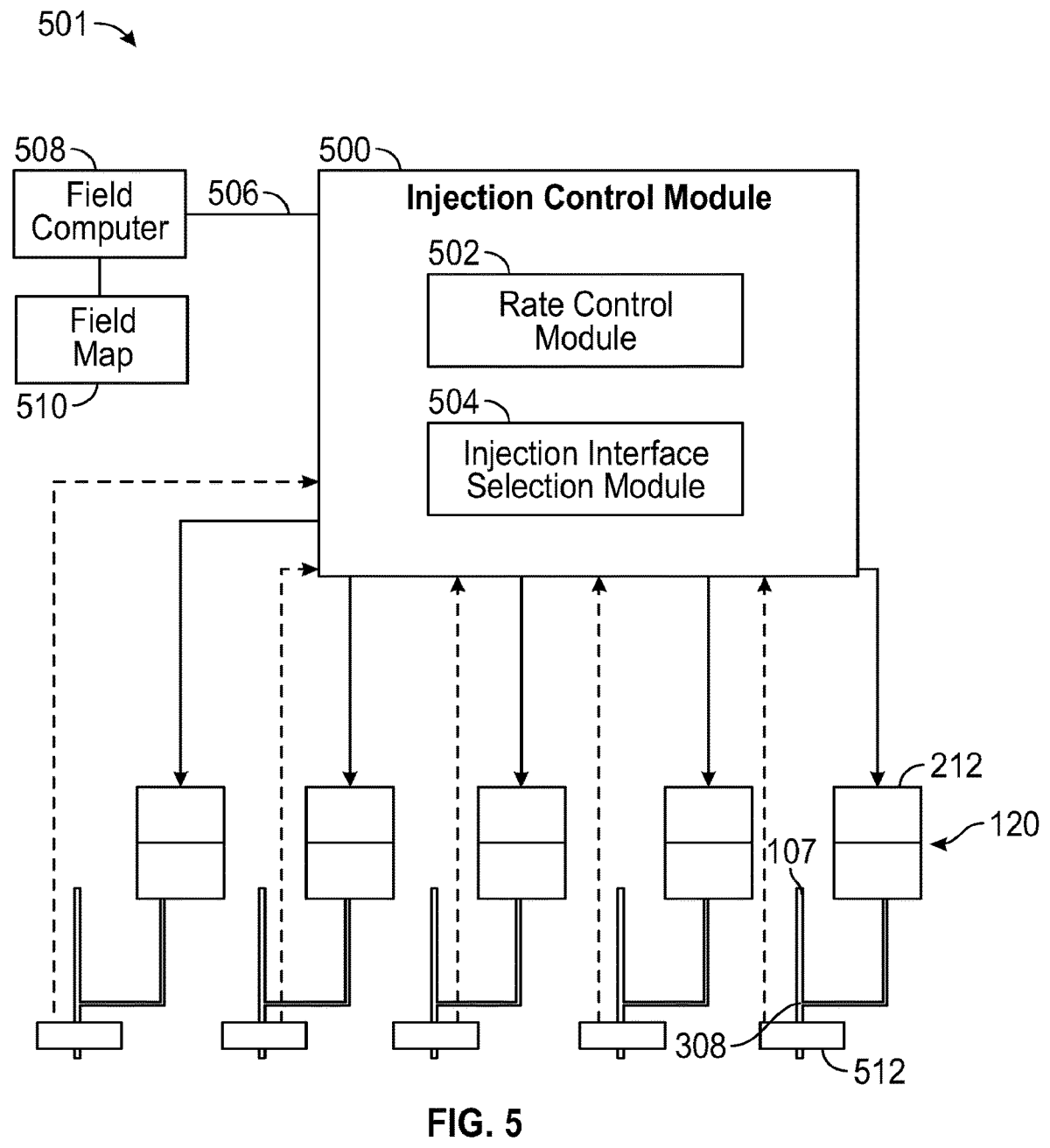

501

508
Field Computer

506

500

Injection Control Module

502
Rate Control Module

504
Injection Interface Selection Module

Field Map

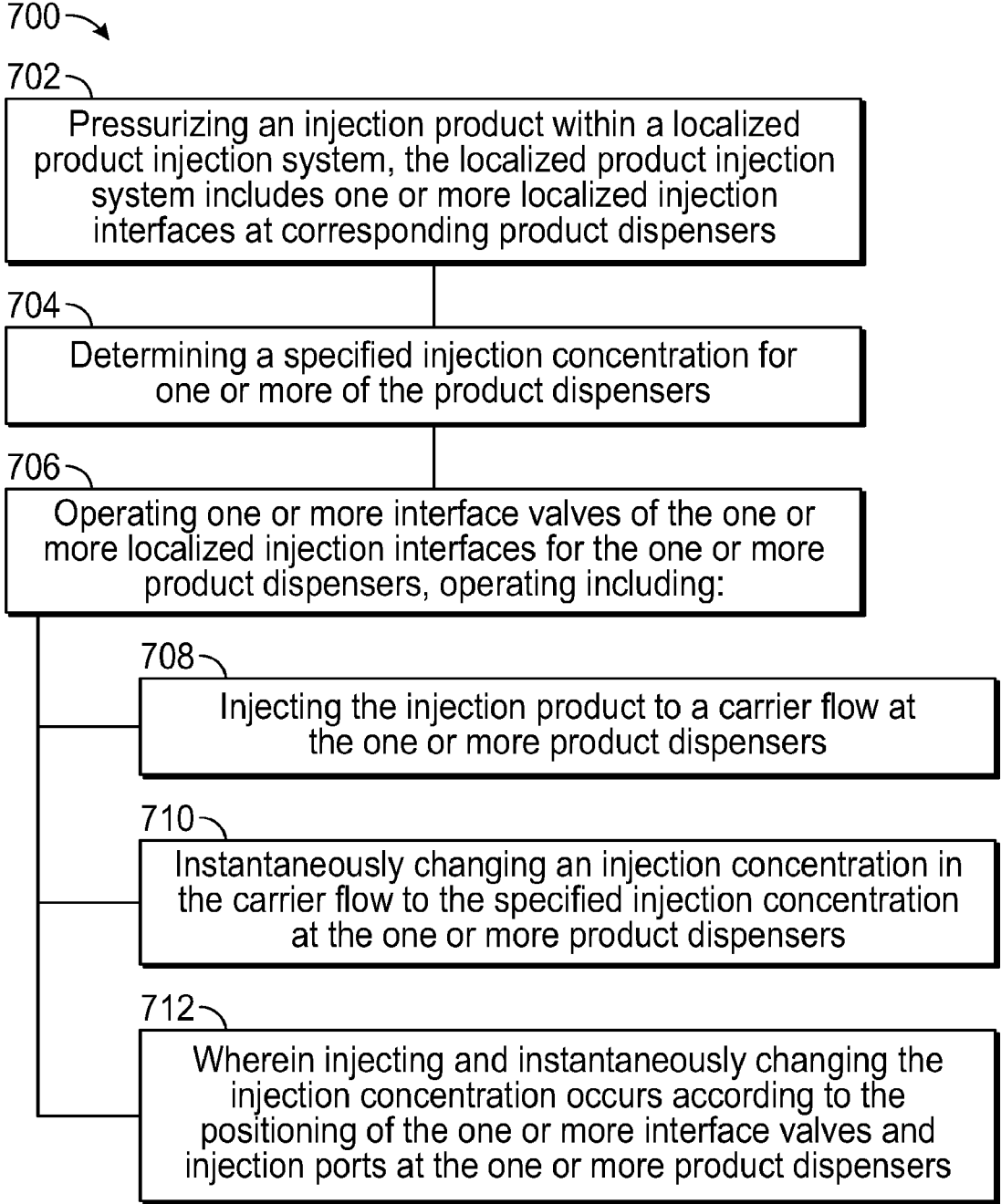

700

702

Pressurizing an injection product within a localized product injection system, the localized product injection system includes one or more localized injection interfaces at corresponding product dispensers

704

Determining a specified injection concentration for one or more of the product dispensers

706

Operating one or more interface valves of the one or more localized injection interfaces for the one or more product dispensers, operating including:

708

Injecting the injection product to a carrier flow at the one or more product dispensers

710

Instantaneously changing an injection concentration in the carrier flow to the specified injection concentration at the one or more product dispensers

712

Wherein injecting and instantaneously changing the injection concentration occurs according to the positioning of the one or more interface valves and injection ports at the one or more product dispensers

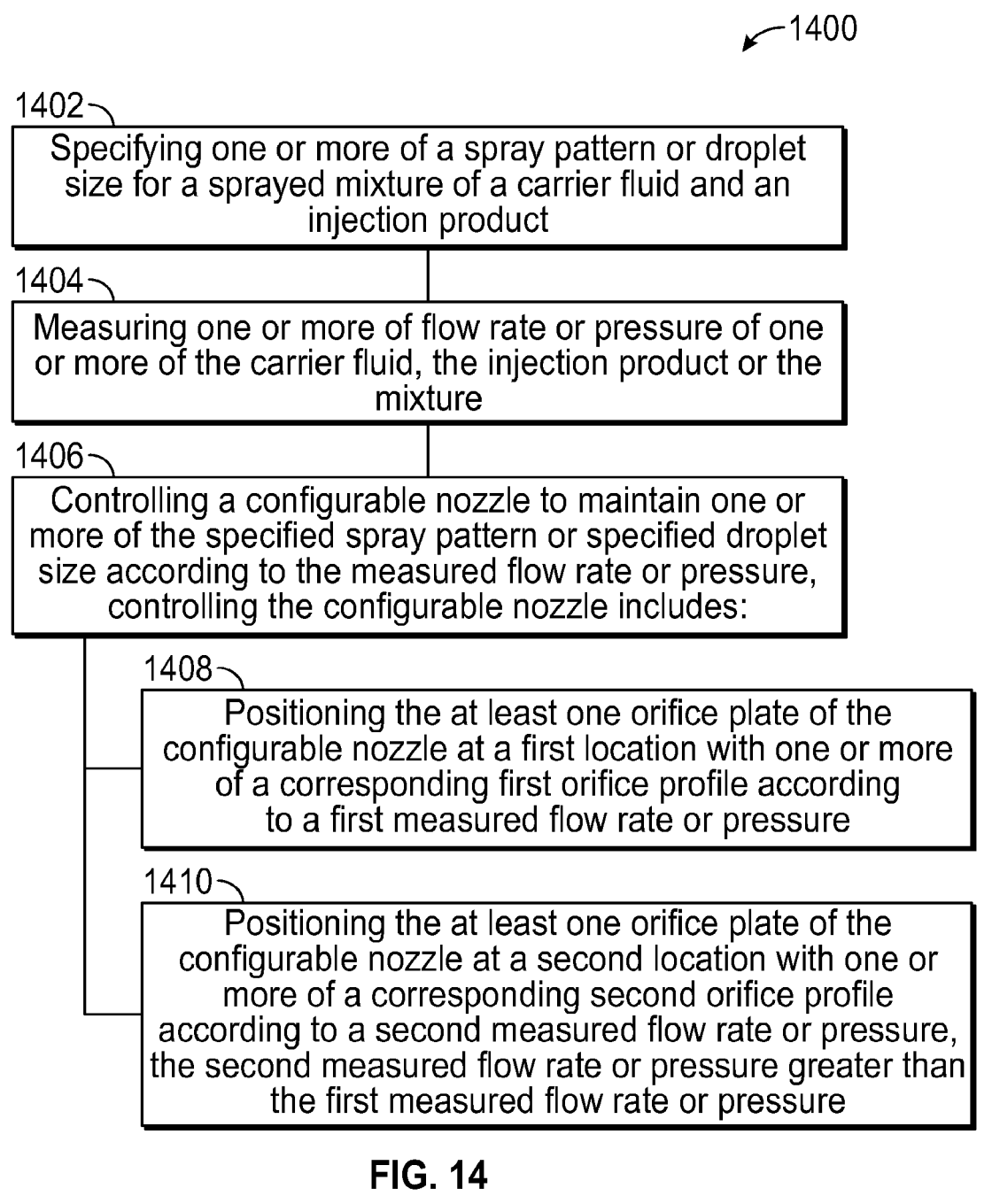

Specifying one or more of a spray pattern or droplet size for a sprayed mixture of a carrier fluid and an injection product

1404

Measuring one or more of flow rate or pressure of one or more of the carrier fluid, the injection product or the mixture

1406

Controlling a configurable nozzle to maintain one or more of the specified spray pattern or specified droplet size according to the measured flow rate or pressure, controlling the configurable nozzle includes:

1408

Positioning the at least one orifice plate of the configurable nozzle at a first location with one or more of a corresponding first orifice profile according to a first measured flow rate or pressure

1410

Positioning the at least one orifice plate of the configurable nozzle at a second location with one or more of a corresponding second orifice profile according to a second measured flow rate or pressure, the second measured flow rate or pressure greater than the first measured flow rate or pressure

FIG. 14

CONFIGURABLE NOZZLE ASSEMBLY AND METHODS OF SAME

CROSS-REFERENCE TO RELATED PATENT DOCUMENTS

This patent application is a continuation of U.S. patent application Ser. No. 16/476,069, filed Jul. 3, 2019, which is a U.S. national stage application filed under 35 U.S.C. § 371 from International Application Serial No. PCT/US2018/012661, which was filed 5 Jan. 2018, and published as WO2018/129376 on 16 Aug. 2018, and which claims the benefit of priority of Kocer et al., U.S. Provisional Patent Application Ser. No. 62/442,905 entitled CONFIGURABLE NOZZLE ASSEMBLY AND METHODS OF SAME, filed on Jan. 5, 2017, which applications are hereby incorporated by reference herein in their entirety.

This patent application is also related to U.S. application Ser. No. 14/300,761, filed on Jun. 10, 2014, entitled LOCALIZED PRODUCT INJECTION SYSTEM FOR AN AGRICULTURAL SPRAYER; incorporated herein by reference.

This patent application is also related to U.S. application Ser. No. 13/832,735 filed on Mar. 15, 2013, entitled MULTI-SECTION APPLICATOR WITH VARIABLE-RATE SECTIONS; incorporated herein by reference.

This patent application is also related to U.S. application Ser. No. 13/832,678 filed on Mar. 15, 2013, entitled REAL TIME INJECTION FOR AGRICULTURAL SPRAYERS; incorporated herein by reference.

This patent application is also related to U.S. Application Ser. No. 61/803,942 filed on Mar. 21, 2013, entitled GEAR FLOW DIVIDER FOR AGRICULTURAL PRODUCT INJECTION; incorporated herein by reference.

COPYRIGHT NOTICE

TECHNICAL FIELD

This document pertains generally, but not by way of limitation, to the sprayed application of products (fluid or gaseous).

BACKGROUND

Agricultural sprayers are used to distribute agricultural products, such as fertilizers, insecticides, herbicides and fungicides to crops. Agricultural sprayers include one or more distribution booms that are long enough (e.g., 60 feet to 150 feet) to spray multiple rows of crops in a single pass. Agricultural fields are often irregular in shape and contain one or more of contour changes, tree lines, hillsides, ponds or streams. Irregular field shapes and contour changes provide challenges in even distribution of agricultural products and can lead to waste of agricultural products. Additionally, the configuration of the agricultural sprayer itself may cause unpredictable variation in application of agricultural products.

Agricultural sprayers include a reservoir for a carrier substance. The reservoir is in communication, by way of a header tube or pipe, with a plurality of sections provided along one or more carrier booms (e.g., boom tubes). The header is the main line extending between the reservoir and the carrier booms. Each of the plurality of sections includes multiple sprayer nozzles that distribute the carrier substance received by the section. The carrier substance is used as a vehicle to carry and distribute one or more injection products dispersed into the carrier substance, for instance herbicides, pesticides, fertilizers or the like.

In one example, the injection product is retained in a reservoir separate from the reservoir for the carrier substance. The injection product is pumped from the reservoir and delivered from the reservoir to the header of the carrier substance. In some examples, an inline mixer (e.g., a static mixer) mixes the injected chemical with the carrier substance upstream from or within the header. The header then delivers the mixture to the boom tubes, and the mixture is distributed to the sections and finally the nozzles associated with each of the sections.

OVERVIEW

The present inventors have recognized, among other things, that a problem to be solved can include providing a spray of a carrier fluid and injection product mixture with one or more of a specified spray pattern, droplet size or the like while one or more flow rates and fluid pressures of a sprayer vary. For instance, at lower pressures or lower flow rates of the applied mixture a static nozzle provides a different spray pattern and droplet size (smaller pattern and larger droplets, respectively) than with higher pressures. In another example, with higher pressures or flow rates the mixture is applied through a static nozzle having a different spray pattern (potentially larger or differently shaped) and droplet size (smaller droplets). Variations in the spray pattern or droplet size are, with at least some applied mixtures, less than ideal to ensure coverage, effective application and treatment or the like.

In an example, the present subject matter can provide a solution to this problem, such as by providing a nozzle assembly having a configurable nozzle that is adaptively reconfigured to provide one or more of a specified spray pattern, droplet size or the like. In one example, one or more orifice plates of the nozzle assembly are moved to change the shape and size of the nozzle orifice. The change in shape or size controls the spray pattern and the droplet size. For instance, where a particular spray pattern or droplet size is specified, the orifice plates are moved until the specified pattern or droplet size are achieved.

In another example, one or more of the flow rates of the carrier fluid or the injection product are changed or the pressure of the applied mixture changes. If one or more of a spray pattern and droplet size are specified for the applied mixture across varied flow rates or pressures the orifice plates are dynamically controlled (e.g., maintained, moved or the like) to control the nozzle orifice (one or more of the size or shape) to provide the specified spray pattern and droplet size. The configurable nozzle assembly described herein is thereby also used with fluid application systems that vary one or more of flow rates, application pressures or the like at one or more nozzles (e.g., to vary application during turning, according to specified application prescriptions mapped to zones of a field or the like) to provide specified spray patterns and droplet sizes even with variations in pressures and flow rates. Accordingly a fluid application system including the configurable nozzle assemblies dynamically controls one or more of the orifice size or shape to provide a specified spray pattern or droplet size even with variations of the applied mixture (e.g., a carrier fluid mixed with one or more injection products).

In some examples described herein a localized injection interface is coupled with a nozzle assembly and dynamically controls the flow of an injection product into a carrier fluid. The injection product and carrier fluid are mixed at the nozzle assembly and applied instantaneously (including near instantaneously) through the nozzle assembly. Characteristics about the injection product and the carrier fluid (e.g., flow rates, pressures or the like) are in one example used by an injection control module in communication with an electronic control unit of the configurable nozzle assembly to control (maintain, change or the like) the nozzle orifice and thereby provide a specified spray pattern or droplet size even with changes in flow rates or pressures.

This overview is intended to provide an overview of subject matter of the present patent application. It is not intended to provide an exclusive or exhaustive explanation of the invention. The detailed description is included to provide further information about the present patent application.

BRIEF DESCRIPTION OF DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 is a schematic view of one example of an injection control module of a localized product injection system.

FIG. 7 is a block diagram showing one example of a method for using a localized product injection system.

FIG. 14 is a block diagram showing one example of a method for controlling a configurable nozzle.

DETAILED DESCRIPTION

Figure 1A:
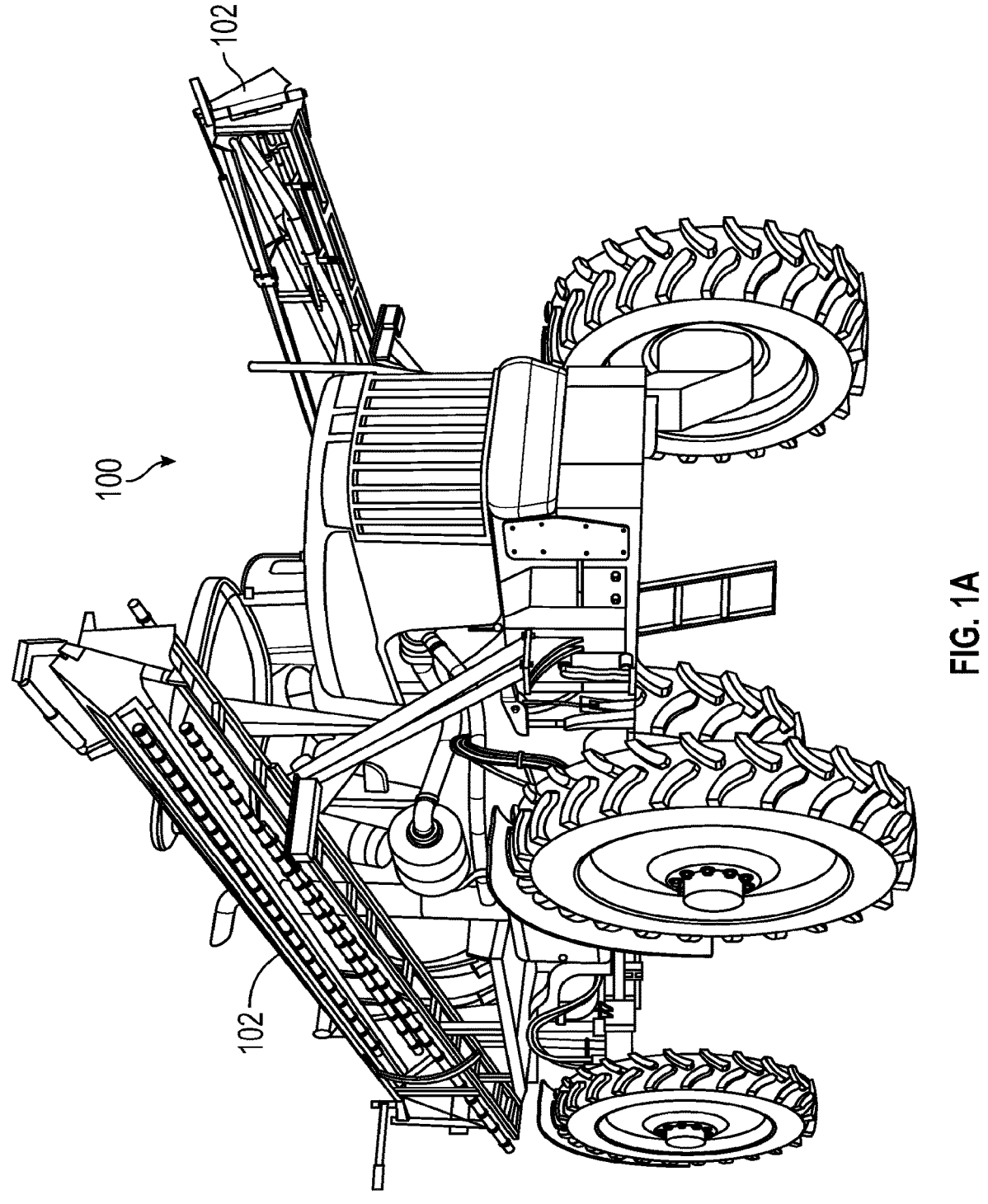
FIG. 1A is a perspective view of one example of an agricultural sprayer.

FIG. 1A shows one example of a sprayer 100. As shown, sprayer 100 is a vehicle based sprayer including an agricultural product dispensing system carried by the vehicle. In another example, the sprayer 100 includes, but is not limited to, a trailer housed sprayer configured for coupling with a vehicle, such as a tractor or the like. As shown in FIG. 1A, the sprayer 100 includes at least two sprayer booms 102. The sprayer booms 102 shown in FIG. 1A are in a stowed configuration, for instance during transport of the sprayer 100 into a field. The sprayer is configured to apply one or more agricultural products including, but not limited to, fertilizers, herbicides, pesticides or the like. The sprayer 100 applies the agricultural product in a liquid form, for instance through one or more nozzle assemblies positioned along the sprayer boom 102 according to the spacing of rows of agricultural crops. As will be described herein, the sprayer 100 applies the agricultural product by mixing an injection product with a carrier fluid to achieve a desired concentration of the injection product (a fertilizer, herbicide, pesticide or the like) within the carrier fluid. In another example, the injection product includes a plurality of injection products, for instance injected separately by way of differing injection systems or injected as a common mixture of fluids (e.g., from a mixed injection reservoir) into the product dispensers including one or more of the boom sections and nozzle assemblies of the sprayer booms 102.

As will be described herein, an agricultural product is provided in a localized manner to each of the product dispensers whether boom sections or nozzles to provide individualized control of application of the agricultural product. Further, the instantaneous injection of the injection product locally to the carrier fluid stream prior to the product dispensers (boom sections, nozzle assemblies or the like) ensures lag time between a desired change in concentration of the injection product and the corresponding application of the adjusted agricultural product is minimized (e.g., negligible lag time or allows for near instant injection and dispensing of the resulting agricultural product). In contrast, other systems mix the injection product upstream from the product dispensers, for instance within the carrier fluid reservoir or at an interchange near a header pump for the carrier fluid. These systems have lag between the interchange and the product dispensers and further preclude the individualized control of the agricultural product (e.g., injection concentration) at the product dispensers. Stated another way, a localized product injection system as described herein provides a pressurized environment for the injection product at the one or more product dispensers (e.g., locally) for instance the boom sections, nozzles, nozzle assemblies or the like. Accordingly, the injection product is provided under pressure to the carrier fluid at the product dispensers immediately prior to application to an agricultural crop.

Figure 1B:
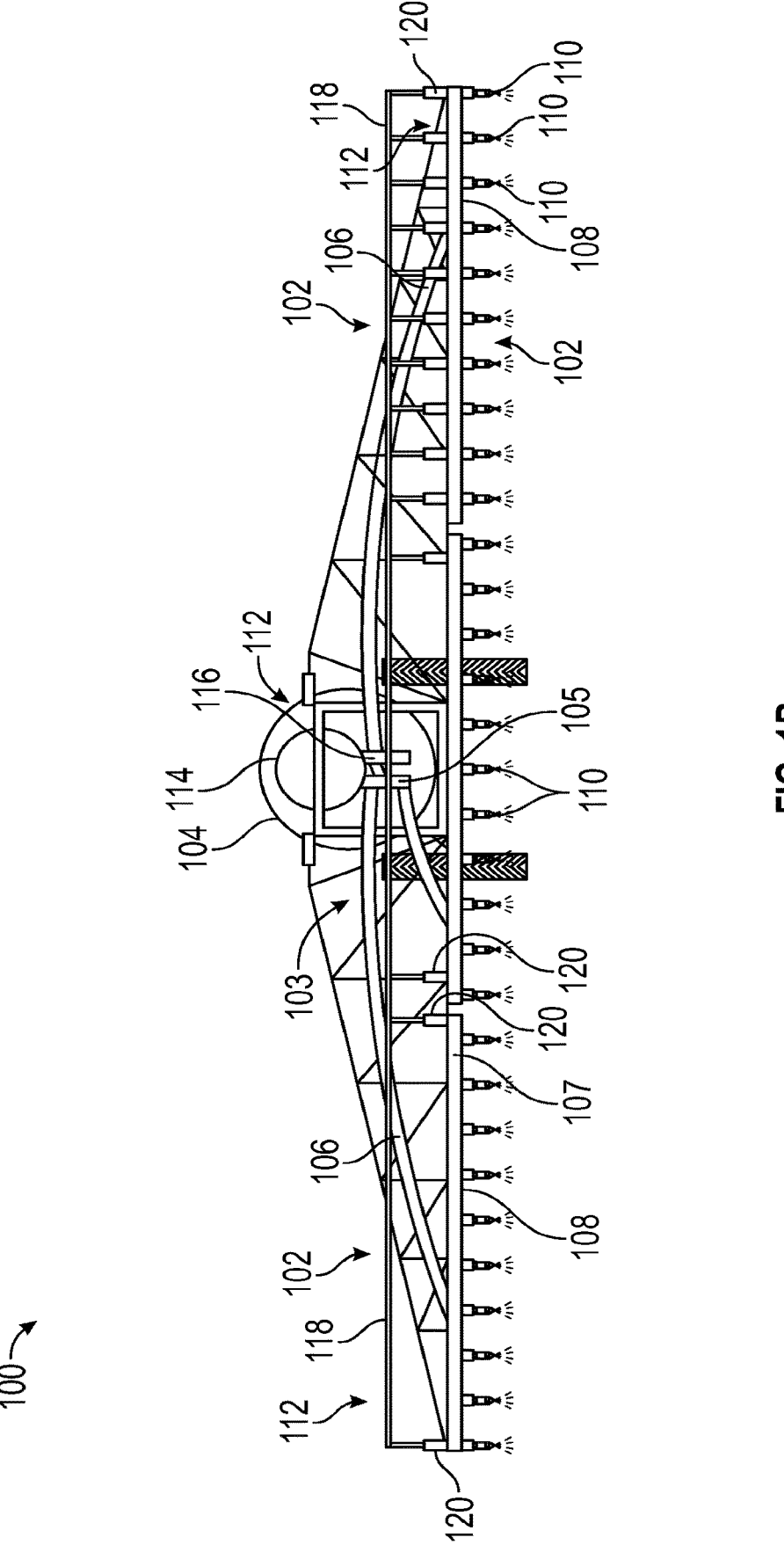
FIG. 1B is a schematic view of one example of an agricultural sprayer including a localized product injection system.

Referring now to FIG. 1B, a schematic representation of the sprayer 100 shown in FIG. 1A is provided. In this example the sprayer booms 102 are in a deployed configuration, for instance extending away from the vehicle 100 shown in FIG. 1A. As shown, the sprayer 100 includes a carrier system 103 including a carrier reservoir 104 positioned centrally within the vehicle or tender. The carrier reservoir 104 includes a carrier fluid therein, for instance water or the like. In another example, the carrier reservoir 104 includes a carrier fluid such as water mixed with an initial carrier product (e.g., a mixed carrier formulation). The carrier fluid in such an example includes, but is not limited to, a primary fertilizer, a primary chemical or water base and fertilizer mixture, spray adjuvant, surfactant or the like.

The carrier fluid is distributed from the carrier reservoir by way of a header 105 coupled with one or more boom tubes 106. The boom tubes 106 extend along the sprayer booms 102 as shown in FIG. 1B and correspondingly transport the carrier fluid the length of the sprayer booms. As further shown in FIG. 1B, the boom tubes 106 are in communication with one or more corresponding boom sections 108. The boom sections 108 are positioned along the sprayer booms 102 and each provide a plurality of nozzle assemblies 110. As will be described herein, the product dispensers 107 include, but are not limited to, one or more of the boom sections 108, the nozzle assemblies 110 or a combination of both. Carrier fluid is accordingly distributed from the carrier reservoir 104 through the header 105 into the boom tubes 106. The carrier fluid is then carried from the boom tubes 106 to one or more boom sections 108 and the associated nozzle assemblies 110 for application of the carrier fluid (mixed with the injection product as described herein) to the agricultural crops.

The localized product injection system 112 is also shown schematically in two different formats in FIG. 1B. In each of the formats the localized product injection system 112 includes an injection product input, such as an injection product reservoir 114, separate from the carrier reservoir 104. The injection product reservoir 114 includes a volume of the injection product therein (concentrated fertilizer, herbicide, pesticide or the like). The injection product reservoir 114 feeds into an injection header 116 which is in communication with one or more injection boom tubes 118 extending along the sprayer booms 102.

In one example, shown in FIG. 1B the injection boom tubes 118 are coupled with the product dispensers 107 (the boom sections 108) by one or more injection interfaces 120. For instance at the left side of FIG. 1B the injection interfaces 120 are provided at opposed ends of the boom section 108. In another example, the injection interfaces 120 are provided at a single or multiple locations along the boom section 108. The injection product is distributed to the boom section 108 through the injection interfaces 120. As will be described herein in one example the injection interfaces 120 include at least one throttling element, such as a control valve or pump configured to vary the flow of the injection product into the product dispenser 107 (in this case the boom section 108) for mixing with the carrier fluid prior to application. Additionally, in the examples described herein a reference to a control valve or pump is considered broadly to also include other throttling elements. For instance, the recitation of a pump or control valve each include the other (e.g., control valve or pump).

The second format of the localized product injection system 112 is also shown in the FIG. 1B schematic view. In this example the injection interfaces 120 are coupled with the nozzle assemblies 110 of one or more boom sections 108. For instance, as shown at the right portion of the sprayer 100 the injection interfaces 120 are provided at each of the nozzle assemblies 110. For instance the injection interfaces 120 provide individualized injection of the injection product to each of the nozzle assemblies 110. In contrast to injection to the boom sections 108 and corresponding individualized control of the injection product concentration in the boom sections, the injection interfaces 120 at the nozzle assemblies 110 provide individualized control of the concentration of the injection product at each of the nozzle assemblies 110. Accordingly, the controlled injection of the injection product by the injection interfaces allows for individualized control of the product dispensers, including individualized control of one or more of the boom sections 108 or the nozzle assemblies 110.

As further shown in FIG. 1B, the localized product injection system 112 provides a pressurized environment for the injection product at the injection interfaces 120 (whether the injection interfaces are at the boom section 108 or nozzle assemblies 110). That is to say, the injection product is maintained at a pressure for immediate injection into the carrier fluid of the carrier system 103 at the local injection interfaces 120 immediately prior to application of the resulting agricultural product through the product dispensers 107. Accordingly, there is no appreciable lag time between the injection of the injection product to the carrier fluid and application of the resulting agricultural product (including the carrier fluid and the injection product) to the agricultural crop. Additionally, the injection product is immediately mixed with the carrier fluid to the specified concentration, for instance with a static mixer, by virtue of the jet of the injection product into the carrier fluid stream from the injection interfaces 120 or the like. Specified concentration of the injection product is achieved at the product dispensers 107 according to an individualized concentration determination (e.g., with an automated controller) for each corresponding injection interface 120. Accordingly, the sprayer 100 shown in FIG. 1B including the localized product injection system 112 is able to individually control the content of the agricultural product (for instance the concentration of the injection product within the carrier fluid) at each of the injection interfaces 120 and the corresponding product dispensers 107. In the example where the injection interface 120 incudes a boom section 108 the sprayer 100 is thereby able to control the concentration of the injection product at each of the boom sections 108. In another format where the injection interfaces 120 are associated with each of the nozzle assemblies 110 each of the injection interfaces 120 are individually controlled to accordingly provide a desired concentration of the injection product at each of the nozzle assemblies 110.

The injected product is optionally used as a supplemental chemical with mixed carrier formulations for spot treatment in areas of the field where mixed carrier formulation is not sufficient to achieve the desired results (e.g., control of weeds, pests, or yield). In one prophetic example, an operator applies a primary herbicide (Monsanto brand Roundup®) from the carrier reservoir 104. The herbicide is mixed with water and a spray adjuvant in the carrier reservoir 104 for general application to the field for corresponding general weed control. The operator (or field map) is aware that the primary herbicide alone will not control certain weeds at certain areas of the field (e.g., because of resistance to the primary herbicide) and accordingly indexes locations for specified injections of the injection product. The operator uses a supplemental herbicide as an injection product in the injection product reservoir 114 (such as DuPont brand Assure®) to control weeds in those areas in addition to the mixed carrier formulation. Accordingly and as described herein, when the specified areas of the field are reached by the sprayer (e.g., the corresponding one or more product dispensers 107) the injection product including the supplemental herbicide is injected into the corresponding product dispensers 107 and the areas are sprayed with both primary and secondary herbicides. As the product dispensers move out of the designated areas (e.g., the injection product is no longer specified or specified at a differing concentration) the injection product is injected at a different concentration or shut off from injection to the carrier fluid.

Additionally, the injection product is provided from each of the injection interfaces 120 irrespective of the flow rate of the carrier fluid within the carrier system 103 (e.g., at high or low flow of the carrier fluid). For instance, in a low flow condition only a moderate or small amount of the agricultural product is applied to the agricultural crop corresponding to a low flow of the carrier fluid from carrier system 103. Because of the low flow rate of the carrier fluid in other systems an upstream added injection product has significant residence time and corresponding lag time in the system prior to application at a desired concentration. Stated another way, the lag time already present between addition of the injection product to the carrier fluid at the upstream and its actual application through a product dispenser is increased because of the minimized flow of the carrier fluid. In the sprayer 100 described herein having injection of the injection product locally at the product dispensers 107 the lag time is effectively eliminated (including substantially reduced). Instead, the localized product injection system 112 provides an immediate or instantaneous injection of the injection product at the injection interfaces 120 to the product dispensers 107 immediately prior to the application of the resulting agricultural product.

Figure 2A:
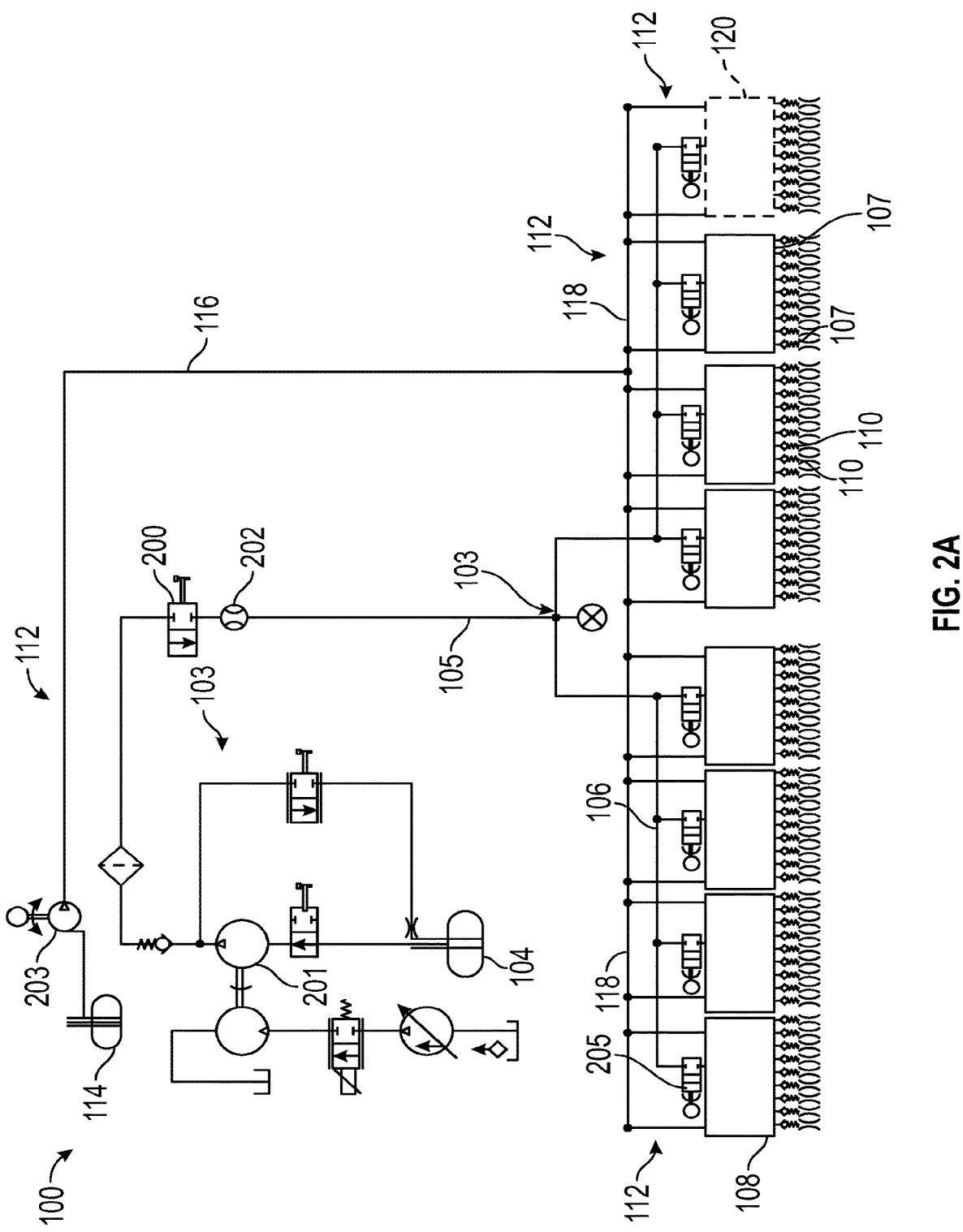
FIG. 2A is a schematic view of an agricultural sprayer including one example of a localized product injection system.

FIG. 2A shows a detailed example of a sprayer 100 including the localized product injection system 112. In the example shown in FIG. 2A the localized product injection system 112 is in the boom section format. For instance, the injection interfaces 120 are coupled with one or more boom sections 108 along the sprayer booms 102 and boom tubes 106 shown in FIG. 1B. The carrier system 103 is shown again in FIG. 2A and includes the carrier reservoir 104. As shown in FIG. 2A the carrier reservoir 104 communicates with the product pump 201 that pressurizes the carrier fluid and delivers it within the header 105 (also shown in FIG. 2A). In one example the carrier system 103 includes a carrier flow control valve 200 and a flow meter 202. The flow meter 202 cooperates with the carrier flow control valve 200 (e.g., with an intervening controller) to measure the output flow from the carrier reservoir 104 (produced by the product pump 201) and to facilitate actuating of the carrier flow control valve 200 to achieve the desired flow rate of carrier fluid to the plurality of boom sections 108 described herein. As further shown in FIG. 2A the header 105 extends to the boom tubes 106 extending to the left and right of the header 105. Each of the boom tubes 106 in turn feeds into a plurality of boom sections 108 and the boom sections 108 each have corresponding nozzle assemblies 110. Optionally, section valves 205 are interposed between each boom section 108 and the corresponding boom tubes 106. The sections valves 205 facilitate control of the carrier fluid flow to each of the boom sections 108.

As described herein and shown in the example provided in FIG. 2A, the product dispensers 107 include the boom sections 108. That is to say, the injection interfaces 120 are coupled with the boom sections 108 and thereby provide individualized control of the injection product to each of the boom sections 108 relative to the other boom sections.

Referring again to FIG. 2A, the localized product injection system 112 previously described and shown in FIG. 1B is shown in further detail. In this example, the injection product reservoir 114 communicates with an injection pump 203. The injection pump 203 delivers the injection fluid from the reservoir 114 to an injection header 116. The injection header 116 delivers the injection product to one or more injection boom tubes 118 extending to the left and right and shown in FIG. 2A. The injection boom tubes 118 distribute the injection product to a plurality of injection interfaces 120. As previously described, the injection interfaces 120 in the example shown in FIG. 2A deliver the injection product directly to each of the product dispensers 107 (e.g., the boom sections 108).

As shown in FIG. 2A the localized product injection system 112 is isolated from the carrier system 103 until localized introduction of the injection product at the injection interfaces 120. Accordingly, the localized product injection system 112 is able to maintain a pressurized environment for the injection product to the injection interfaces 120 (e.g., with the injection pump 203). At the injection interfaces 120 the pressurized injection product is delivered to each of the product dispensers 107 as determined, for instance, by a controller module described herein. Even in low flow situations with a low flow of carrier fluid, metered by the flow meter 202 and the carrier flow control valve 200, the injection product is provided in a pressurized manner and is thereby ready for instantaneous delivery to one or more of the boom sections 108. Accordingly, individualized and instantaneous control of the injection product (e.g., the concentration of the injection product) is achieved for each of the product dispensers 107 including the boom sections 108. The injection product is provided from the injection interfaces 120 locally relative to the boom sections and remote from the upstream carrier reservoir 104.

Figure 2B:
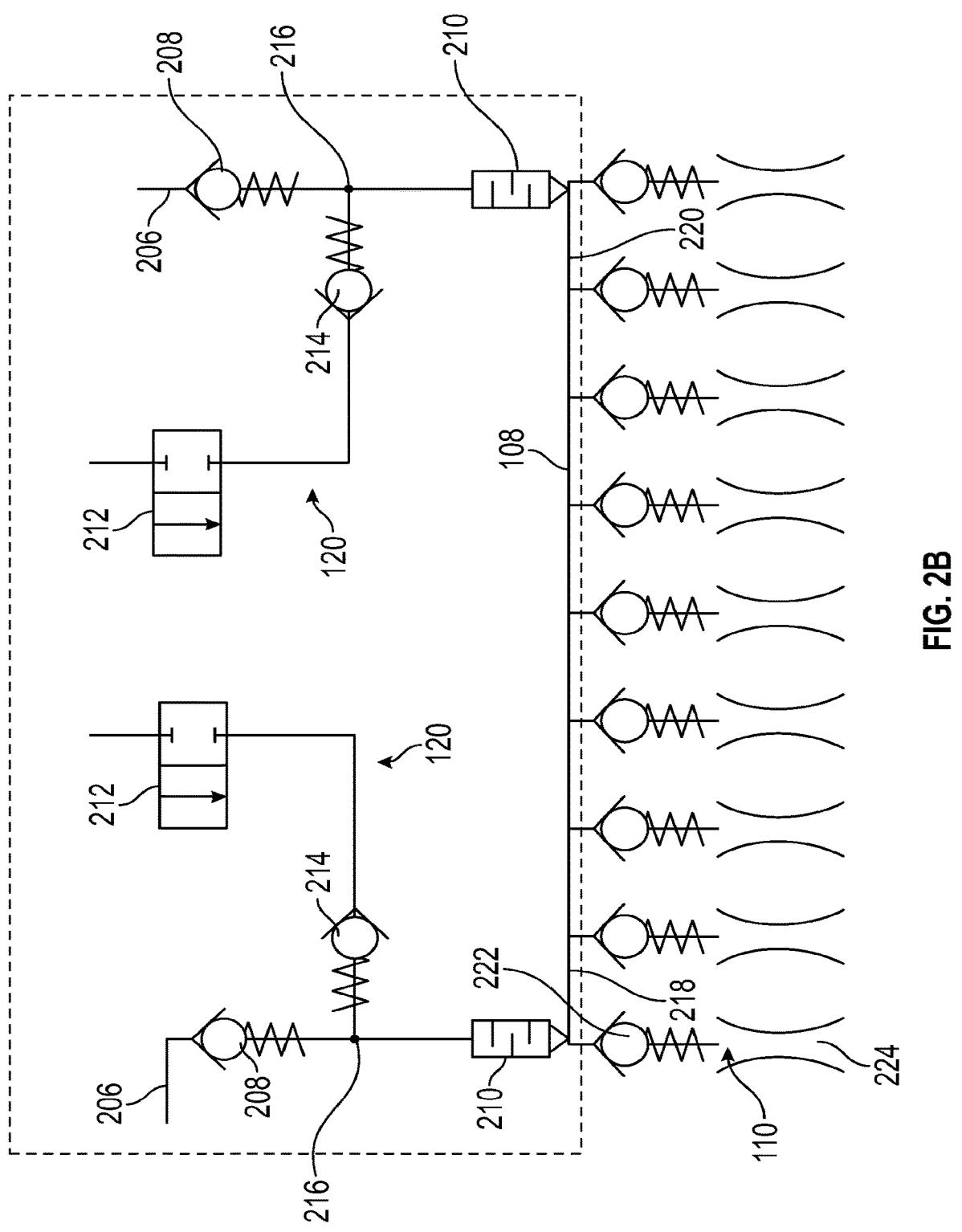
FIG. 2B is a detailed schematic view of one example of a localized injection interface in communication with a sprayer section of FIG. 2A.

Referring now to FIG. 2B, a detailed view of one of the boom sections 108 shown in FIG. 2A is provided. The boom section 108 extends from left to right on the page and includes a plurality of nozzle assemblies 110. In one example, the nozzle assemblies 110 each include a nozzle check valve 222 and a corresponding nozzle 224 (e.g., an atomizer nozzle, stream nozzle or the like). In the example shown in FIG. 2B nine nozzle assemblies 110 are provided in a spaced configuration along the boom section 108. Carrier lines 206 (e.g., carrier fluid inputs, carrier fluid fittings or the like) introduce carrier fluid to each of boom section first and second ends 218, 220. In one example each of the carrier lines 206 includes a check valve 208 and a mixer 210 such as a static mixer.

The localized product injection system 112 shown in FIG. 2B includes the injection interfaces 120. In the example shown in FIG. 2B, an injection interface 120 is associated with each of the carrier lines 206 (the carrier lines extending from the boom tube 106 of the carrier system 103 to the boom section 108). Each of the injection interfaces 120 delivers injection product (e.g., from an injection product input, such as an injection product fitting described herein) to the associated carrier line 206 in communication with the boom section first and second ends 218, 220.

In one example, the injection interfaces 120 include interface valves 212 in series with check valves 214. In one example the interface valves 212 include pulse width modulation valves or other control valves configured to provide a metered flow of the pressurized injection product through the injection interfaces 120 to injection ports 216 in communication with each of the carrier lines 206. In one example the actuation of the interface valves 212, for instance to a desired flow rate, delivers the designated amount of injection product to each of the corresponding carrier lines 206 at the injection ports 216. The solution of the carrier fluid and the injection product is delivered through the mixers 210 and mixed prior to delivery to the boom section 108. The mixed solution of the carrier fluid and the injection product (the agricultural product) is thereafter delivered from the boom section first and second ends 218, 220 throughout the boom section 108 and to each of the nozzle assemblies 110. Accordingly, each of the nozzle assemblies 110 associated with a particular boom section 108 delivers substantially the same agricultural product having the same injection product concentration. The injection interfaces 120 associated with the boom section 108 are operated independently relative to other injection interfaces 120 associated with other boom sections 108 of the sprayer 100. Accordingly individualized control and instantaneous delivery of the injection product to each of the boom sections 108 (e.g., with little to no lag time) is achieved for each of the boom sections 108. In another example, the injection ports 216 are downstream of the mixer 210. For instance, the injections ports 216 are interposed between the injection interfaces (optionally including the carrier line) and the product dispenser (e.g., the boom section 108 or nozzle assembly 110).

Figure 3A:
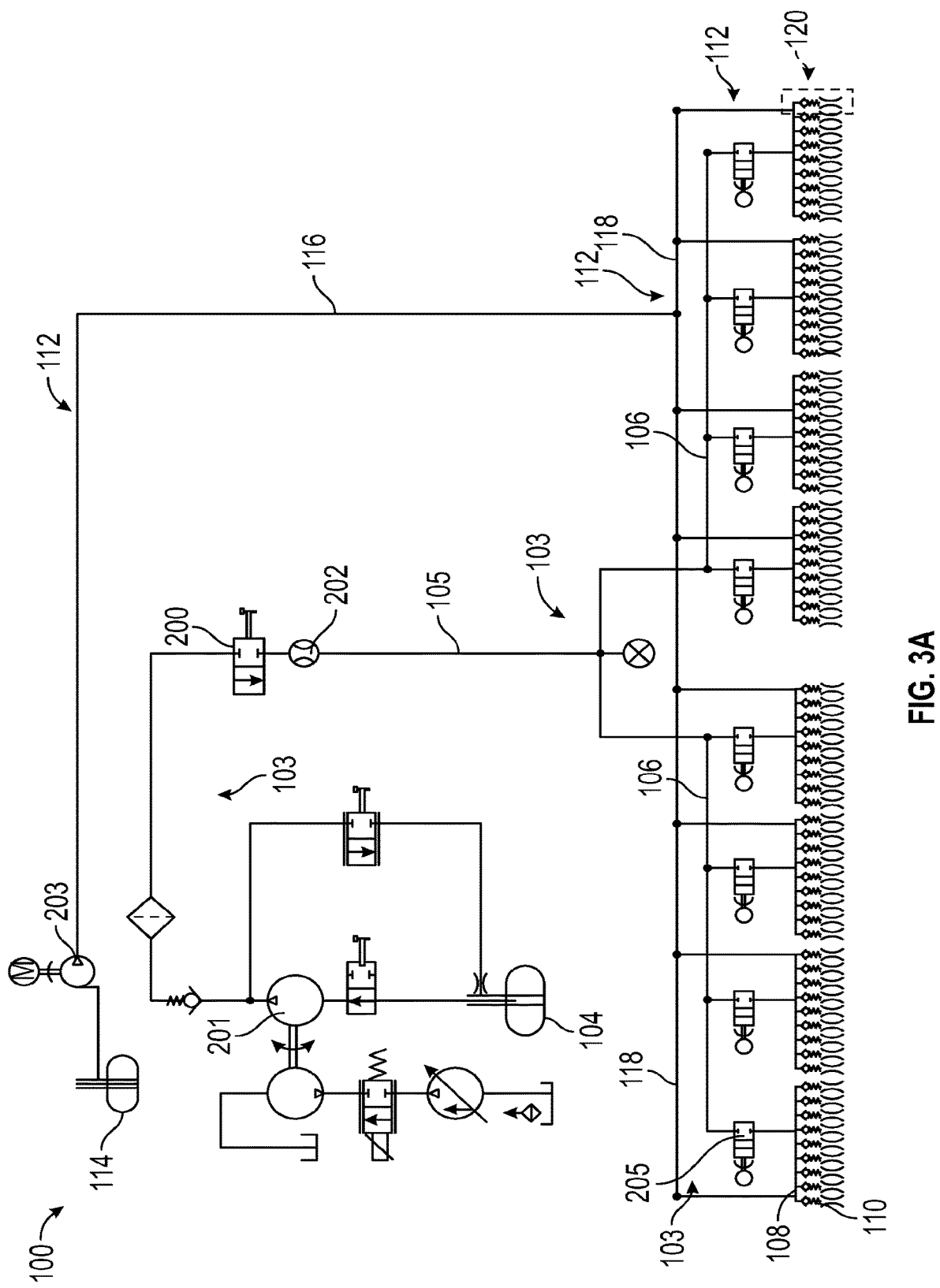
FIG. 3A is a schematic view of an agricultural sprayer including another example of a localized product injection system.
Figure 3B:
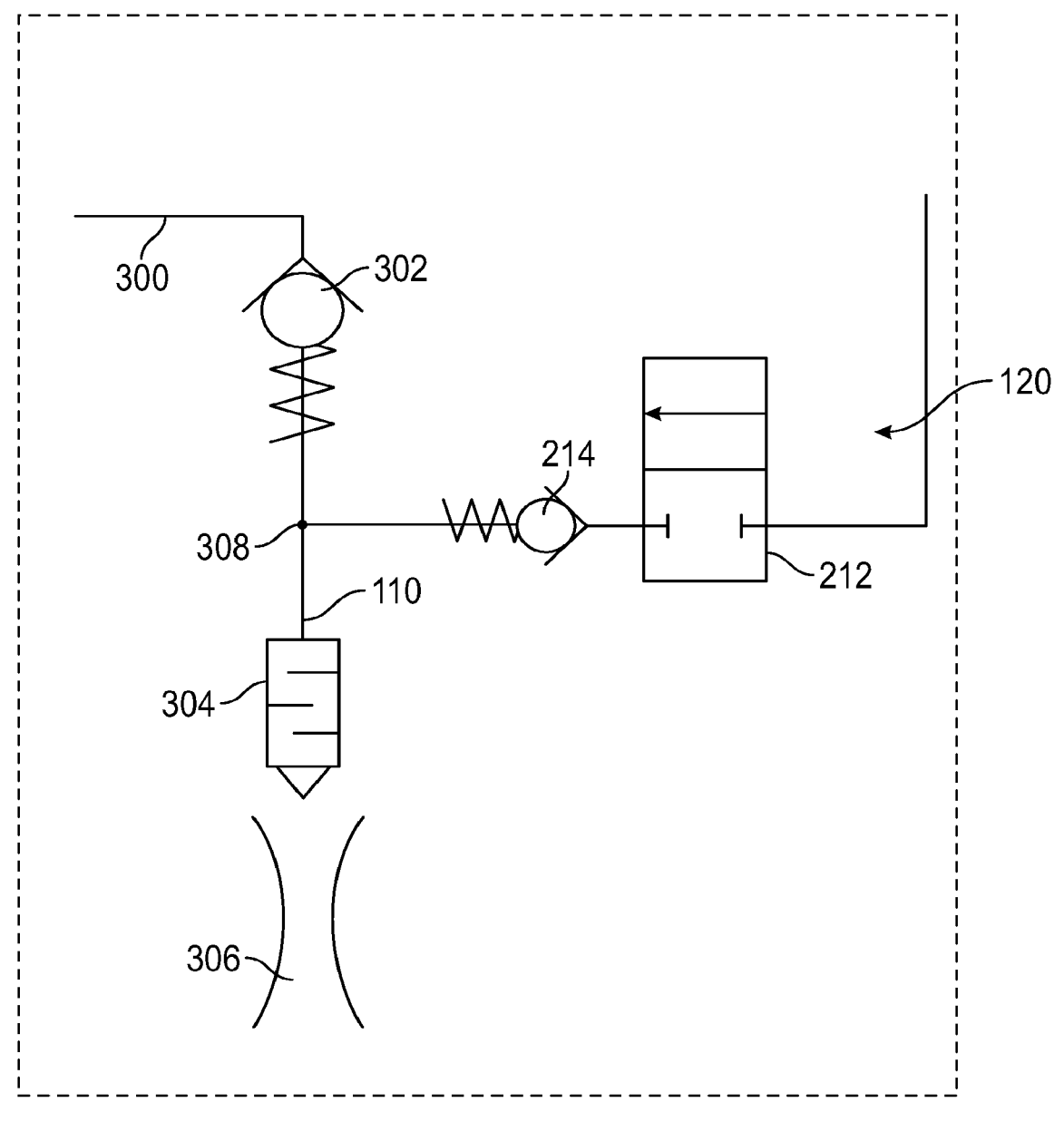
FIG. 3B is a detailed schematic view of another example of a localized injection interface in communication with a sprayer nozzle of FIG. 3A.

FIG. 3A shows another example of the sprayer 100. The example shown in FIG. 3A is similar in at least some regards to the sprayer 100 previously shown and described in FIGS. 2A and 2B. For instance, the sprayer 100 shown in FIGS. 3A and 3B includes an isolated localized product injection system 112 that is separate from the corresponding carrier system 103. As previously described herein, the localized product injection system 112 delivers an injection product from the injection product reservoir 114 to a plurality of boom sections 108. As shown in FIG. 3A and further shown in FIG. 3B, the injection interfaces 120 are each in communication with corresponding nozzle assemblies 110. Stated another way, the product dispensers 107 in the example shown in FIGS. 3A and 3B are the nozzle assemblies 110. Accordingly individualized control and instantaneous injection of the injection product are provided at each of the nozzle assemblies 110. Each of the injection interfaces 120, for instance along the length of the sprayer booms 102, are independently controlled according to determined concentrations of the injection product within the carrier fluid. The dispensed agricultural product from each of the nozzle assemblies thereby has a varying concentration of the injection product based on the independent control of the concentration provided by the injection interfaces 120.

Referring now to FIG. 3B, another example of the injection interface 120 is provided. For instance, as shown in FIG. 3B the injection interface 120 includes an interface valve 212 and a check valve 214 similar in at least some regards to the interface valve and check valves previously described and shown in FIG. 2B. In contrast to the previously described example, the injection interface 120 in this example includes an injection port 308 provided at the nozzle assembly 110 and downstream from a carrier line 300 (e.g., carrier fluid input, carrier fluid fitting or the like) communicating with the boom section 108 or boom tube 106. The nozzle assembly 110 includes a check valve 302 and an in-line mixer 304 (e.g., a static mixer). The nozzle assembly 110 further includes a nozzle 306, such as an atomizer or stream nozzle in communication with the mixer 304. As shown in FIG. 3B, the injection port 308 is coupled with the nozzle assembly 110, for instance the injection port is interposed between the check valve 302 and the mixer 304. In another example, the injection port 308 is downstream of the mixer 340. For instance, the injections port 308 is interposed between the injection interfaces 12 (optionally including the carrier line 300) and the product dispenser (e.g., the nozzle assembly 110 or the boom section 108).

In operation, the injection product is delivered through the injection boom tubes 118 to each of the injection interfaces 120, for instance through an injection product input, such as an injection product fitting described herein. The interface valve 212 meters the amount of injection product delivered to the corresponding nozzle assembly 110. For instance, the injection product is independently metered for each of the injection interfaces 120 according to control signals from a controller associated with each of the injection interfaces 120. The controller is configured to control each of the injection interfaces independently or in one or more groups or arrays. The injection product is delivered from the interface valve 212 through the check valve 214 and into the nozzle assembly 110 through the injection port 308. Prior to delivery through the nozzle 306 the injection product in combination with the carrier fluid is optionally mixed within the mixer 304 and thereafter delivered through the nozzle 306 as the agricultural product having the specified concentration of the injection product.

Figure 4:
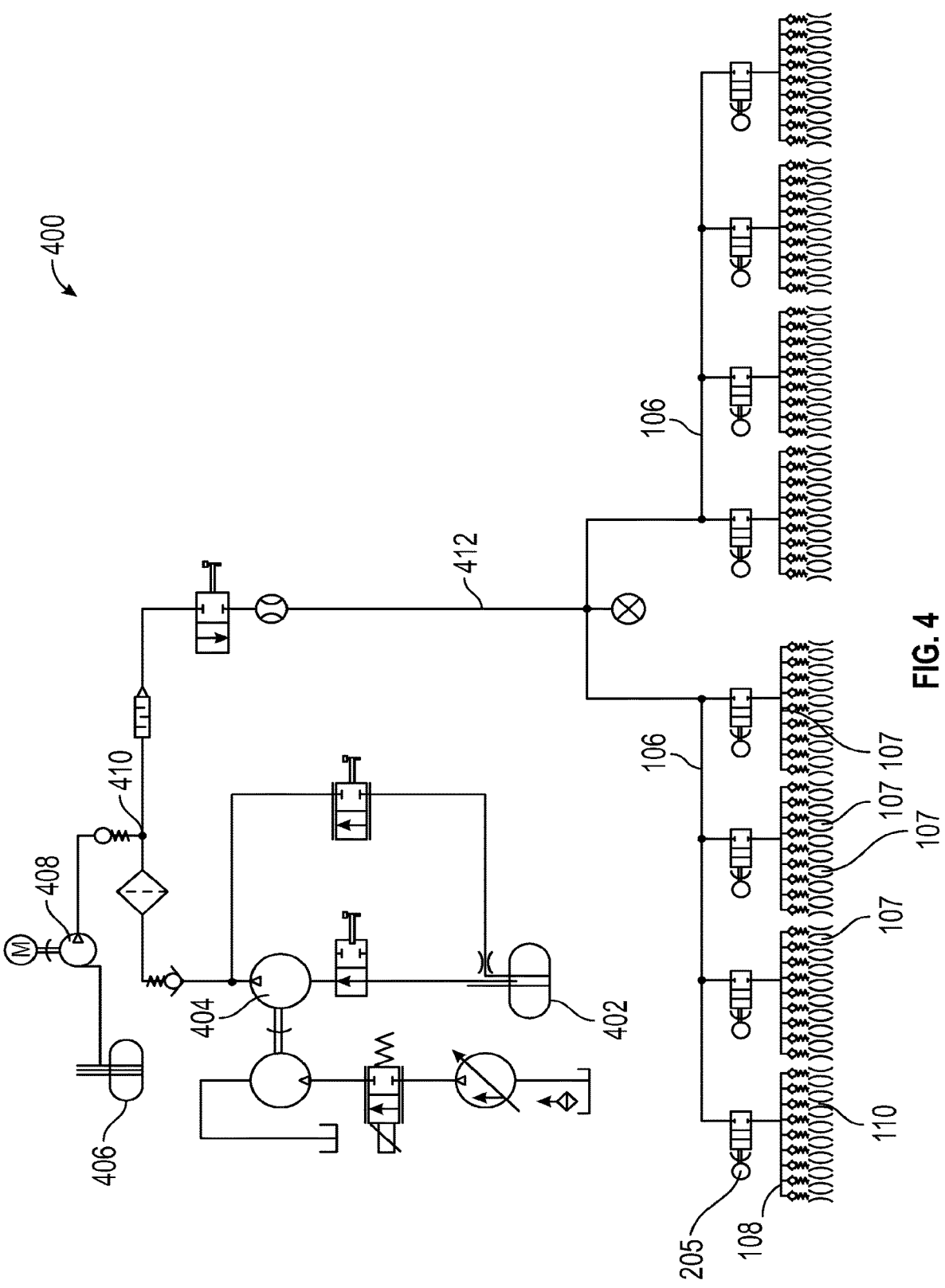
FIG. 4 is a schematic view of another example of an agricultural sprayer.

In a similar manner to the localized product injection system 112 shown in FIGS. 2A and 2B the localized product injection system 112 shown in FIGS. 3A and 3B is configured to provide an instantaneous addition of an injection product to the carrier fluid stream immediately prior to its dispensing through the nozzle 306 (e.g., local to the product dispenser 107). Accordingly, instantaneous changes in concentration of the injection product in an agricultural product, for instance for differing parts of a field, are achieved on an as-needed basis as the sprayer 100 moves through the field with little to no lag time. FIG. 4 shows another example of a sprayer 400. The sprayer 400 shown in FIG. 4 includes a consolidated system having the injection product reservoir 406 and the injection pump 408 feeding into an injection port 410 of a header 412 of the sprayer 400. For instance, the carrier fluid is pumped from a carrier reservoir 402 by a carrier pump 404 and supplemented with the injection product at the injection port 410 (e.g., by the injection pump 408). In one example, a mixer is provided downstream from the injection port 410 for mixing the injection product with the carrier fluid prior to delivery through the header 412 to the boom tubes 406, the boom sections 108 and the nozzle assemblies 110.

As shown in FIG. 4, the injection product is provided to the flow of carrier fluid upstream from the nozzle assemblies 110 and the boom sections 108. Accordingly, there is significant lag time from the time of introduction of the injection product to the carrier fluid and eventual distribution of the agricultural product including the injection product therein from the nozzle assemblies 110. Additionally, beyond the lag time each of the nozzle assemblies 110 and the boom sections 108 (the product dispensers 107) delivers an identical concentration of the injection product within the agricultural product across the sprayer 400. Accordingly, the sprayer 400 does not provide independent control or instantaneous introduction of the injection product to the product dispensers 107.

FIG. 5 shows one example of a control system 501 for the sprayer 100. In the example shown in FIG. 5, the control system 501 controls a plurality of injection interfaces 120 (five interfaces are shown for exemplary purposes) associated with the nozzle assemblies 110 previously described herein. In a similar manner, the control system 501 is also configured for coupling the injection interfaces 120 associated with either of the nozzle assemblies 110 (as shown in FIG. 3B) as well as the boom sections 108 (shown in FIG. 2B). Stated another way, the control system 501 is used with injection interfaces 120 associated with any of the product dispensers 107.

Referring again to FIG. 5, the control system 501 includes an injection control module 500. The injection control module 500 is in communication with each of the injection interfaces 120, for instance by one or more of wired or wireless connections or the like. The injection control module 500 includes, in one example, a rate control module 502 configured to determine and generate signals for one or more of the injection interfaces 120 corresponding to independent injection flow rates. The flow rates correspond to injection product concentrations for a given flow rate of carrier fluid.

In another example, the injection control module 500 includes an injection interface selection module 504. The injection interface selection module 504 designates one or more of the injection interfaces 120 for adjustment of the injection flow rate of injection product (e.g., on, off, and graduated flow rates of the injection product). The injection interface selection module 504 selects one or more of the injection interfaces 120 for individualized control of the injection interfaces 120 to achieve a desired concentration (e.g., change in concentration) of the injection product in the carrier fluid. The rate control module 502 determines the corresponding rate for each of these selected injection interfaces 120, for instance in cooperation with the field computer interface 506 and a field computer 508 as described herein.

As further shown in FIG. 5, the injection interfaces 120 each include an interface valve 212 in communication with the injection control module 500 as previously described herein. The interface valve 212 accordingly allows for a controlled graduated flow of the injection product through the injection port 308 and into the corresponding product dispenser 107. As shown in FIG. 5, the injection port 308 is identical to the injection port 308 previously described and shown in FIG. 3B. In another example, the injection port 216 is used with the injection interface 120, for instance in a format corresponding to the example shown in FIGS. 2A and 2B, for the product dispenser 107 including the boom section 108.

As further shown in FIG. 5, an optional concentration sensor 512 is downstream from the injection port 308. In one example, the concentration sensor 512 includes a relative concentration sensor configured to detect the concentration of the injection product within the agricultural product based on a comparison of at least one characteristic of the agricultural product at a product dispenser 107 relative to the same at least one characteristic at another product dispenser 107. In another example, the concentration sensor 512 includes a sensor configured to measure one or more characteristics of the injection product (e.g., colors, translucency, or the like corresponding to concentration) relative to a look up table or other database. In still another example, the concentration sensor 512 includes an ultraviolet light sensor that assesses concentration based on color. For instance, a detectable tracer dye is added into the injection reservoir 114 shown in FIGS. 2A and 3A. The concentration sensor 512 is configured to measure the concentration of the tracer dye within the agricultural product and is thereby able to associate the measured concentration of the tracer dye with the corresponding concentration of the injection product. In yet another example, the concentration sensor 512 includes, but is not limited to, a pH detector configured to measure the alkalinity or acidity of the injection product within the agricultural product prior to dispensing through one or more of the product dispensers 107 including the boom sections 108 or nozzle assemblies 110.

As shown in FIG. 5 the concentration sensors 512 are in communication with the injection control module 500. In one example, the concentration sensors 512 cooperate with the injection control module 500 to provide for feedback control of the interface valves 212 of each of the injection interfaces 120. Stated another way, as a specified concentration is provided to one or more of the interface valves 212 the corresponding concentration sensors 512 for those injection interfaces 120 measure the concentration in an ongoing manner and accordingly allow for adjustments of the interface valves 212 to accordingly ensure the interface valve 212 is actuated to administer the appropriate concentration of the injection product to the carrier fluid. Accordingly, the agricultural product dispensed from each of the product dispensers 107 (the boom sections 108 or nozzle assemblies 110) has the concentration of the injection product determined by the injection control module 500 despite variations in the localized product injection system 112, in the carrier system 103 or the like.

In another example, the injection control module 500 includes a field computer interface 506. As shown, the field computer interface 506 provides an interface for coupling with a field computer 508 (part of the sprayer 100, with a leading vehicle such as a tractor, or a standalone device) and the field computer 508 includes a field map 510. As will be described herein the field map 510 includes a series of prescriptions of agricultural products, seed types, irrigation or the like for various zones. The differing prescriptions for each of the zones are determined through analysis of the field terrain, yields from previous crops, environmental conditions or the like.

The field map 510 provides a plurality of prescriptions for an agricultural product or agricultural products throughout the field (e.g., in one or more of the zones of the field). As the field computer 508 communicates with the injection control module 500 the injection control module uses the field map 510 and its associated zone based prescriptions to independently specify the flow rate of an injection product for each of the injection interfaces 120 for corresponding product dispensers 107.

Further, with GPS systems, mathematical representations of the product dispensers 107 (e.g., the boom sections 108 or nozzle assemblies 110) along the sprayer booms 102, or the like the location of each of the product dispensers 107 of the sprayer 100 is continuously determined on the field map. As one or more product dispensers 107 of the sprayer 100 are within a zone or are poised to enter a zone the injection control module 500 (e.g., with the injection interface selection module 504) selects the corresponding injection interfaces 120 for adjustment of the injection product concentration based on the field map prescription. As discussed herein, the injection product concentration is changed instantaneously at the product dispensers 107 (e.g., with minimal lag time) relative to the application of the resulting agricultural product according to the prescription. Accordingly, as one or more of the product dispensers 107 are positioned within or are poised to enter into a particular zone having a prescribed concentration of the injection product the rate control module 502 assesses the corresponding injection product concentration and actuates the interface valves 212 of the injection interfaces 120 associated with the one or more corresponding product dispensers 107. The interface valves 212 are operated (opened, closed or graduated therebetween) to achieve the flow rate of the injection product that results in the specified concentration for that portion of the field map.

The injection product is thereby introduced in an instantaneous manner at the product dispensers 107 (e.g., locally to the dispensers) immediately prior to dispensing of the agricultural product having the desired concentration to that corresponding portion of the field. The sprayer 100 described herein is able to instantaneously deliver an accurate concentration of the injection product to the carrier system at one or more of the injection interfaces 120 by way of individualized control of each of those injection interfaces 120. Accordingly, with the field map 510 having various prescriptions and a plurality of product dispensers 107 with individually controlled injection interfaces 120 a multitude of injection product concentrations are provided across the sprayer 102 to accordingly provide the agricultural product with varying concentrations of the injection product to a corresponding variety of different parts of the field.

Figure 6:
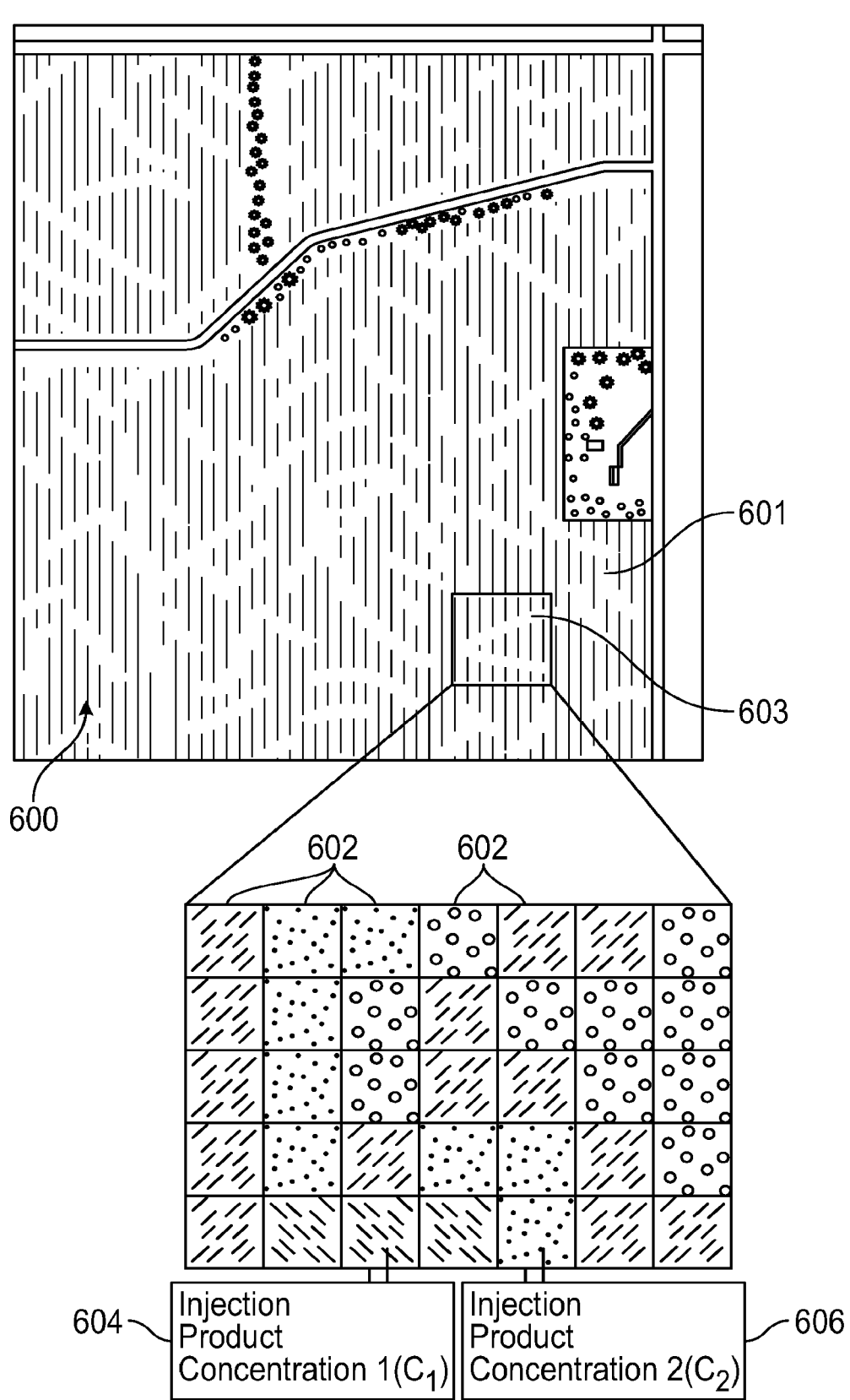
FIG. 6 is top view of one example of a field map including a plurality of zones indexed with concentration values for the injection product.

FIG. 6 shows one example of a field 601 including at least one subdivision such as a field section 603. The field section 603 is enlarged in the detailed view provided immediately below the field 601. As shown in the detailed view of the field section 603, the field section is divided into a plurality of zones 602. Two exemplary zones 604, 606 are provided. As shown, each of the zones 604, 606 has a corresponding stippling, crosshatching or the like denoting a particular concentration of an injection product for an agricultural product (e.g., for a fungicide, herbicide, pesticide, fertilizer or the like). In one example, the zones 602 of the field 601 are indexed to a field map 600. The field map 600 including the zones 602 provides a consolidated series of prescriptions for application of the agricultural product with varying concentrations of an injection product therein.

As previously described, the field map 600 is accessed by the field computer 508 and the injection control module 500. Optionally, the injection control module 500 accesses the field map 600 directly. As described herein, as one or more of the product dispensers 107 (e.g., boom sections 108 or nozzle assemblies 110) is within or is poised to enter one of the zones 602, for instance zone 604 or zone 606, the injection control module uses the prescription for the agricultural product for that zone to control the concentration of the injection product for the corresponding product dispensers 107. Accordingly, prior to entering the zone, while entering the zone, or while within the zone the injection control module 500 (e.g., the injection interface selection module 504) selects the relevant injection interfaces 120 corresponding to the product dispensers 107. The rate control module 502 uses the prescriptions provided in the field map 510 (e.g., zones 604, 606) to accordingly signal the interface valves 212 with the flow rates of the injection product corresponding to the specified concentration of the injection product. The injection product is then instantaneously delivered to the carrier fluid flow at the product dispensers 107 to ensure timely delivery of the injection product into the carrier system for corresponding delivery of the agricultural product (with the specified concentration of injection product) to the instant zone 602 of the field 601.

Accordingly, the sprayer 100 described herein including for instance the localized product injection system 112

(described in examples shown in FIGS. 2A through 3B), is configured to provide instantaneous individualized control of injection product concentration at each of a plurality of product dispensers 107. The injection product is immediately and locally distributed to the respective product dispensers 107 immediately prior to the desired application of the agricultural product.

As previously described herein, because the localized product injection system 112 is isolated from the carrier system 103, excepting the injection ports 216, 308 (see FIGS. 2B, 3B), even in low flow conditions of the carrier fluid through the carrier system 103 the injection product is still delivered at pressure and with the desired independently controlled concentrations to the corresponding product dispensers 107. Lag time that would otherwise delay the introduction of the injection product with the desired concentration is accordingly mitigated or eliminated even in low flow conditions because of the immediate introduction at the product dispensers 107.

FIG. 7 shows one example of a method 700 for using a localized product injection system, such as the system 112 described herein. In describing the method 700 reference is made to one or more components, features, functions or the like described herein. Where convenient reference is made to the components, features functions or the like with reference numerals. Reference numerals provided are exemplary and are not exclusive. For instance, the features, components, functions and the like described in the method 700 include, but are not limited to, the corresponding numbered elements, other corresponding features described herein, both numbered and unnumbered as well as their equivalents.

At 702, the method 700 includes pressurizing an injection product within a localized product injection system 112. The localized product injection system 112 includes one or more localized injection interfaces 120 and corresponding product dispensers 107. In one example and as shown for instance in FIGS. 2A and 2B the product dispensers 107 include, but are not limited to, boom sections 108. In another example, the product dispensers 107 include, but are not limited to, nozzle assemblies, such as the nozzle assemblies 110 shown for instance in FIGS. 3A and 3B.

At 704, a specified injection concentration is determined for one or more of the product dispensers 107. In one example, determining the specified injection concentration for the one or more product dispensers 107 includes determining an injection concentration for the corresponding injection interfaces 120 associated with those product dispensers 107. For instance and as described herein, the one or more product dispensers 107 pass through a plurality of zones such as the zones 604, 606 of a field map 600. In one example, the field map 600 and one or more of GPS positioning, mathematical algorithms, combinations of the same, or the like are assessed by an injection control module 500 to determine the locations of the corresponding product dispensers 107 relative to the zones 602. Concentrations of the injection product are indexed to each of the zones 602. As the product dispensers 107 enter, are poised to enter, or are within the zones 602 (e.g., exemplary zones 604, 606) the corresponding concentrations are associated with the product dispensers and the respective injection interfaces by the injection control module 500.

At 706, the method 700 includes operating one or more interface valves 212 of the injection interfaces 120 for the corresponding one or more product dispensers 107. Operating of the one or more interface valves 120 includes, at 708, injecting the injection product to a carrier fluid of a carrier system 103 at the one or more product dispensers 107 (e.g., at the boom sections 108 or nozzle assemblies 110). Operating the one or more interface valves 120 includes, at 710, instantaneously (e.g., near instantaneously or instantaneously) changing the injection concentration in the carrier flow to the specified injection concentration at the one or more product dispensers 107. At 712, the injecting and instantaneous change of the injection concentration occurs according to the positioning of the one or more interface valves 212 (of the injection interfaces 120) and the corresponding injection ports (216, 308) at the one or more product dispensers 107. Stated another way, by positioning the injection interfaces 120 at the product dispensers 107 the concentration of the injection product in the agricultural product is immediately changed prior to dispensing the resulting agricultural product from the sprayer 102.

In another example, the injection control module 500 independently controls the one or more injection interfaces as described herein. With the concentrations of the injection product associated with the one or more injection interfaces 120 (e.g., through use of a field map 600 having a plurality of zones 602), the injection control module 500 actuates the interface valves 212 of the corresponding injection interfaces 120 to independently provide flow of the injection product to the product dispensers 107 as prescribed.

Several options for the method 700 follow. In one example, pressurizing the injection product includes pressurizing the injection product to each of the one or more localized injection interfaces 120 positioned at the one or more product dispensers 107. Stated another way and as described herein, the localized product injection system 112 is isolated from the carrier system 103 and interfaces with the carrier system at the injection interfaces 120 (local to the product dispensers 107). By maintaining a pressurized environment at the injection interfaces 120 the injection product is instantaneously injected into the carrier flow at the product dispensers 107. Accordingly, the pressurized system 112 separate from the carrier system 103 ensures the injection product is instantaneously delivered to the carrier fluid to accordingly provide agricultural product at the one or more product dispensers 107 having the desired concentration of the injection product with little to no lag time between injection and application. As stated herein by providing the injection interfaces 120 at the product dispensers 107 (as opposed to upstream near the carrier reservoir 104) the agricultural product having the specified injection concentration is immediately applied through the product dispensers 107, for instance the boom sections 108 and the nozzle assemblies 110. Stated another way, lag time otherwise present with upstream mixing of the injection product into a flow of the carrier fluid is avoided. Instead, the instantaneous injection and corresponding instantaneous change in concentration of the injection product within the carrier fluid generates an agricultural product having the desired injection concentration immediately prior to its application to the agricultural crop.

In still another example, the method 700 includes measuring the injection concentration in the agricultural product (carrier fluid) at the one or more product dispensers 107. For instance, in one example the product dispensers 107 include corresponding concentration sensors 512 (see FIG. 5). A flow rate of the injection product is changed or controlled according to the measured injection concentration and the specified injection concentration. For instance where the injection control module 500 specifies a desired injection product concentration (having a corresponding flow rate) the concentration sensor 512 communicates with the injection control module 500 to provide feedback control to accordingly tune the concentration to achieve the specified injection concentration specified by the rate control module 502.

In another example, operating the one or more interface valves 212 includes individually operating the one or more interface valves 212 (e.g., independently or as arrays). For instance, as described herein and shown for instance in FIGS. 5, 2B and 3B the injection interfaces 120 are independently operable relative to the other injection interfaces 120 of the sprayer 100. Accordingly, the localized product injection system 112 provides varying flow rates of the injection product to each of the product dispensers 107 according to individualized specified concentrations. In one example, the individualized specified concentrations are provided by the injection control module 500 configured to assess and determine injection product concentrations from a field map 510 having one or more varying prescriptions for the agricultural product.

Figure 8:
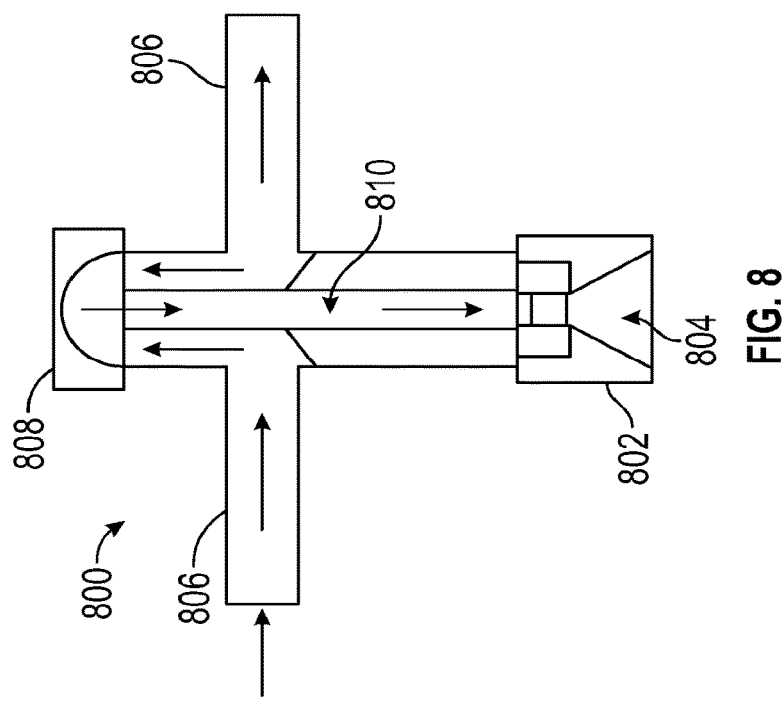
FIG. 8 is a cross sectional view showing one example of a product dispenser assembly including a configurable nozzle.

FIG. 8 shows one example of a product dispenser assembly 800. In this example, the product dispenser assembly 800 includes a nozzle assembly 802 including a nozzle 804 (e.g., a configurable nozzle as described in the examples provided herein) coupled with one or more passages or lines used with a sprayer, for instance, the sprayer shown in FIGS. 1A, 1B. In this example, the product dispenser assembly 800 includes a carrier line 806 (e.g., a boom tube or the like) providing a flow of carrier fluid, for instance, from a carrier fluid reservoir along the length of the boom. The carrier line 806, in one example, continues to the left and right relative to FIG. 8. As shown, the carrier line 806 extends into a cap 808 and a portion of the carrier fluid is redirected into a nozzle passage such as the nozzle passage 810. The remainder of the carrier fluid travels around the nozzle passage 810 and continues to the right, for instance, toward the end of the boom. That portion of the carrier fluid delivered through the cap 808 passes through the nozzle passage 810 to the nozzle assembly 802 for dispensing from the nozzle 804.

In one example, for instance, where the product dispenser assembly 800 is used with a sprayer not having one or more of the injection interfaces described herein, the carrier line 806 includes a premixed solution of agricultural product that is provided along the carrier line 806 and delivered to each of the nozzle assemblies 802, for instance, along a sprayer boom through respective caps 808 providing communication between the carrier line 806 and the nozzle passage 810.

In still other examples, the product dispenser assembly 800 includes a configurable nozzle, for instance at the nozzle assembly 802. In a similar manner to the injection interface 900 described herein, the configurable nozzle (e.g., the nozzle 804 as shown in FIG. 8) is controlled by a control unit. The control unit operates the configurable nozzle, including one or more configurable nozzles, to maintain a specified spray pattern (e.g., in response to variations in one or more of pressure or flow rate), change the specified spray pattern when a different pattern is specified, maintain or change the droplet size or the like.

Figure 9:
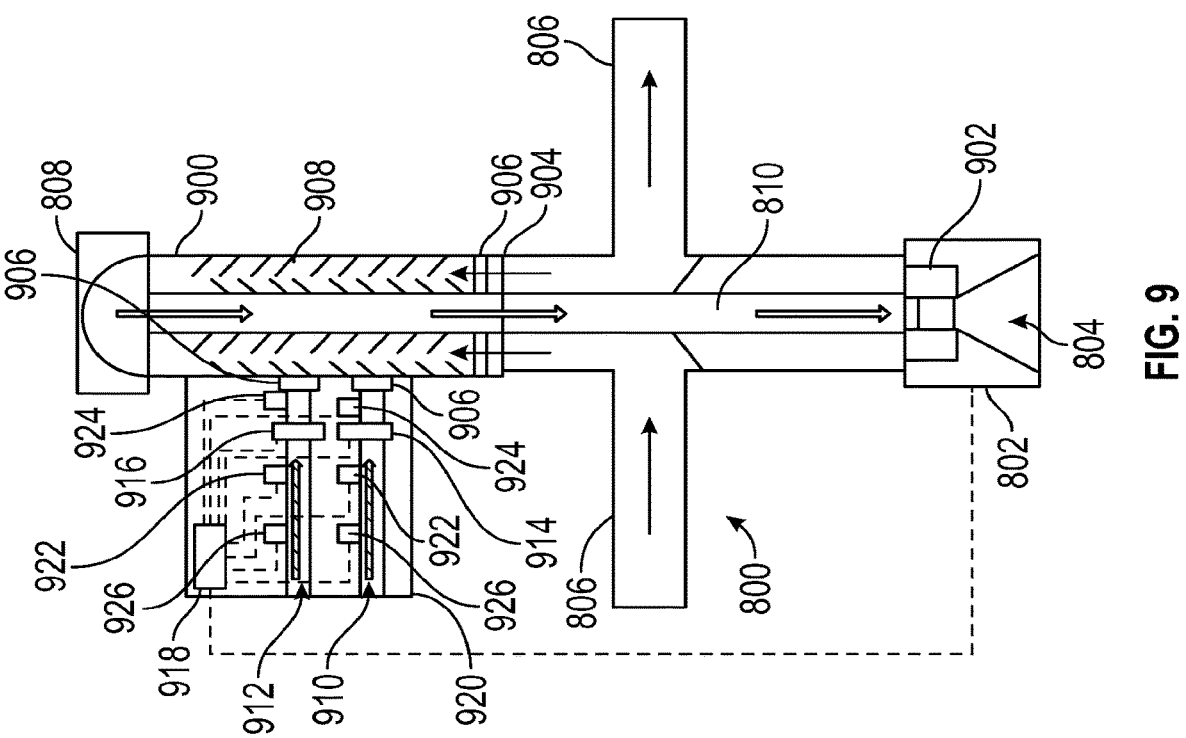
FIG. 9 is a cross sectional view showing another product dispenser assembly including examples of a localized injection interface and a configurable nozzle.

Referring now to FIG. 9, another example of an injection interface 900 is shown. In this example, the injection interface 900 is configured for coupling with an existing product dispenser assembly 800 including, for instance, a nozzle assembly 802, such as the configurable nozzle examples described herein, and a carrier line 806. As shown in FIG. 9, the cap 808 is decoupled from the carrier line 806 and the nozzle passage 810 and the injection interface 900 is interposed therebetween. The cap 808 is replaced, for instance, at an opposed end of the injection interface 900 relative to an end of the interface 900 coupled with the remainder of the carrier line 806 and the nozzle passage 810.

As further shown in FIG. 9, the product dispenser assembly 800 (in this example, including the injection interface 900) includes a nozzle assembly 802 coupled with an intermediate feature, for instance, the carrier line 806 and the nozzle passage 810. In another example, the nozzle assembly 802 includes a control valve 902 such as a solenoid operated control valve having an operator that is moved according to a duty cycle to provide one or more flow rates, spray patterns or the like through the nozzle 804 (e.g., of a mixed agricultural product solution including one or more injection products provided at a specified concentration relative to the carrier fluid). The nozzle assembly 802 and the nozzle 804 include one or more of the configurable nozzles described herein.

Referring again to FIG. 9, the injection interface 900 is interposed between the cap 808 and the carrier line 806. As shown with directional arrows, the carrier line 806 provides the carrier fluid into the injection interface 900, for instance, through a carrier fluid input 904, in one example, having a check valve 906 such as a diaphragm, lip seal or the like. The carrier fluid passes into the mixing chamber 908 including one or more mixing structures including vanes, fluting, ridges, passages, a residence chamber or the like configured to mix one or more injection products into the carrier fluid prior to delivery to the remainder of the product dispenser assembly 800 including the nozzle assembly 802 and the nozzle 804.

As shown, the injection interface 900 further includes one or more injection product inputs 910, 912. In this example, the interface 900 includes dual injection product inputs, while in other examples the injection interface 900 includes fewer or more injection product inputs including, but not limited to, a single injection product input, three, four, five or more injection product inputs. The injection product inputs 910, 912 provide a flow of one or more injection products to the injection interface 900 for mixing with the carrier fluid locally relative to the product dispenser assembly 800 including, for instance, the nozzle assembly 802.

Additionally, the injection interface 900 includes one or more throttling elements 914, 916 in line with the injection product inputs 910, 912, respectively. The throttling elements 914, 916 are operated in one example with a control unit 918 to control the flow rate of the one or more injection products from the inputs 910, 912 to the carrier fluid and control the specified concentration of each of the injection products relative to the carrier fluid.

Referring again to FIG. 9, as shown, the control unit 918 is, in this example, included within an interface body 920 of the injection interface 900. As with other previously described embodiments, the control unit 918 is, in one example, remotely coupled with the injection interface 900, for instance, wirelessly, by wired connection or the like. For instance, the control unit 918 is, in one example, a master control unit or a component of a master control unit configured to operate and control a plurality of injection interfaces 900 distributed along the sprayer boom. In the example shown in FIG. 9, the control unit 918 is coupled with each of the throttling elements 914, 916. In another example, the control unit 918 is coupled with one or more sensors including one or more of, but not limited to, pressure transducers 922, 924 and flow meters 926. Optionally, the injection interface 900 includes one or more of these sensors to facilitate feedback loop control of the throttling elements 914, 916. While in other examples the injection interface 900 includes no sensors. For instance, in a configuration where the throttling elements 914, 916 include pumps, the injection interface 900 is optionally without one or more of these instruments, and the throttling elements 914, 916 are operated in an open loop manner.

As shown in FIG. 9, the injection interface 900 does include one or more sensors, such as flow meters 926 provided for each or one or more of the injection product inputs 910, 912. The flow meters 926 are, in one example, in communication with the control unit 918 and optionally used to refine operation of the throttling elements 914, 916, for instance, in the manner of a feedback loop.

In another example, the injection interface 900 includes one or more pressure transducers 922, 924 optionally provided upstream and downstream relative to the respective throttling elements 914, 916 to facilitate the pressure based determination of the flow rate (e.g., by pressure differential) through the throttling elements 914, 916. As shown, the pressure transducers 922, 924, in this example, are also coupled with the control unit 918 and are used, in one example, to determine the flow rate through either or both of the throttling elements 914, 916 (for instance, where the flow rate through the injection product inputs 910, 912 is below the operating threshold for a flow meter such as the flow meter 926). Optionally, the pressure transducers 922, 924 are used in combination with the flow meters 926, for instance, where the injection product inputs 910, 912 are configured to provide a large range of flow rates above and below the operating threshold for the flow meter.

In operation, the injection products are delivered through the respective inputs 910, 912 at varying flow rates corresponding to one or more specified concentrations of the injection products relative to the carrier fluid. The throttling elements 914, 916 are controlled by, for example, the control unit 918 to provide these injection products at the specified flow rates to the mixing chamber 908 for mixing with the corresponding volume of carrier fluid. As the specified concentration of the one or more injection products changes (e.g., as the sprayer moves through a field and the product dispenser assembly 800 enters into a zone having a differing prescription or the like), the control unit 918 operates the throttling elements 914, 916 to accordingly change the flow rate of the respective injection products and change the specified concentration of the products within the carrier fluid in an instantaneous manner (including near instantaneous and immediately prior to dispensing) prior to application of the agricultural product from the nozzle assembly 802.

As shown in FIG. 9, the injection product delivered from the throttling elements 914, 916 is provided to the mixing chamber 908, for instance, through check valve 906 configured to prevent backflow of the injection product or carrier fluid into the injection product inputs 910, 912. The injection products and the carrier fluid are mixed by the one or more mixing structures in the mixing chamber 908 and delivered along the nozzle passage 810 to the nozzle assembly 802 including the nozzle 804, such as the reconfigurable nozzle examples described herein. Optionally, the nozzle assembly 802 includes a control valve 902, for instance, a solenoid operated control valve configured to operate at one or more duty cycles and thereby provide a controlled flow rate of the agricultural product (including the one or more injection products at specified concentrations) to various zones in the fields according to prescriptions that are implemented by the control unit 918 through the throttling elements 914, 916.

Further, the control unit 918 in another example operates a configurable nozzle, including one or more of the example configurable nozzles described herein. For instance, the control unit 918 is in communication with an orifice actuator of at least one orifice assembly of a configurable nozzle. The control unit 918 operates the orifice actuator control a orifice profile (e g, maintain, change or the like), for instance through movement one or more orifice plates. For instance, changes in pressure or flow rate of one or more of the carrier fluid (through the carrier fluid input 806), one or more injection products (through the injection product inputs 910, 912) or the mixed agricultural product (along the nozzle passage 810) are used by the control unit 918 to correspondingly change the orifice profile and maintain a specified spray pattern at the configurable nozzle. As described herein, the control of the orifice plate (and the orifice profile) in response to variations of the fluid characteristics (pressure, flow rate or the like) facilitates the continued maintenance of a spray pattern.

In other examples, the control unit 918 operates the orifice actuator and the orifice plate to change a spray pattern, for instance according to variations in the concentrations or composition of agricultural product. In one example, an agricultural product includes injection products that benefit from wider coverage with a finer atomizing, and accordingly the orifice profile is configured to apply the product with the corresponding pattern. In another example, the agricultural product includes injection products that benefit from the application of larger drops (e.g., on windy days), and accordingly the orifice profile is configured (e.g., enlarged, dilated or the like) to apply the product with the specified large drop spray pattern.

In still other examples, the product dispenser assembly 800 includes a configurable nozzle, for instance at the nozzle assembly 802. In a similar manner to the injection interface 900, the configurable nozzle (e.g., the nozzle 804 as shown in FIG. 8) is controlled by a control unit. The control unit operates the configurable nozzle, including one or more configurable nozzles, to maintain a specified spray pattern (e.g., in response to variations in one or more of pressure or flow rate), or change the specified spray pattern when a different pattern is specified, maintain or change the droplet size or the like.

Figure 10:
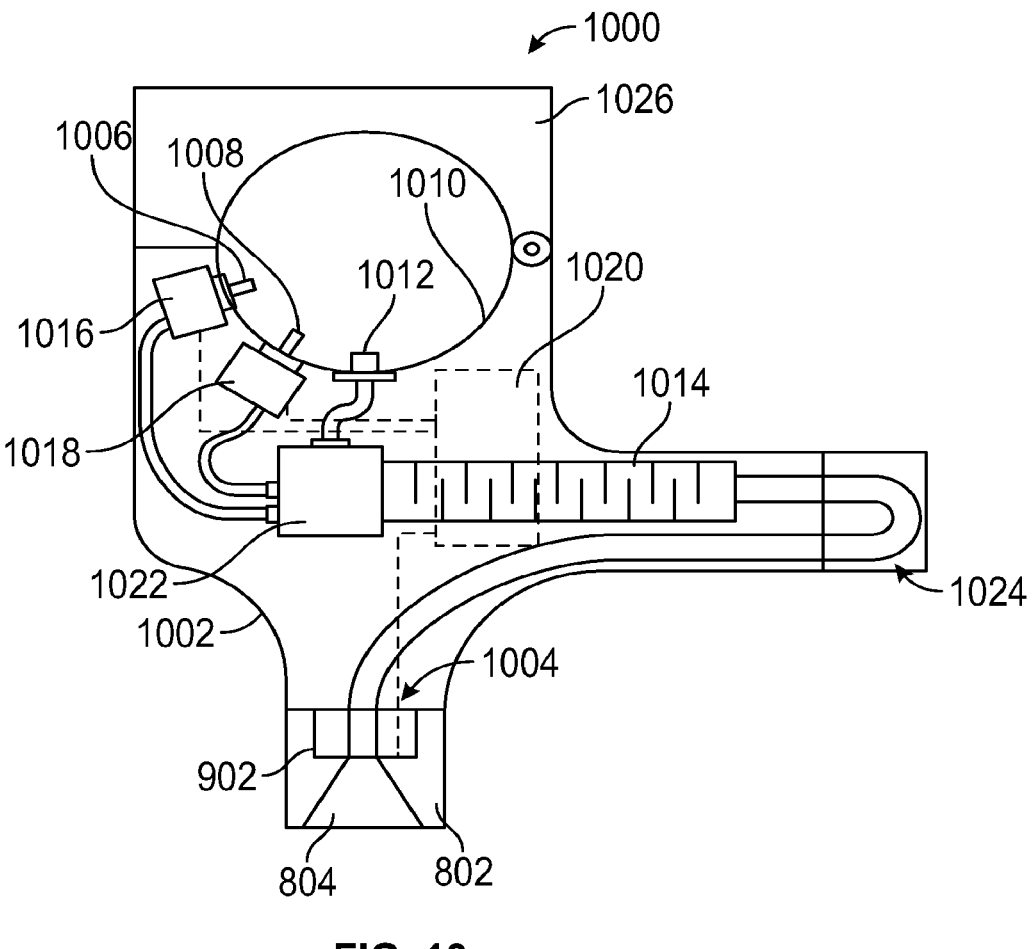
FIG. 10 is a cross sectional view showing another example of a localized injection interface including a configurable nozzle.

FIG. 10 shows another example of localized injection interface 1000. In this example, the injection interface 1000 configured for coupling with a composite boom tube, for instance a composite boom tube including one or more injection product passages and a carrier fluid passage. The passages are separated, for instance by one or more partitions. The interface 1000 couples inputs with each of the passages through one or more ports provided along the composite boom tube.

As shown, the injection interface 1000 includes the interface body 1002. In this example, the interface body 1002 includes one or more coupling features configured to couple the injection interface 1000 with the composite boom tube and accordingly provide one or more injection products and carrier fluid to the injection interface 1000 for localized injection of the various injection products to the carrier fluid at specified concentrations followed by dispensing of the resulting agricultural products, for instance, from one or more product dispensers. In FIG. 10, one example of a product dispenser, a nozzle assembly 802 (including a configurable nozzle as described in the examples herein), is shown coupled at an injection port 1004 of the interface 1000. In other examples, as described herein, the injection port 1004 of the injection interface 1000 is configured for coupling with another product dispenser such as a boom section, multiple nozzle assemblies or the like.

Referring again to FIG. 10, as shown, the injection interface 1000 includes one or more injection product fittings 1006, 1008 provided along an input face 1010 of the interface 1000. Additionally, a carrier fluid fitting 1012 is provided along the input face 1010. In the example shown in FIG. 10, each of the fittings 1006, 1008, 1012 are configured to match the configuration of ports provided along the composite boom tube described herein above. Accordingly, with coupling of the injection interface 1000 with the composite boom tube, each of the carrier fluid fitting 1012 and injection product fittings 1006, 1008 match with corresponding ports to provide communication of the various passages of the composite boom tube to the corresponding components of the injection interface 1000. Optionally, the injection interface 1000 includes an interface clamp 1026 (e.g., lockable clamp, biasing element or the like) configured to couple the injection interface with the composite boom tube and bias one or more of the carrier fluid fitting 1012 or the injection product fittings 1006, 1008 into communication with the corresponding matched ports.

As further shown in FIG. 10, each of the inputs of the injection interface 1000, for instance, the carrier fluid fitting 1012 and the injection product fittings 1006, 1008 include one or more components interposed between a mixing chamber 1014. In one example, the injection product fittings 1006, 1008 include one or more throttling elements 1016, 1018 configured to provide controlled variable flow rates of the injection product to the mixing chamber 1014 for mixing with the carrier fluid to thereby provide a specified concentration of the various injection products in the resulting agricultural product. In another example, the carrier fluid is also controlled, for instance, by a throttling element interposed between the carrier fluid fitting 1012 and the mixing chamber 1014.

Additionally, the injection interface 1000 further includes one or more optional components in addition to the throttling elements 1016, 1018 including, but not limited to, check valves, flow meters, pressure transducers and the like configured to provide one or more characteristic measurements of the injection products or carrier fluid such as flow rates, pressure drops or the like through the various throttling elements 1016, 1018. The characteristic measurements are used, for instance, by a control unit such as a control unit 1020, to refine control of the injection products, carrier fluid or the like to provide an agricultural product having one or more specified concentrations of the injection products for dispensing at the product dispenser such as the nozzle assembly 802.

As further shown in FIG. 1000, each of the injection product fitting 1006, 1008 and the carrier fluid fitting 1012 merge the respective fluids at the mixing chamber 1014 for mixing to form a mixed agricultural product for dispensing at the product dispensers. Optionally, a manifold 1022 is provided upstream from the mixing chamber 1014 to receive each of the injection products and carrier fluid prior to delivery to the mixing chamber 1014. In another example, each of the carrier fluid and the injection products are directly delivered to the mixing chamber 1014 for immediate mixing therein. The agricultural product as it leaves the mixing chamber 1014 is directed to the injection port 1004 configured for coupling with one or more product dispensers such as the nozzle assembly 802 including a configurable nozzle, a boom section or the like.

In the example shown in FIG. 10, a cap 1024 is interposed between the mixing chamber 1014 and the injection port 1004. In one example, the cap 1024 is removed and the corresponding free end of the interface body 1002 is configured, as another example of an injection port, for coupling with one or more assemblies such as a multi-nozzle assembly to provide one or more various spray patterns according to the configuration of the component nozzles of the multi-nozzle assembly.

Referring again to FIG. 10, as shown, the injection interface 1000 includes an optional control unit 1020 included in the injection interface 1000. In another example, and as previously described herein, the control unit 1020 is remotely positioned relative to the injection interface 1000, for instance, at a master control node, master control unit or the like such as the injection control module 500 shown in FIG. 5. Accordingly, the master control unit provides distributed control of each of a number of component injection interfaces 1000 coupled along boom tube, including a composite boom tube. In other examples, the control unit 1020 as shown is a discrete control unit 1020 provided with the interface body 1002 and in communication with each of the throttling elements 1016, 1018 as well as one or more sensors such as pressure transducers, flow meters or the like provided with the injection interface 1000. Optionally, the control unit 1020, when provided as part of the injection interface 1000, is itself coupled wirelessly or by wired connection, for instance, through a data port or the like to one or more control units of an agricultural sprayer, tractor, harvester or the like, such as a field computer, master control unit, injection control module or the like. The control unit 1020, as previously described herein, controls the operation of the one or more throttling elements 1016, 1018 (e.g., control valves, pumps or the like) to provide one or more of an open loop or feedback loop control of the various throttling elements 1016, 1018 (as well as an optional throttling element included with the carrier fluid passage) to facilitate the control of the concentration of one or more injection products relative to the carrier fluid for control and immediate mixing of the injection products with the carrier fluid to form an agricultural product. The agricultural product (after mixing) is immediately ready for dispensing through a proximate product dispenser, such as the nozzle assembly 802, with little to no lag time. Accordingly, rapid response to specified changes in the concentration, for instance, as the injection interface 1000 transitions to different zones of a field, a prescription changes for the injection product, or the like is accomplished with the injection interface 1000 (and other examples) described herein.

Further, the control unit 1020 in another example operates a configurable nozzle, including one or more of the example configurable nozzles described herein. For instance, the control unit 1020 is in communication with an orifice actuator of at least one orifice assembly of a configurable nozzle. The control unit 1020 operates the orifice actuator control a orifice profile (e.g., maintain, change or the like), for instance through movement one or more orifice plates. For instance, changes in pressure or flow rate of one or more of the carrier fluid, one or more injection products or the mixed agricultural product are used by the control unit 1020 to correspondingly change the orifice profile and maintain a specified spray pattern at the configurable nozzle. As described herein, the control of the orifice plate (and the orifice profile) in response to variations of the fluid characteristics (pressure, flow rate or the like) facilitates the continued maintenance of a spray pattern. In other examples, the control unit 1020 operates the orifice actuator and the orifice plate to change a spray pattern, for instance according to variations in the concentrations or composition of agricultural product. In one example, an agricultural product includes injection products that benefit from wider coverage with a finer atomizing, and accordingly the orifice profile is configured to apply the product with the corresponding pattern. In another example, the agricultural product includes injection products that benefit from the application of larger drops (e.g., on windy days), and accordingly the orifice profile is configured (e.g., enlarged, dilated or the like) to apply the product with the specified large drop spray pattern.

Figure 11:
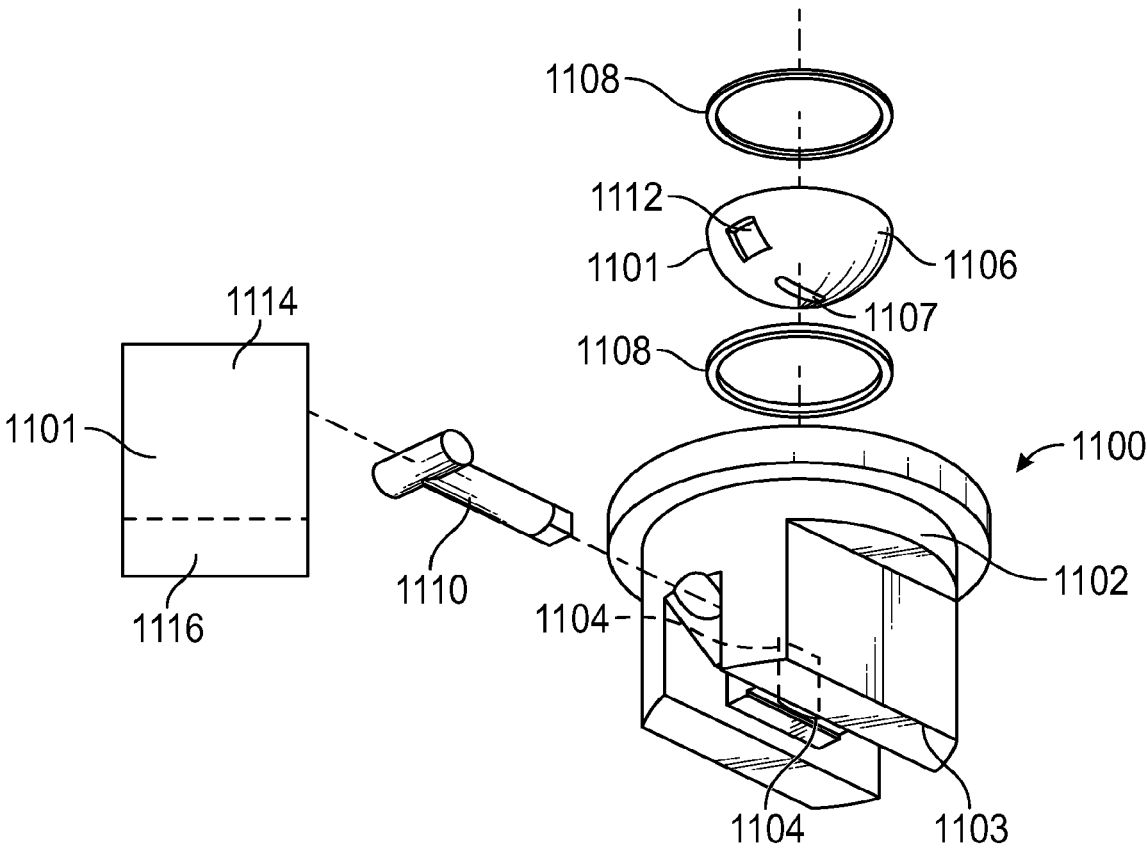
FIG. 11 is an exploded view showing one example of a configurable nozzle.

FIG. 11 shows one example of a configurable nozzle 1100 usable with one or more of the previously described injection interfaces and product dispenser assemblies. For instance, as shown in FIGS. 8, 9 and 10, the configurable nozzle 1100 is, in one example, used as the nozzle assembly provided at the distal ends of the injection interfaces and the product dispenser assemblies. In the example shown in FIG. 11, the configurable nozzle 1100 includes a nozzle body 1102 having a nozzle orifice 1104. In one example, the nozzle orifice 1104 is surrounded by one or more features such as walls, septums or the like collectively referred to as wind traps 1103 configured to interrupt the flow of gases, for instance, wind driven atmosphere across the nozzle orifice 1104 that otherwise interferes with the generation of a specified spray pattern, specified droplet size or the like from the configurable nozzle 1100.

As further shown in FIG. 11, the configurable nozzle 1100 includes an orifice plate. In this example, the orifice plate 1106 is a ball, spherical or hemispherical type orifice plate 1106 configured for seating within the nozzle body 1102, for instance, along a plate seat provided within the nozzle body 1102. As described herein, the orifice plate 1106 is moveable relative to the nozzle body 1102, in this example rotatable, and in other examples the orifice plate is slideable, translatable or the like relative to the nozzle body. As further shown in FIG. 11, the configurable nozzle 1100 includes one or more gaskets 1108 provided adjacent to the orifice plate 1106 to maintain a seal between the orifice plate 1106 and one or more other features of the configurable nozzle 1100 including the nozzle body 1102. In another example, the gasket 1108 provided along an upper surface (relative to the page) of the orifice plate 1106 maintains a seal between the orifice plate and the bodies of the of the injection interfaces and product dispenser assemblies shown, for instance in FIGS. 8, 9 and 10.

Referring again to FIG. 11, the orifice plate 1106, in this example, includes a plate port 1107 configured for alignment and misalignment with the nozzle orifice 1104 of the nozzle body 1102. The movement of the orifice plate 1106 relative to the nozzle body 1102 moves the plate port 1106 relative to the nozzle orifice 1104 and accordingly changes the effective profile (e.g., orifice profile) of the configurable nozzle 1100. Accordingly, by moving the orifice plate 1106 (e.g., rotating the orifice plate 1106 in the example shown in FIG. 11) between an aligned configuration with the plate port 1107 aligned with the nozzle orifice 1104 and a misaligned configuration, for instance, with the orifice plate 1106 rotated from one to ten degrees relative to the nozzle orifice 1104, various orifice profiles are provided for the configurable nozzle 1100 to accordingly generate specified droplet sizes, spray patterns or the like. In one example, the configurable nozzle 1100 is operated as described herein with movement of the orifice plate 1106 to maintain a specified spray pattern, droplet size or the like, for instance, during variations in one or more of pressure, flow rate or the like of an agricultural product such as a mixture of a carrier fluid and one or more injection products as described herein.

As further shown in FIG. 11, the configurable nozzle 1100 includes an orifice actuator 1114 coupled with the orifice plate 1106. In this example, the orifice plate 1106 is coupled with the orifice actuator 1114 with a transmission 1110 such as a rod, pin or the like extending from the orifice actuator 1114 (an electrically driven actuator, hydraulically driven actuator, pneumatically driven actuator or the like) to accordingly move the orifice plate 1106 and thereby control the orifice profile of the configurable nozzle 1100.

As further shown in FIG. 11, the configurable nozzle 1100 includes an orifice control unit 1116, in another example, coupled with the orifice actuator 1114 and configured to control or operate the orifice actuator 1114 and accordingly move the orifice plate 1106 based on the specified spray pattern, droplet size or the like desired for the configurable nozzle 1100. In one example, the orifice control unit 1116 is dedicated to the orifice actuator 1114. In another example, the orifice control unit is a component, module or the like of another control unit, such as the injection control module 500 shown in FIG. 5, the control units 918, 1020 shown in FIGS. 9 and 10 or the like.

Referring again to FIG. 11, the orifice plate 1106 includes a plate lug 1112 sized and shaped for engagement, coupling or the like with the transmission 1110 to facilitate the actuation of the orifice plate 1106 relative to the nozzle body 1102. In one example, rotational movement of the transmission 1110 provided by the orifice actuator 1114 is transmitted to the orifice plate 1106. The plate lug 1112 is, in one example, non-circular and rotational movement of the transmission 1110 accordingly rotates the orifice plate 1106 within the plate seat of the nozzle body 1102. Optionally, the gaskets 1108 bias the orifice plate 1106 in an opposed manner, and in one example without force or torque from the transmission 1110 biases the plate port 1107 toward alignment with the nozzle orifice 1104.

As shown in FIG. 11, the components shown with the configurable nozzle 1100 including, for instance, the orifice plate 1106, the orifice actuator 1114, and optionally the orifice control unit 1116 are, in one example, an orifice assembly 1101 configured to control the orifice profile of the configurable nozzle 1100. As described herein, control of the orifice profile includes in one example changing the orifice profile according to variations in pressure, flow rate or the like of an agricultural product. The orifice profile is changed in this example to maintain a specified spray pattern, droplet size or the like in response to changes in one or more of the pressure or flow rate. In another example, control of the orifice profile includes changing the orifice profile to correspondingly alter the spray pattern, droplet size or the like, for instance depending on whether conditions such as high winds (where larger droplet sizes are specified) or with agricultural products that benefit from increased atomization or distributed application (e.g., with a larger for diffuse spray pattern).

Although the configuration shown in FIG. 11 includes the orifice plate 1106 as a ball, spherical or hemispherical type orifice plate, in other examples, the orifice plate 1106 includes one or more translating or slideable plates configured to change the orifice profile of the configurable nozzle 1100, for instance, by increasing or decreasing the size, shape or the like of the nozzle orifice 1104. In other examples, the orifice control unit 1116 is provided remotely relative to the orifice actuator 1114 and the remainder of the orifice assembly 1101. For instance, the orifice control unit 1116 is wirelessly coupled with the orifice actuator 1114 (e.g., by electromagnetic communication that in some examples also powers the actuator), connected with a wired coupling to the orifice actuator 1114 or the like. In still other examples, the orifice actuator 1114 includes one or more of a hydraulic, pneumatic, electrically powered actuator or the like. In one example, the orifice actuator 1114 moves the transmission 1110 with magnetic induction. Powering of the orifice actuator 1114 moves the transmission 1110 or a component of the actuator that in turn moves the transmission to cause movement of the orifice plate 1106.

Figure 12:
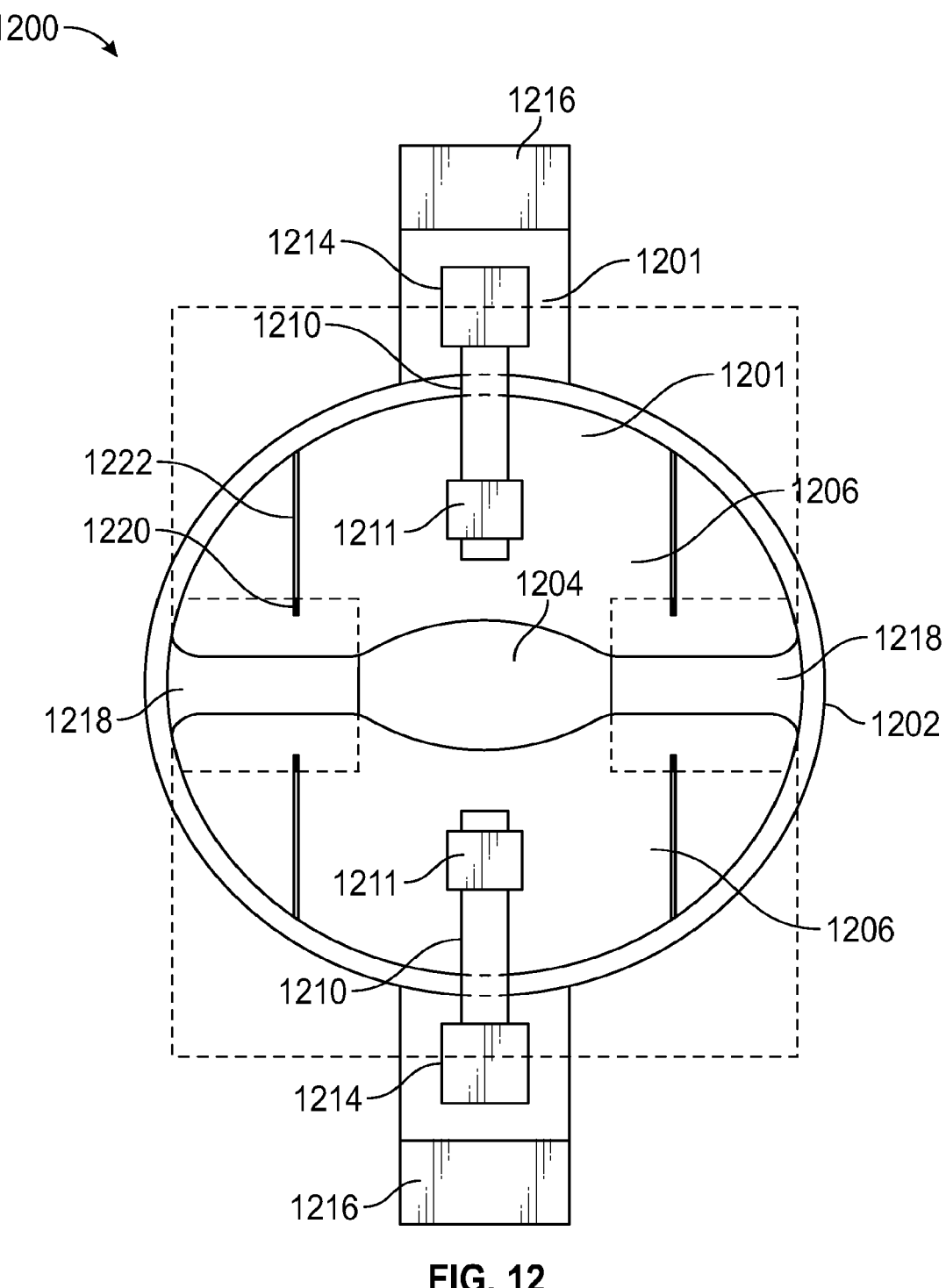
FIG. 12 a top view showing another example of a configurable nozzle.

FIG. 12 shows another example of an orifice assembly 1201, for instance, of a configurable nozzle 1200 used, in one example, with one or more of the example injection interfaces and product dispense assemblies shown, for instance, in FIGS. 8, 9 and 10. As shown, the configurable nozzle 1200 includes the orifice assembly 1201. The orifice the assembly 1201 includes one or more orifice plates 1206 and one or more orifice actuators 1214 coupled with the orifice plates 1206 and configured to move the orifice plates 1206 and change the orifice profile of the nozzle orifice 1204.

As further shown in FIG. 12, the configurable nozzle 1200 includes a nozzle body 1202. The one or more orifice plates 1206 (such as knife elements, plates, members or the like extending across the nozzle body 1202) are configured to move relative to the nozzle body 1202 and change the orifice profile of the nozzle orifice 1204. In the example shown in FIG. 12, the nozzle body 1202 includes two moveable orifice plates 1206 that move laterally (e.g., up and down relative to the page) by operation of one or more orifice actuators 1214.

In other examples, the orifice assembly 1201 includes a single moving orifice plate 1206 and includes a static orifice plate opposed to the moving orifice plate 1206. While in another example, the nozzle body 1202, for instance, an inner wall of the nozzle body 1202, provides one side wall of the nozzle orifice 1204 while the orifice plate 1206 (e.g., a single orifice plate) provides the opposed side of the nozzle orifice 1204 configured to move relative to the nozzle body 1202 and accordingly change the orifice profile of the nozzle orifice 1204.

As further shown in FIG. 12, in one example, the orifice assembly 1201 includes dual orifice plates 1206 configured to move laterally relative to the nozzle body 1202. The opposed orifice actuators 1214 are coupled with each of the respective orifice plates 1206, for instance, by way of intervening transmissions 1210. In one example, the transmissions 1210 include, but are not limited to, screws or the like that are rotated by the orifice actuators 1214. Rotation of the transmissions 1210 is received at one or more lugs, for instance, lugs 1211 statically coupled with the orifice plates 1206. In one example, the lugs 1211 are threaded in correspondence with the transmissions 1210 and rotation of the transmissions accordingly moves the orifice plates 1206 change the orifice profile of the nozzle orifice 1204. In another example, the orifice assembly 1201 includes dual moving orifice plates 1206 and a single orifice actuator 1214. In such an example, a composite transmission 1210 is provided that is coupled with both of the orifice plates 1206. For instance, one or more of gearing such as worm gearing, shafts and the like are used to move each of the orifice plates 1206.

As further shown in FIG. 12, the orifice assembly 1201 optionally includes one or more plate guides 1218. In one example, the plate guides 1218 are integral components of the nozzle body 1202. In other examples, the plate guides are separate components of the nozzle body 1202 that are coupled with the nozzle body 1202, for instance, to accordingly hold the orifice plates 1206 in an installed orientation relative to the nozzle body 1202. The plate guides 1218 are configured to guide movement in one or more of the orifice plates 1206 and thereby support the orifice plates 1206 to ensure maintenance of a specified orifice profile at the nozzle orifice 1204. In one example, one or more of the orifice plates or the plate guide 1218 includes a guide projection 1220. Conversely, the other of the orifice plates 1206 or plate guide 1218 includes a guide groove 1222. In this example, the orifice plates 1206 include the guide groove 1222 while the plate guides 1218 include the guide projections 1220. The guide projections 1220 are received within the guide grooves 1222 and accordingly align the orifice plates 1206 during movement. Accordingly, movement from the orifice actuators 1214 is accurately and reliably transformed into lateral movement of the orifice plates 1206 in an inward and outward fashion to change the nozzle orifice 1204 to a specified orifice profile.

In another example, the orifice actuators 1214 include at least one orifice control unit 1216. In a manner similar to the orifice control unit 1116 shown in FIG. 11, the orifice control unit 1216 (including plural control units) is in communication with one or more of the orifice actuators 1214. In the example shown in FIG. 12, each of the orifice actuators 1214 associated with the respective orifice plates 1206 includes a dedicated orifice control unit 1216. In other examples, the orifice assembly 1201 includes a single orifice control unit 1216 whether local or remote relative to the remainder of the orifice assembly 1201 to control each of the orifice plates 1206. For instance, the orifice control unit 1216 is, in one example, electrically coupled with the orifice actuators 1214. In another example, the orifice control unit 1216 is wirelessly coupled with each of the orifice actuators 1214. The orifice control unit 1216 is configured to provide instructions and operate the orifice actuator 1214 to move the orifice plates 1206 into one or more positions and provide various orifice profiles corresponding to a specified orifice profile.

In one example, the orifice control unit 1216 (as well as the orifice control unit 1116 in the example shown in FIG. 11) includes a memory, access to a memory, database or the like and associates one or more of measured flow rates, pressures or the like of the agricultural product with one or more specified orifice profiles. Accordingly, detection of one or more of the associated flow rates, pressures or the like triggers operation by the orifice control unit 1216 to move the orifice plates 1206 into a corresponding specified orifice profile configured to provide a specified spray pattern, droplet size or the like. In one example, the orifice control unit 1216 dynamically controls the orifice plates 1206 to provide a plurality of specified profiles corresponding to variations in the fluid characteristics (e.g., flow rate, pressure or the like). By responding to changes in the fluid characteristics the with corresponding orifice profiles the orifice assembly 1201 ensures maintenance of a specified spray pattern, droplet size or the like.

Figure 13:
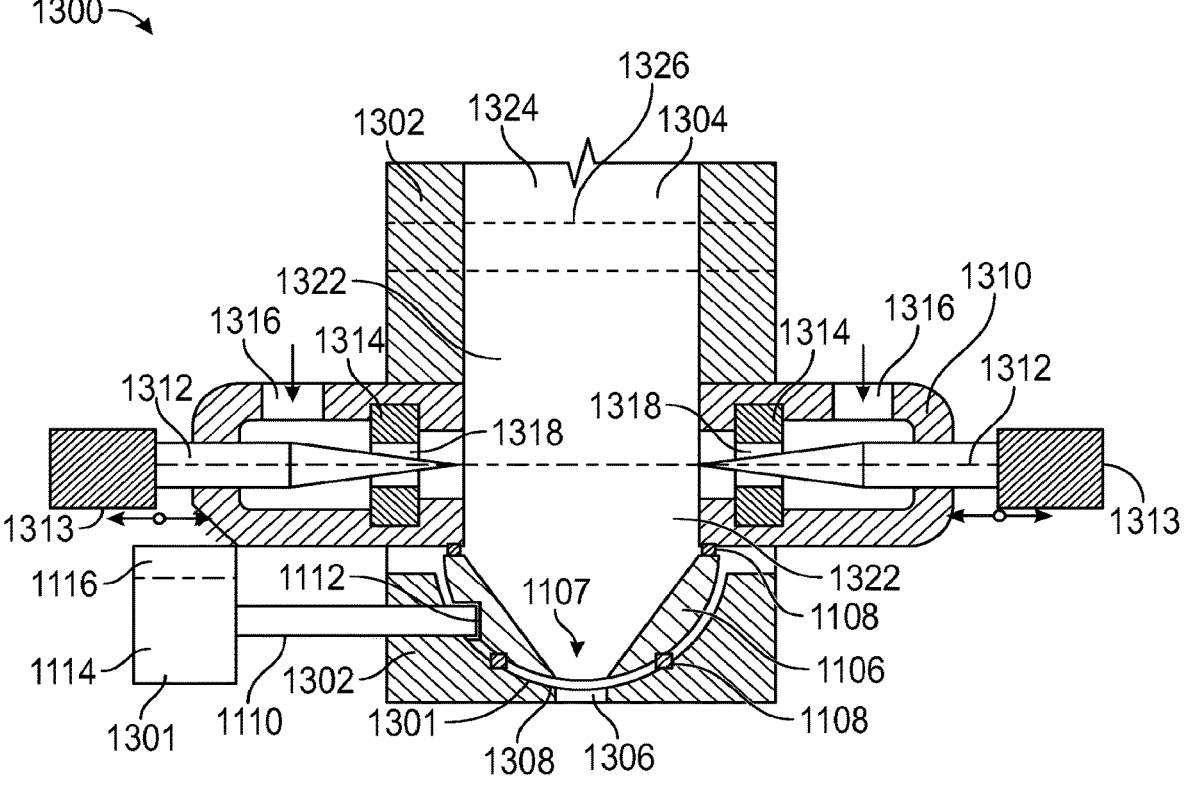
FIG. 13 is a cross sectional view of a configurable nozzle including examples of an orifice assembly and a blending assembly.

FIG. 13 shows a cross-sectional view of another example of a configurable nozzle 1300. In this example, the configurable nozzle 1300 includes an orifice assembly 1301 similar in at least some regards to the orifice assembly 1101 shown in FIG. 11. The configurable nozzle 1300 in this example also includes a blending assembly 1310 configured to supplement the flow of a liquid, such as an agricultural product received in the configurable nozzle 1300, with another fluid, such as ambient air. The blending assembly 1310 provides additional capability for the control (e.g., including maintaining or altering) of spray characteristics of the agricultural product from the configurable nozzle 1300 including, but not limited to, control in response to changes in the agricultural product flow rate, pressure or the like.

As shown in FIG. 13, the orifice assembly 1301 includes the orifice actuator 1114 and the orifice plate 1106. As previously described, the orifice plate 1106 is configured to rotate relative to a nozzle body 1302. As further shown, one or more gaskets 1108 are interposed between the orifice plate 1106 and one or more other components of the nozzle body 1302. In this example, a transmission 1110 extends from the orifice actuator 1114 and is received at a corresponding plate lug 1112 provided on the orifice plate 1106. In one example, the plate lug 1112 includes, but is not limited to, a recess, joint, socket or the like configured to engage with the transmission 1110 and accordingly receive movement from the transmission 1110 and the orifice actuator 1114 to rotate the orifice plate 1106 relative to the nozzle body 1302. As previously described herein, rotation of the orifice plate 1106 moves the plate port 1107 relative to the nozzle orifice 1306 to accordingly change an orifice profile of the nozzle orifice 1306 and the corresponding spray pattern delivered by the configurable nozzle 1300. As shown in FIG. 13, in an example including a tapered plate port 1107 the portion of the port 1107 (e.g., a neck) near the nozzle orifice 1306 moves (e.g., rotates) into and out of alignment with the nozzle orifice 1306. In this example, the wider base of the tapered plate port 1107 proximate to the reception passage 1304 has a corresponding profile to the profile (e.g., second passage profile 1322) of the reception passage 1304.

As further shown in FIG. 13, an orifice control unit 1116 is, in one example, included with the orifice assembly 1301. In the example shown in FIG. 13, the orifice control unit 1116 is provided as a component of the orifice actuator 1114. For instance, the orifice actuator 1114 and the orifice control unit 1116 are, in one example, provided as a component within the nozzle body 1302, coupled with the nozzle body 1302 or the like. In another example, the orifice control unit 1116 is a remote control unit, for instance, associated with the master control unit or in communication with a master control unit. The orifice control unit 1116, in one example, is configured for remote control of the orifice actuator 1114 by one or more of wired or wireless communication.

The configurable nozzle 1300 optionally includes one or more sensors, such as the sensor 1326, provided at an opposed end of the nozzle body 1302 relative to the nozzle orifice 1306. In one example, the sensor 1326 includes a flow meter configured to measure the flow of an agricultural product including, for instance, a mixture of a carrier fluid and one or more injection products through the configurable nozzle 1300. Measurement of the flow is used, in one example, by the orifice control unit 1116 to orient the orifice plate 1106 and move the plate port 1107 relative to the nozzle orifice 1306. Alignment and misalignment of the plate port relative to the nozzle orifice 1306 provides a graduated opening and closing of the nozzle orifice 1306 by the orifice plate 1106 and corresponding variations in spray pattern, droplet size or the like provided from the nozzle orifice 1306 of the configurable nozzle 1300. For instance, in one example, at relatively lower flow rates (e.g., measured with the sensor 1326) the orifice control unit 1116 moves the orifice plate 1106 into a misaligned configuration including, for instance a partially misaligned configuration, between the plate port 1107 and the nozzle orifice 1306. This change in the orifice profile, the nozzle orifice 1306 (shrinking of the orifice profile in this example) facilitates the maintenance of a desired spray pattern as well as a specified droplet size. In contrast, without the orifice plate 1106, the decrease in flow rate through a nozzle causes agglomeration or large droplet size of an agricultural product where maintenance of a spray pattern having small droplet size is specified. By misaligning the plate port 1107 of the orifice plate 1106 relative to the nozzle orifice 1306, the orifice profile is changed (in this example, shrunk) to accordingly maintain the specified droplet size and thereby achieve better dispersion or contact of the agricultural product with the target, such as a planted crop.

In another example, the sensor 1326 includes one or more pressure transducers. In one example, two or more pressure transducers are provided on either side of a throttling element, for instance, one or more of a control valve, venturi, such as the reception passage 1304 shown herein, or the like having a pressure drop therebetween. The differential pressure measured by the pressure transducers as the sensor 1326 is, in one example, used to provide a corresponding value to a measured flow rate through the configurable nozzle 1300.

As previously described herein, the configurable nozzle 1300 shown in FIG. 13 includes a blending assembly 1310. Although the blending assembly 1310 is included as a component of the configurable nozzle 1300 including the orifice assembly 1301, in another example the blending assembly 1310 is provided as a standalone feature, for instance with another configurable nozzle including the blending assembly 1310 without the orifice assembly.

As shown, the blending assembly 1310 includes one or more choke elements 1312 moveably coupled relative to the nozzle body 1302. For instance, in one example, the choke elements 1312 shown in FIG. 13 are provided as needle elements. In other examples, the choke elements 1312 include, but are not limited to, butterfly valve elements, solenoid operated valve elements or the like. The blending assembly 1310 including the choke elements 1312 is, in one example, operated to supplement the flow of agricultural product through the configurable nozzle 1300 with one or more fluids, for instance, ambient air, other inert gases, such as nitrogen or the like.

As further shown in FIG. 13, a reception passage 1304 of the nozzle body 1302 is, in this example, provided as a venturi. The reception passage 1304 includes a first passage profile 1324 upstream relative to the nozzle orifice 1306 and a second passage profile 1322 more proximate to the nozzle orifice 1306 in comparison to the first passage profile 1324. Optionally, the first passage profile 1324 is larger than the second (downstream) passage profile 1322. In the example shown in FIG. 13, the reception passage 1304, including the first and second passage profiles 1324, 1322 has a consistent profile to maintain the pressure of the agricultural product. The agricultural product moving through blending assembly is used, in one example, to passively draw (induce) a fluid, such as ambient air, through the blending assembly 1310 to the agricultural product for blending (e.g., including mixing, entrainment, injection or the like). The agricultural product including the blended fluid (e.g., air) is dispensed as a mixture through the nozzle orifice 1306.

As further shown in FIG. 13, each of the blending assemblies 1310 optionally includes a blending port 1318 extending into the reception passage 1304 including the venturi having the narrower second passage profile 1322 relative to the first passage profile 1324. In the example shown in FIG. 13, multiple blending assemblies 1310 (as shown here, two) are provided around the reception passage 1304. In other examples, a single blending assembly 1310 including, for instance, a single blending port 1318 is provided. As shown in the example in FIG. 13, the choke elements 1312 are moveable relative to an element seat 1314 included as part of the nozzle body 1302. Movement of the choke elements 1312, for instance, by choke actuators 1313 moves the elements 1312 between seated and decoupled configurations and configurations therebetween. Movement of the choke elements 1312 controls the flow rate of the fluid, such as ambient air, through intake ports 1316 and into the reception passage 1304 for blending with the agricultural product.

In operation, the choke elements 1312 are, in one example, substantially closed in high flow configurations of the configurable nozzle 1300. For instance, where the configurable nozzle 1300 is operating at a specified flow rate, for instance, above a supplementing threshold the choke elements 1312 are opened. For instance, the choke elements 1312 are decoupled from the element seats 1314 and the blending ports 1318 are open. The added fluid (e.g., at ambient pressure in this example) allows the agricultural fluid to agglomerate and accordingly maintain a specified droplet size (that is otherwise smaller without the blending fluid). In another example where the flow rate of the agricultural product through the configurable nozzle 1300 drops below a supplementing threshold, the choke elements 1312 are moved, for instance, in a graduated fashion toward the seated configuration (e.g., a closed configuration) until a specified flow of ambient air (less than in the first example provided above) is provided through the intake ports 1316 to the agricultural product by way of the blending ports 1318. The (lower) specified flow of the blending fluid, ambient air in this example, decreases the effect of the blending fluid to cause agglomeration of the agricultural product, and accordingly maintains a specified smaller droplet size. Accordingly, the fluid (in this example, ambient air) is induced to the reception passage 1304, blends with the agricultural product and supplements the agricultural product as it is delivered to the remainder of the configurable nozzle 1300 including, for instance, the orifice assembly 1301. If the flow rate of the agricultural product to increases (or decreases) the chock elements 1312 are further opened (or conversely closed with decreased flow rate) to variably administer the supplementing fluid to the product.

As the flow rate of the agricultural product increases through the configurable nozzle 1300, the choke elements 1312 are gradually moved outwardly, for instance, away from a seated configuration and toward a decoupled configuration to increase the flow of supplementing fluid (e.g., ambient air) to the agricultural product. The supplementing of the agricultural product by the blending assembly 1310 is used, in one example, to realize a specified spray pattern, droplet size or the like. In this example, the supplementing fluid promotes agglomeration of the agricultural product and accordingly minimizes a decrease in droplet size otherwise realized with higher flow rates of the agricultural product. Conversely, the choke elements 1312 moved toward a closed (e.g., seated) configuration with relatively lower flow rates to decrease promotion of agglomeration and thereby maintain a smaller specified droplet size.

In still other examples, the blending assembly 1310 is used to vary the droplet size or spray pattern from the nozzle orifice 1306 according to specifications in a field. For instance, at the interior of a field a small droplet size is achieved with a decrease of the supply of supplementing fluid (e.g., through movement of the choke elements toward the closed configuration) from the blending assembly 1310 to provide enhanced application of the product. While along the edges of the field the supplementing fluid is increased (including opening to a fully open position) to promote agglomeration and thereby form larger droplets to prevent drift to adjacent fields, roads, residences or the like.

In other examples, the blending assembly 1310 provides a supplemental flow of pressurized fluid such as compressed air or the like (in contrast to the ambient air previously described) to the agricultural product to promote (e.g., maintain or increase) atomizing of the agricultural product to a specified finer droplet size. In this converse example to the blending assembly 1310 providing ambient (relatively low pressure) fluid, the addition of pressurized air to the agricultural product achieves a specified droplet size of the agricultural product even at low flow rates or low pressures where the agricultural product otherwise tends to agglomerate or collect into larger droplets. In this example, at lower flow rates the choke elements 1312 are opened to administer the pressurized supplementing fluid to the agricultural product and thereby increase atomization of the product (e.g., generate smaller droplets).

Optionally, a control unit such as the orifice control unit 1116 or other dedicated control unit is coupled with the choke element 1312 including, for instance, the choke actuator 1313. The orifice control unit 1116 in one example, is in communication with the sensor 1326 and moves the choke element 1312 to realize a specified flow rate of fluid through the blending assembly 1310 to supplement the agricultural product. Continued measurements by the sensor 1326 facilitates the refinement of the position of the choke element 1312 to provide an equilibrium amount of the supplementing fluid, such as ambient air, to the agricultural product by way of movement of the choke elements 1312 between the seated configuration, the decoupled configuration as well as positions therebetween.

Although FIG. 13 shows the configurable nozzle 1300 as including both the orifice assembly 1301 and the blending assembly 1310, in other examples, configurable nozzles described herein include one of the orifice assembly 1301 or the blending assembly 1310. For instance, in one example, a configurable nozzle includes the blending assembly 1310 with an otherwise static nozzle orifice 1306. The blending assembly 1310, in such an example, is used as the configurable portion of the nozzle to accordingly supplement the agricultural product passing through the nozzle orifice 1306 and thereby control one or more of the droplet size, spray pattern or the like. For instance, supplementing by way of ambient air to the agricultural product is controlled by the blending assembly 1310 to accordingly achieve a specified droplet size, maintain a specified droplet size and similarly do the same with a specified spray pattern.

FIG. 14 shows one example of a method 1400 for controlling a configurable nozzle, for instance, one or more of the configurable nozzles 1100, 1200, 1300 described and previously shown herein. In describing the method 1400, reference is made to one or more components, features, functions, steps or the like described herein. Where convenient, reference is made to the components, features, functions, steps or the like with reference numerals. Reference numerals provided are exemplary and are not exclusive. For instance, the components, features, functions, steps or the like described in the method 1400 include, but are not limited to, corresponding numbered elements, other corresponding features described herein, both numbered and unnumbered, as well as their equivalents.

At 1402, the method 1400 includes specifying one or more of the spray pattern, droplet size or the like for an agricultural product sprayed from a nozzle such as the configurable nozzles described herein. In one example, the agricultural product includes a mixture of a carrier fluid and one or more injection products provided to the configurable nozzle.

At 1404, one or more of the flow rate or pressure of one or more of the carrier fluid, the injection product or the mixture (e.g., the agricultural product) are measured. For instance, in one example, one or more of sensors such as flow meters, pressure transducers (including pairs of pressure transducers provided across an element of the system providing the pressure drop) or the like are used to measure one or more of the flow rate or pressure of these fluids. For instance, as shown in each of FIGS. 9, 10 and 13 respective sensors are, in one example, provided at one or more locations to measure one or more of the flow rates or pressures of each of these fluids. In the example shown in FIG. 13, one or more sensors 1326 are provided in the reception passage 1304 of the configurable nozzle 1300 to accordingly measure one or more of the flow rate or pressure of the agricultural product delivered to and through the configurable nozzle 1300. In one example, where the sensors 1326 include pressure transducers, one pressure transducer is optionally included in a first passage profile while a second pressure transducer is provided in a second passage profile smaller than the first passage profile and upstream or downstream relative to the first passage profile. The pressure drop between these two profiles 1322, 1324 generates a differential pressure therebetween and is, in one example, used to determine a flow rate of the agricultural product through the configurable nozzle 1300.

At 1406, the method 1400 includes controlling a configurable nozzle such as one or more of the configurable nozzles 1100, 1200, 1300 to control one or more of the specified spray pattern or specified droplet size according to the measured flow rate or pressure. At 1408, controlling the configurable nozzle includes positioning at least one orifice plate, for instance, one or more of a flat or knife plate, spherical or hemispherical plate or the like of the configurable nozzle at a first location with one or more of a corresponding first orifice profile (e.g., size or shape) according to a first measures flow rate or pressure. At 1410, the method includes positioning the at least one orifice plate (e.g., a planar plate, hemispherical or spherical plate or the like) at a second location with one or more of a corresponding second orifice profile (e.g., size or shape) according to a second measured flow rate or pressure. In one example, the second measured flow rate or pressure is greater than the first measured flow rate or pressure. For instance, where the second flow rate or pressure is greater than that of the first flow rate or pressure, in one example, the second location corresponds to an enlarged second orifice profile relative to the first orifice profile. For instance, where the orifice plate includes a planar plate member, the plate member is recessed from the opposed plate member or opposed side wall of the nozzle body or the like to accordingly enlarge the nozzle orifice.

In another example, for instance, the example shown in FIG. 13, the orifice plate 1106 is moved in a rotating manner relative to the nozzle body 1302 to accordingly rotate the plate port 1107 of the orifice plate 1106 relative to the nozzle orifice 1306. As previously described, rotation of the plate port 1107 relative to the nozzle orifice 1306 moves the plate port into and out of alignment with the nozzle orifice 1306 to accordingly generate a differing orifice profile for the configurable nozzle 1300. In each of these examples, the orifice plates including the orifice plate 1206 shown in FIGS. 12 and 1106 shown in FIG. 13 are moveable through a variety of orientations, for instance, a range of locations, positions or the like to accordingly change the orifice profile into a number of corresponding differing shapes, sizes or the like to thereby control the spray pattern and specified droplet size (including maintaining the specified spray pattern and droplet size in light of changes to the agricultural product flow rate, pressure or the like).

Several options for the method 1400 follow. In one example, controlling the configurable nozzle includes maintaining one or more of the specified spray pattern or the specified droplet size at the first and second measured flow rates or pressures (the first and second measured flow rates or pressures different in this example) with the at least one orifice plate at the respective first and second locations. For instance, as previously described, where a higher flow rate or pressure of the agricultural product is detected at the configurable nozzle 1300, in one example, the orifice plate 1106, 1206 is operated to accordingly enlarge the orifice profile and thereby maintain a specified spray pattern and droplet size. In contrast, where a decreased flow rate or pressure of the agricultural product is detected, the configurable nozzle is operated, for instance, by way of movement of the orifice plate 1106, 1206 to decrease the orifice profile and thereby again maintain the specified spray pattern, specified droplet size or the like. In another example, positioning the at least one orifice plate such as the orifice plate 1206 at the first or second locations optionally includes guiding the at least one orifice plate with a guide panel such as the plate guide 1218 shown, for instance, in FIG. 12 or a plate seat 1308, for instance, shown in FIG. 13 receiving the orifice plate 1106 in a rotatable fashion. Each of the plate seat 1308 and the plate guide 1218 provide guidance for movement of each of the orifice plates 1206, 1106, respectively. Accordingly, actuators such as the respective orifice actuator 1114 shown in FIG. 13 and the orifice actuator 1214 shown in FIG. 12 reliably and accurately move the respective orifice plates into specified locations corresponding to one or more specified spray patterns, droplet sizes or the like for each of the configurable nozzles 1200, 1300.

In another example, the method 1400 includes introducing a fluid, such as a gas, to the mixture of the carrier fluid and the injection product upstream from the at least one orifice plate with a blending assembly such as the blending assembly 1310 shown in FIG. 13. In one example, introducing gas to the mixture includes operating a choke element such as one or more choke elements 1312 shown in FIG. 13 to control the opening of one or more corresponding blending ports 1318 between at least open and closed configurations (including one or more intermediate configurations therebetween). Introducing the gas to the mixture includes, in one example, introducing one or more of first and second flow rates of gas to the mixture at respective first and second measured flow rates and pressures, for instance, measured by one or more of the sensors 1326 provided at the nozzle body 1302 as shown in FIG. 13. For instance, where the supplementing fluid is ambient air or another low pressure gas, the method 1400 includes introducing a second different (and increased) flow rate of gas to the mixture at the second measured flow rate or pressure where the second measured flow rate or pressure is greater than the first measured flow rate or pressure. The second flow rate of gas in such an example is greater than the first flow rate of gas and promotes agglomeration of the agricultural product and accordingly minimizes decrease of the droplet size (otherwise caused with increased agricultural product flow rate or pressure). Conversely, a relatively small flow rate of the gas (including a full interruption of the gas or a flow rate of zero) is used with the first (lower relative to the second) measured flow rate or pressure of the agricultural product to minimally provide the supplemental fluid to the agricultural product and thereby retard agglomeration of the agricultural product otherwise achieved with higher flow rates of the supplemental fluid. In another example, introducing gas to the mixture of the carrier fluid in the one or more injection products includes introducing a first flow rate of gas to the mixture to increase a droplet size to the specified droplet size based on the first measured pressure. A second (lower) flow rate of gas, including, but not limited to a flow rate of zero, is introduced to the mixture (supplemented) based on the second measured pressure where the second measured pressure of the agricultural product is lower than the first measured pressure. The second lower flow rate decreases the agglomeration of the agricultural product and accordingly maintains the droplet size (e.g., does not increase the droplet size).

Various Notes and Examples

Example 1 can include subject matter such as a configurable nozzle comprising: a nozzle body including a nozzle orifice and a reception passage in communication with the nozzle orifice; and at least one orifice assembly coupled with the nozzle body, the at least one orifice assembly includes: an orifice plate movably coupled with the nozzle body, the orifice plate extends along at least a portion of the nozzle orifice, and movement of the orifice plate changes an orifice profile of the nozzle orifice, and an orifice actuator coupled with the orifice plate, the orifice actuator configured to move the orifice plate.

Example 2 can include, or can optionally be combined with the subject matter of Example 1, to optionally include wherein the at least one orifice assembly includes first and second orifice assemblies coupled with the nozzle body, each of the first and second orifice assemblies includes respective orifice plates, and the orifice plate of the first orifice assembly extends along a first portion of the nozzle orifice, and the orifice plate of the second orifice assembly extends along a second portion of the nozzle orifice.

Example 3 can include, or can optionally be combined with the subject matter of one or any combination of Examples 1 or 2 to optionally include wherein at least one guide panel extends between the orifice plates of the first and second orifice assemblies, and the at least one guide panel extends along another portion of the nozzle orifice, and The at least one guide panel is configured to span between the orifice plates throughout a range of movement of the orifice plates.

Example 4 can include, or can optionally be combined with the subject matter of one or any combination of Examples 1-3 to optionally include wherein the nozzle body includes at least one guide panel extending along a portion of the orifice plate, the at least one guide panel includes at least one of a projection or groove, and the orifice plate includes the other of the groove or the projection, and the projection is received in the groove and configured to guide movement of the orifice plate.

Example 5 can include, or can optionally be combined with the subject matter of one or any combination of Examples 1-4 to optionally include a control unit in communication with the orifice actuator, the control unit configured to operate the orifice actuator and move the orifice plate to change the orifice profile of the nozzle orifice.

Example 6 can include, or can optionally be combined with the subject matter of Examples 1-5 to optionally include wherein the control unit is configured for communication with an injection control module Example 7 can include, or can optionally be combined with the subject matter of Examples 1-6 to optionally include a transmission coupled between the orifice plate and the orifice actuator, wherein the transmission is configured to convert movement from the orifice actuator to movement of the orifice plate.

Example 8 can include, or can optionally be combined with the subject matter of Examples 1-7 to optionally include wherein the orifice plate includes a spherical orifice plate, and the nozzle body includes a plate seat rotatably coupled with the spherical orifice plate.

Example 9 can include, or can optionally be combined with the subject matter of Examples 1-8 to optionally include wherein the spherical orifice plate includes a plate port, and the orifice actuator is configured to rotate the spherical orifice plate and the plate port relative to the nozzle orifice.

Example 10 can include, or can optionally be combined with the subject matter of Examples 1-9 to optionally include wherein movement of the spherical orifice plate is configured to change the alignment of the plate port with the nozzle orifice to change the orifice profile of the nozzle orifice.

Example 11 can include, or can optionally be combined with the subject matter of Examples 1-10 to optionally include a blending assembly in communication with the reception passage, the blending assembly includes: a blending port in communication with the reception passage, and a choke element configured to control the opening of the blending port between at least open and closed configurations.

Example 12 can include, or can optionally be combined with the subject matter of Examples 1-11 to optionally include wherein the blending port includes an element seat, and in the closed configuration the choke element is seated along the element seat, in the open configuration the choke element is decoupled from the element seat, and in an intermediate configuration the choke element is interposed between the closed and open configurations.

Example 13 can include, or can optionally be combined with the subject matter of Examples 1-12 to optionally include wherein the choke element includes one or more of a needle valve operator, a butterfly valve operator, or solenoid operated valve operator.

Example 14 can include, or can optionally be combined with the subject matter of Examples 1-13 to optionally include a fluid application system comprising: at least one source of a carrier fluid and an injection product in communication with at least one configurable nozzle; at least one sensor interposed between the at least one source and the at least configurable nozzle, the at least one sensor configured to measure at least one of flow rate or pressure of one or more of the carrier fluid or the injection product; the at least one configurable nozzle is configured to dispense a mixture of the carrier fluid and the injection product with one or more of a specified spray pattern or a specified droplet size, the configurable nozzle includes at least one orifice assembly coupled with a nozzle body, the at least one orifice assembly includes: at least one orifice plate movably coupled with the nozzle body, and the at least one orifice plate is configured to change an orifice profile of the nozzle orifice with movement relative to the nozzle body, and an orifice actuator coupled with the orifice plate, the orifice actuator is configured to move the orifice plate; and an orifice control unit in communication with the orifice actuator and the at least one sensor, wherein the orifice control unit is configured to control the at least one orifice plate and the orifice profile with the orifice actuator according to the measured flow rate or pressure of one or more of the carrier fluid or the injection product, and the orifice control unit in combination with the movable at least one orifice plate are configured to maintain one or more of the specified spray pattern or specified droplet size.

Example 15 can include, or can optionally be combined with the subject matter of Examples 1-14 to optionally include wherein the at least one sensor includes at least one of a flow meter or a pressure differential sensor.

Example 16 can include, or can optionally be combined with the subject matter of Examples 1-15 to optionally include wherein the at least one source of the carrier fluid and the injection product includes: a carrier fluid source, and an injection product source separate from the carrier fluid source.

Example 17 can include, or can optionally be combined with the subject matter of Examples 1-16 to optionally include an injection interface coupled with the configurable nozzle, the injection interface is configured to locally inject an injection product from the injection product source to the carrier fluid from the carrier fluid source at the configurable nozzle.

Example 18 can include, or can optionally be combined with the subject matter of Examples 1-17 to optionally include wherein the fluid application system includes a plurality of operating conditions including at least a first operating condition and a second operating condition, and in the first operating condition one or more of the carrier fluid or the injection product are delivered at a first flow rate and a first pressure, and in the second operating condition one or more of the carrier fluid or the injection product are delivered at a second flow rate and a second pressure, and at least one of the first flow rate is less than the second flow rate or the first pressure is less than the second pressure.

Example 19 can include, or can optionally be combined with the subject matter of Examples 1-18 to optionally include wherein the orifice profile includes a plurality of nozzle orifice sizes, the orifice control unit is configured to control the orifice plate according to the measured flow rate or pressure from the at least one sensor, and in the first operating condition the orifice control unit positions the orifice plate at a first location with a corresponding first nozzle orifice size, in the second operating condition the orifice control unit positions the orifice plate at a second location with a corresponding second orifice size greater than the first nozzle orifice size, and in each of the first and second operating conditions the orifice control unit and the orifice plate at the respective first and second locations are configured to maintain one or more of the specified spray pattern or the specified droplet size.

Example 20 can include, or can optionally be combined with the subject matter of Examples 1-19 to optionally include wherein the orifice plate includes a spherical orifice plate, and the nozzle body includes a plate seat rotatably coupled with the spherical orifice plate.

Example 21 can include, or can optionally be combined with the subject matter of Examples 1-20 to optionally include wherein the spherical orifice plate includes a plate port, and the orifice actuator is configured to rotate the spherical orifice plate and the plate port relative to the nozzle orifice to change the orifice profile.

Example 22 can include, or can optionally be combined with the subject matter of Examples 1-21 to optionally include a blending assembly in communication with the at least one configurable nozzle, the blending assembly includes: a blending port upstream from the at least one configurable nozzle, and a choke element configured to control the opening of the blending port between at least open and closed configurations.

Example 23 can include, or can optionally be combined with the subject matter of Examples 1-22 to optionally include wherein the blending port includes an element seat, and in the closed configuration the choke element is seated along the element seat, in the open configuration the choke element is decoupled from the element seat, and in an intermediate configuration the choke element is interposed between the closed and open configurations.

Example 24 can include, or can optionally be combined with the subject matter of Examples 1-23 to optionally include wherein the choke element includes one or more of a needle valve operator, a butterfly valve operator, or solenoid operated valve operator.

Example 25 can include, or can optionally be combined with the subject matter of Examples 1-24 to optionally include a configurable nozzle comprising: a nozzle body including a nozzle orifice and a venturi in communication with the nozzle orifice, the venturi includes a first venturi profile and a second venturi profile smaller than the first venturi profile; a blending assembly in communication with the nozzle orifice and the venturi proximate the second venturi profile, the blending assembly includes: at least one blending port in communication with the venturi, at least one choke element configured to control the opening of the blending port between at least open and closed configurations and control introduction of gas to a mixture of a carrier fluid and an injection product, and a choke actuator coupled with the at least one choke element, the choke actuator configured to control the choke element.

Example 26 can include, or can optionally be combined with the subject matter of Examples 1-25 to optionally include wherein the blending assembly includes an element seat, and in the closed configuration the choke element is seated along the element seat, in the open configuration the choke element is decoupled from the element seat, and in an intermediate configuration the choke element is interposed between the closed and open configurations.

Example 27 can include, or can optionally be combined with the subject matter of Examples 1-26 to optionally include wherein the second passage profile is proximate to the nozzle orifice and the first passage profile is remote relative to the nozzle orifice.

Example 28 can include, or can optionally be combined with the subject matter of Examples 1-27 to optionally include wherein the choke element includes one or more of a needle valve operator, a butterfly valve operator, or solenoid operated valve operator.

Example 29 can include, or can optionally be combined with the subject matter of Examples 1-28 to optionally include a control unit in communication with the choke operator, the control unit configured to operate the choke actuator and move the choke element.

Example 30 can include, or can optionally be combined with the subject matter of Examples 1-29 to optionally include an orifice assembly coupled with the nozzle body, the orifice assembly includes: an orifice plate movably coupled with the nozzle body, the orifice plate extends along at least a portion of the nozzle orifice, and movement of the orifice plate changes an orifice profile of the nozzle orifice, and an orifice actuator coupled with the orifice plate, the orifice actuator in communication with the control unit, and the orifice actuator is configured to move the orifice plate.

Example 31 can include, or can optionally be combined with the subject matter of Examples 1-30 to optionally include wherein the configurable nozzle includes a plurality of operating conditions including at least first and second operating conditions, and in the first operating condition the mixture is at a first flow rate and a first pressure, the choke element is in the open configuration, and the nozzle orifice includes a first orifice profile, in the second operating condition the mixture is at a second flow rate and a second pressure greater than the respective first flow rate and pressure, the choke element is in a closed configuration relative to the open configuration, and the nozzle orifice includes a second orifice profile larger than the first orifice profile.

Example 32 can include, or can optionally be combined with the subject matter of Examples 1-31 to optionally include a method for controlling a configurable nozzle comprising: specifying one or more of a spray pattern or droplet size for a sprayed mixture of a carrier fluid and an injection product; measuring one or more of flow rate or pressure of one or more of the carrier fluid, the injection product or the mixture; and controlling a configurable nozzle to maintain one or more of the specified spray pattern or specified droplet size according to the measured flow rate or pressure, controlling the configurable nozzle includes: positioning the at least one orifice plate of the configurable nozzle at a first location with one or more of a corresponding first orifice profile according to a first measured flow rate or pressure, and positioning the at least one orifice plate of the configurable nozzle at a second location with one or more of a corresponding second orifice profile according to a second measured flow rate or pressure, the second measured flow rate or pressure greater than the first measured flow rate or pressure.

Example 33 can include, or can optionally be combined with the subject matter of Examples 1-32 to optionally include wherein controlling the configurable nozzle includes maintaining one or more of the specified spray pattern or the specified droplet size at the first and second measured flow rates or pressures with the at least one orifice plate at the respective first and second locations.

Example 34 can include, or can optionally be combined with the subject matter of Examples 1-33 to optionally include wherein positioning the at least one orifice plate at the second location includes recessing the at least one orifice plate relative to the first location and correspondingly enlarging the nozzle orifice to the second orifice size.

Example 35 can include, or can optionally be combined with the subject matter of Examples 1-34 to optionally include wherein positioning the at least one orifice plate at the first or second locations includes guiding the at least one orifice plate with a guide panel coupled with the at least one orifice plate.

Example 36 can include, or can optionally be combined with the subject matter of Examples 1-35 to optionally include wherein positioning the at least one orifice plate at the first or second locations includes positioning first and second orifice plates at the first or second locations.

Example 37 can include, or can optionally be combined with the subject matter of Examples 1-36 to optionally include wherein the orifice plate includes a spherical orifice plate having a plate port, and positioning the at least one orifice plate at the first location includes rotating the spherical orifice plate to at least partially misalign the plate port with the nozzle orifice, and positioning the at least one orifice plate at the second location includes rotating the spherical orifice plate to align the plate port with the nozzle orifice relative to the at least partial misalignment.

Example 38 can include, or can optionally be combined with the subject matter of Examples 1-37 to optionally include introducing a gas to the mixture of the carrier fluid and the injection product upstream from the at least one orifice plate with a blending assembly.

Example 39 can include, or can optionally be combined with the subject matter of Examples 1-38 to optionally include wherein introducing gas to the mixture includes operating a choke element to control the opening of a blending port between at least open and closed configurations.

Example 40 can include, or can optionally be combined with the subject matter of Examples 1-39 to optionally include wherein introducing gas to the mixture includes: introducing a first flow rate of gas to the mixture at the first measured flow rate or pressure, and introducing a second flow rate of gas to the mixture at the second measured flow rate or pressure greater than the first measured flow rate or pressure, the second flow rate of gas greater than the first flow rate of gas.

Example 41 can include, or can optionally be combined with the subject matter of Examples 1-40 to optionally include wherein introducing gas to the mixture includes introducing a first flow rate of gas to the mixture to decrease a droplet size to the specified droplet size, based on the first measured pressure, and introducing a second flow rate of gas to the mixture based on the second measured pressure, the second measured pressure greater than the first measured pressure, and the second flow rate of gas is greater than the first flow rate of gas.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The claimed invention is:

1. A configurable nozzle configured to dispense an agricultural fluid, the configurable nozzle comprising:
   a nozzle body;
   a reception passage extending within the nozzle body having a first passage profile and a second passage profile, the reception passage configured to receive the agricultural fluid;
   wherein the agricultural fluid includes one or more of a carrier fluid or an injection product;
   one or more sensors positioned along one or more locations of the reception passage, the one or more sensors configured to continuously measure at least one of flow rate or pressure of the carrier fluid or the injection product;
   a control valve in communication with the reception passage;
   a nozzle orifice; and
   one or more blending assemblies in communication with the reception passage, the one or more blending assemblies including:

one or more blending ports in communication with the reception passage; and one or more choke elements configured to be continuously adjusted between fully open and closed positions relative to the one or more blending ports;

wherein the one or more choke elements is configured to continuously adjust position according to a sensed flow characteristic of at least one of the carrier fluid or the injection product.

2. The configurable nozzle of claim 1, wherein the one or more sensors includes a flow meter.

3. The configurable nozzle of claim 1, including an orifice plate located adjacent to the nozzle orifice.

4. The configurable nozzle of claim 1, including one or more actuators coupled with the one or more choke elements.

5. The configurable nozzle of claim 1, wherein the one or more blending assemblies is configured to transmit a supplemental flow of pressurized fluid to the reception passage.

6. The configurable nozzle of claim 1, wherein the one or more blending assemblies is configured to vary at least one of droplet size or spray pattern.

7. The configurable nozzle of claim 1, wherein continuously adjusted includes graduated adjustment.

8. An agricultural fluid application system comprising:

one or more carrier fluid sources and one or more injection product sources;

a configurable nozzle in communication with the one or more carrier fluid sources and the one or more injection product sources;

one or more sensors interposed between the one or more carrier fluid sources or the one or more injection product sources and the configurable nozzle, the one or more sensors configured to continuously measure at least one of flow rate or pressure of a carrier fluid or an injection product;

a control valve; and the configurable nozzle is configured to dispense a mixture of the carrier fluid and the injection product with one or more of a specified spray pattern or a specified droplet size, the configurable nozzle includes:

a reception passage;

wherein the one or more sensors is positioned along the reception passage;

a nozzle orifice; and one or more blending assemblies in communication with the reception passage, the one or more blending assemblies including:

one or more blending ports in communication with the reception passage; and one or more choke elements received in the one or more blending ports, the one or more choke elements movable relative to the one or more blending ports;

wherein the one or more choke elements is configured to move according to a sensed flow characteristic detected by the sensor of one or more of the carrier fluid or injection product;

wherein the one or more choke elements is configured to continuously control graduated opening and closing of the one or more blending ports.

9. The agricultural fluid application system of claim 8, wherein the one or more blending assemblies is configured to vary droplet size or spray pattern from the nozzle orifice according to field conditions.

10. The agricultural fluid application system of claim 8, wherein the one or more choke elements includes one or more of needle elements, butterfly valves or solenoid operated valve elements.

11. The agricultural fluid application system of claim 8, wherein the reception passage includes a first passage profile and a second passage profile more proximate to the nozzle orifice than the first passage profile.

12. The agricultural fluid application system of claim 8, comprising one or more choke actuators coupled with the one or more choke elements.

13. The agricultural fluid application system of claim 8, wherein the one or more blending assemblies is configured to transmit a supplemental flow of pressurized fluid into the reception passage.

14. A method for dispensing an agricultural fluid from a configurable nozzle having a reception passage, blending assembly and one or more choke elements interposed with the blending assembly and the reception passage, the method comprising:

transmitting the agricultural fluid through the reception passage;

continuously sensing with a sensor positioned along the reception passage, an agricultural fluid characteristic of the agricultural fluid transmitted through the reception passage;

providing a supplemental fluid through an intake port, the intake port configured to supply the supplemental fluid from a fluid source to the blending assembly;

continuously adjusting a position of the one or more choke elements between one of a closed configuration and an open configuration according to the sensed agricultural fluid characteristic;

wherein in the closed configuration the one or more choke elements is coupled with a choke element seat and closes a blending port; and wherein in the open configuration the one or more choke elements is decoupled from the choke element seat and opens the blending port;

in the open configuration, releasing the supplemental fluid through the blending port into the reception passage; and adjusting a droplet size of the agricultural fluid dispensed from the configurable nozzle by controlling a release of the supplemental fluid through the blending port.

15. The method for dispensing the agricultural fluid of claim 14, wherein the one or more choke elements is moved in a graduated fashion.

16. The method for dispensing the agricultural fluid of claim 14, including:

continuously sensing, with the sensor, a flow rate or a pressure of the agricultural fluid; and controlling the adjustment of the position of the one or more choke elements with an actuator.

17. The method for dispensing the agricultural fluid of claim 14, wherein sensing the agricultural fluid characteristic includes sensing a specified flow rate of the agricultural fluid.

18. The method for dispensing the agricultural fluid of claim 17, comprising:

closing the one or more choke elements when the sensor senses a high flow configuration.

19. The method for dispensing the agricultural fluid of claim 14, wherein the position of the one or more choke elements is adjusted gradually to variably administer the supplemental fluid.

20. The method for dispensing the agricultural fluid of claim 14, wherein the supplemental fluid is at least one of ambient air or pressurized air.

21. The method for dispensing the agricultural fluid of claim 14, including:

controlling the one or more choke elements with a control unit.

\*    \*    \*    \*    \*